DOCUMENT SORTING APPARATUS

Original Filed Dec. 26, 1957 32 Sheets-Sheet 1

INVENTORS
ARTHUR J. FETTIG
DON M. JENKS
CHARLES LASDINE
EARL P. MAIDMENT
BYRON A. RUNDE
BY Fidler, Beardsley + Bradley
ATTORNEYS April 25, 1961 A. J. FETTIG ET AL 2,981,421

DOCUMENT SORTING APPARATUS

Original Filed Dec. 26, 1957 32 Sheets-Sheet 3

April 25, 1961 A. J. FETTIG ET AL 2,981,421

DOCUMENT SORTING APPARATUS

Original Filed Dec. 26, 1957 32 Sheets-Sheet 5

April 25, 1961 A. J. FETTIG ET AL 2,981,421

DOCUMENT SORTING APPARATUS

Original Filed Dec. 26, 1957 32 Sheets-Sheet 6

April 25, 1961 A. J. FETTIG ET AL 2,981,421

DOCUMENT SORTING APPARATUS

Original Filed Dec. 26, 1957 32 Sheets-Sheet 7

April 25, 1961 A. J. FETTIG ET AL 2,981,421

DOCUMENT SORTING APPARATUS

Original Filed Dec. 26, 1957 32 Sheets-Sheet 14

April 25, 1961 A. J. FETTIG ET AL 2,981,421

DOCUMENT SORTING APPARATUS

Original Filed Dec. 26, 1957 32 Sheets-Sheet 15

April 25, 1961 A. J. FETTIG ET AL 2,981,421

DOCUMENT SORTING APPARATUS

Original Filed Dec. 26, 1957 32 Sheets-Sheet 16

April 25, 1961 A. J. FETTIG ET AL 2,981,421

DOCUMENT SORTING APPARATUS

Original Filed Dec. 26, 1957 32 Sheets-Sheet 18

April 25, 1961 A. J. FETTIG ET AL 2,981,421

DOCUMENT SORTING APPARATUS

Original Filed Dec. 26, 1957 32 Sheets-Sheet 19

April 25, 1961 A. J. FETTIG ET AL 2,981,421

DOCUMENT SORTING APPARATUS

Original Filed Dec. 26, 1957 32 Sheets-Sheet 21

April 25, 1961 A. J. FETTIG ET AL 2,981,421

DOCUMENT SORTING APPARATUS

Original Filed Dec. 26, 1957 32 Sheets-Sheet 22

April 25, 1961 A. J. FETTIG ET AL 2,981,421

DOCUMENT SORTING APPARATUS

Original Filed Dec. 26, 1957 32 Sheets-Sheet 23

April 25, 1961 A. J. FETTIG ET AL 2,981,421

DOCUMENT SORTING APPARATUS

Original Filed Dec. 26, 1957

32 Sheets-Sheet 27

April 25, 1961 A. J. FETTIG ET AL 2,981,421

DOCUMENT SORTING APPARATUS

Original Filed Dec. 26, 1957

32 Sheets-Sheet 28

April 25, 1961 A. J. FETTIG ET AL 2,981,421

DOCUMENT SORTING APPARATUS

Original Filed Dec. 26, 1957

32 Sheets-Sheet 29

DOCUMENT SORTING APPARATUS

Original Filed Dec. 26, 1957 32 Sheets-Sheet 31

| REF. | CCT. | MEC.FIGS. | REF. | CCT. | MEC.FIGS. | REF. | CCT. | MEC.FIGS. |
|---|---|---|---|---|---|---|---|---|
| ACS | Emc | | ECA | Ftc | 6,9 | RFM | Ftr | 6 |
| AF1- | | | ECB | Ftc | 9 | RIM1- | | |
| AF27 | B | 31 | ESD | Etc | | RIM4 | Cr | |
| ART1 | Cmc | | ESW | Etc | | RNAS | Emc | |
| ART2 | Emc | | FBR | Emr | 20 | RIS1 | Etc | |
| ASB | Eml | | FBR-1 | Etc | | RIS2 | Etc | |
| ASC | Eml | | FBR-2 | Etc | | RIS3 | Etc | |
| ASD | Eml | | FBR-3 | Ctc | | RO1- | | |
| BD1- | | | FBR-4 | Ftl | | RO10 | Dc | |
| BD27 | Fl | 19,23,26 | FBR-5 | Ab | | ROS | Dtc | |
| BL1 | Etc | 26 | FBS1 | Etr | 25 | RSAT | Ebl | 30 |
| BL2 | Etr | 26 | FBS2 | Etr | 25 | RSAT-1 | Eml | |
| BL3 | Etc | 26 | FBS3 | Etr | 25 | RSAT-2 | Eml | |
| BLR | Cmc | 26 | FDB | Ebr | | RSAT-3 | Eml | |
| BLR-1 | Cmc | | FE | Bbc | 30 | RSAT-4 | Ebl | |
| BLR-2 | Emc | | FE-1 | Ftc | | RSTR | Ebc | 30 |
| BR | Fml | 30 | LD1 | Emr | 19 | RSTR-1 | Eml | |
| BR-1 | Ebl | | LD2 | Emr | 19 | RSTR-2 | Eml | |
| BR-2 | Etr | | LD3 | Emr | 19 | RSTR-3 | Eml | |
| BR-3 | Emc | | LPS | Emc | | RSTR-4 | Ebl | |
| BR-4 | Ebr | | M19 | Ctr | | RSTS | Emc | |
| BR-5 | Ftl | | MCS | Emc | | RSTT | Etl | |
| C1 | At | | MCSW | Ebl | | RTR | Bbc | 30 |
| C2 | Fbr | | MM | At | | RTR-1 | Etl | |
| CBR | Bbc | 30 | MPI | Emc | | RTR-2 | Emc | |
| CBR-1 | Etl | | MPL | Am | | RTR-3 | Ebl | |
| CCS | Ftc | 12 | MPR | At | 30 | RTS | Eml | |
| CD2 | Ftc | 15,21 | MPS | At | | RTST | Etl | |
| CD3 | Ftc | 16,21 | MS | At | | S19 | Ctr | |
| CNAS | Etl | | NARS | Bbc | | SATB | Eml | |
| CNC | Emc | | NE | Bbl | 30 | SATC | Eml | |
| CORS | Ctr | | NE-1 | Fmc | | SATD | Eml | |
| CR | Ctr | 30 | NS | Bbl | 30 | SBRS | Fml | |
| CR-1 | Ebl | | NS-1 | Ebl | | SC | Ebr | 30 |
| CR-2 | Etl | | PB1 | Fbr | 25 | SC-1- | | |
| CR-3 | Emc | | PB2 | Fbr | 25 | SC-9 | Cc | |
| CSNA | Etl | | PB3 | Fbr | 25 | SC-10 | Ctc | |
| CSTM | Etl | | PCS | Dbr | | SCM | Ebc | |
| CSTS | Etl | | PLB | Emc | | SD1- | | |
| CTS | Etl | | PM10 | Cmr | | SD27 | Fr | 25 |
| CTSS | Etl | | PM19 | Ctr | | SF1- | | |
| D1 | At | | PM20 | Cmr | | SF27 | B | 31 |
| DCM | Ebl | | PPD | Emc | | SH | Fmc | 20 |
| DDS | Ebr | 6,7 | PR1 | Am | 30 | SH-1 | Ftc | |
| DIS | Ebl | | PR2 | Ab | 20 | SH-2 | Ftc | |
| DL1 | Ab | 26 | PS1 | Fmc | 25 | SH-3 | Ctc | |
| DL2 | Ab | 26 | PS2 | Fmc | 25 | SH-4 | Ftr | |
| DL3 | Ab | 26 | PS3 | Fmc | 25 | SH-5 | Etr | |
| DR | Ebr | 30 | PSX1 | Cbr | | SKE | Ebl | |
| DR-1 | Ebc | | PSX2 | Cbr | | SM | Ab | 5,20 |
| DR-2 | Ebl | | PSX3 | Cbr | | SPR | Cmc | 30 |
| DR-3 | Ebr | | PSY1- | | | SPR-1 | Am | |
| DR-4 | Ebr | | PSY9 | Cl | | SPS-1 | Ctr | |
| DRS | Ftc | 6,7 | RA | Bbl | 30 | SPS-2 | Ebl | |
| DT | Bbc | 30 | RA-1 | Eml | | SR | Ebl | 30 |
| DT-1 | Etl | | RD1 | Emr | 31,33 | SR-1 | Ebr | |
| DT-2 | Emc | | RD2 | Emr | 31,33 | SR-2 | Fbc | |
| DT-3 | Ebl | | RD3 | Emr | 31,33 | SR-3 | Fmc | |

Fig. 36.

April 25, 1961 A. J. FETTIG ET AL 2,981,421

DOCUMENT SORTING APPARATUS

Original Filed Dec. 26, 1957 32 Sheets-Sheet 32

| REF. | CCT. | MEC.FIGS. |
|---|---|---|
| SS | Fbc | 20 |
| SS-1 | Fbc | |
| SS-2 | Fmc | |
| SS-3 | Ftr | |
| SS-4 | Ftr | |
| SS-5 | Ftr | |
| SS-6 | Etc | |
| ST19 | Ctr | |
| STSB | Emr | |
| STSC | Emr | |
| STSD | Emr | |
| STX1 | Cmr | |
| STX2 | Cmr | |
| STX3 | Cmr | |
| STY1- | | |
| STY9 | El | |
| SX1- | Ctc | |
| SX3 | Cmc | 20 |
| SX1-1 | Ctc | |
| SX3-1 | Cmc | |
| SX1-2- | | |
| SX3-2 | Fbl | |
| SX1-3 | | |
| SX3-3 | Fbr | |
| SX1-4 | | |
| SX3-4 | Ftr | |
| SX1-5 | Etc | |
| SX3-5 | Etr | |
| SX1-6- | | |
| SX3-6 | Ab | |
| SXM1 | Cmr | |
| SXM2 | Cmr | |
| SXM3 | Cmr | |

| REF. | CCT. | MEC.FIGS. |
|---|---|---|
| SXS1 | Ctr | |
| SXS2 | Ctr | |
| SXS3 | Ctr | |
| SY1- | | |
| SY9 | Cc | 20 |
| SY1-1- | | |
| SY9-1 | Cc | |
| SY1-2- | | |
| SY9-2 | Ftl | |
| SY1-3- | | |
| SY9-3 | Fml | |
| SY1-4 | | |
| SY9-4 | Fbl | |
| SYS1- | | |
| SYS9 | Cl | |
| TL | At | 33 |
| TPM | At | |
| TPS | At | |
| TR | Fmr | 20 |
| TR-1 | Ftr | |
| TR-2 | Etr | |
| TR-3 | Ebr | |
| TR-4 | Fbr | |
| TR-5 | Ftl | |
| TS1A | Fmc | |
| TS1B | Fbc | |
| TS2A | Ftc | |
| TS2B | Ftr | |
| TS3A | Ftl | |
| TS3B | Ebl | |
| TS4A | Ebr | |
| TS4B | Etc | |
| TS5A | Emr | |

| REF. | CCT. | MEC.FIGS. |
|---|---|---|
| TS5B | Emr | |
| TS6 | Etr | |
| TS7A | Ebc | |
| TS7B | Ebc | |
| TS8 | Ctc | |
| X1 | Ctr | 30 |
| X1-1 | | |
| X1-9 | Br | |
| X1-10 | Cmr | |
| X1-11 | Ctc | |
| X2 | Ctr | 30 |
| X2-1- | | |
| X2-9 | Br | |
| X2-10 | Cmr | |
| X2-11 | Ctc | |
| X3 | Ctr | 30 |
| X3-1- | | |
| X3-9 | Br | |
| X3-10 | Cmc | |
| X3-11 | Cmc | |
| XR1- | | |
| XR3 | Cmr | |
| XR1-1 | | |
| XR3-1 | Cbr | |
| XR1-2 | | |
| XR3-2 | Ebr | |
| XR1-3- | | |
| XR3-3 | Eml | |
| XR1-4 | | |
| XR3-4 | Eml | |
| ZE3- | | |
| ZE10 | Cr | |

Fig. 36A.

2,981,421

DOCUMENT SORTING APPARATUS

Arthur J. Fettig, Birmingham, Don M. Jenks, Ferndale, Charles Lasdine, Detroit, Earl P. Maidment, Royal Oak, and Byron A. Runde, Farmington, Mich., assignors to Burroughs Corporation, Detroit, Mich., a corporation of Michigan Original application Dec. 26, 1957, Ser. No. 705,443. Divided and this application June 24, 1959, Ser. No. 822,478

23 Claims. (Cl. 214—11)

This invention relates to improvements in document sorting apparatus and more particularly sorting apparatus adapted to be used in conjunction with computing and recording apparatus in performing accounting work which requires the sorting of documents such as checks, bills, charge memos, or other posting media.

The invention is of great utility in any work requiring the rapid sorting of documents and is especially suited for use in the sorting apparatus of the accounting system disclosed in our original application Serial No. 705,433, filed December 26, 1957, of which the present application is a division.

An object of the invention is to provide an improved sorting apparatus for the rapid sorting of documents from a single document receiver to respective selected ones of a plurality of sorted document collecting bins.

A further object of the invention is to provide an improved document sorting apparatus having sorted document bins provided with packer means for securing orderly and compact stacking of the sorted documents collected in a bin.

A further object is to provide an improved sorting apparatus having a number of sorted document collecting bins and provided with means to warn the operator when the stack of sorted documents collected in a bin has reached a predetermined size.

A preferred embodiment of the invention is shown by way of example in the accompanying drawings in which:

Figs. 36 and 36A are an index of control circuit components showing, by means of the latter designations A to F of Figs. 34A to 34F and the area letter designations in Fig. 35, the location of the listed circuit components in the circuit diagram and further indicating the figures of mechanical drawings in which the components are also illustrated.

Figure 1:
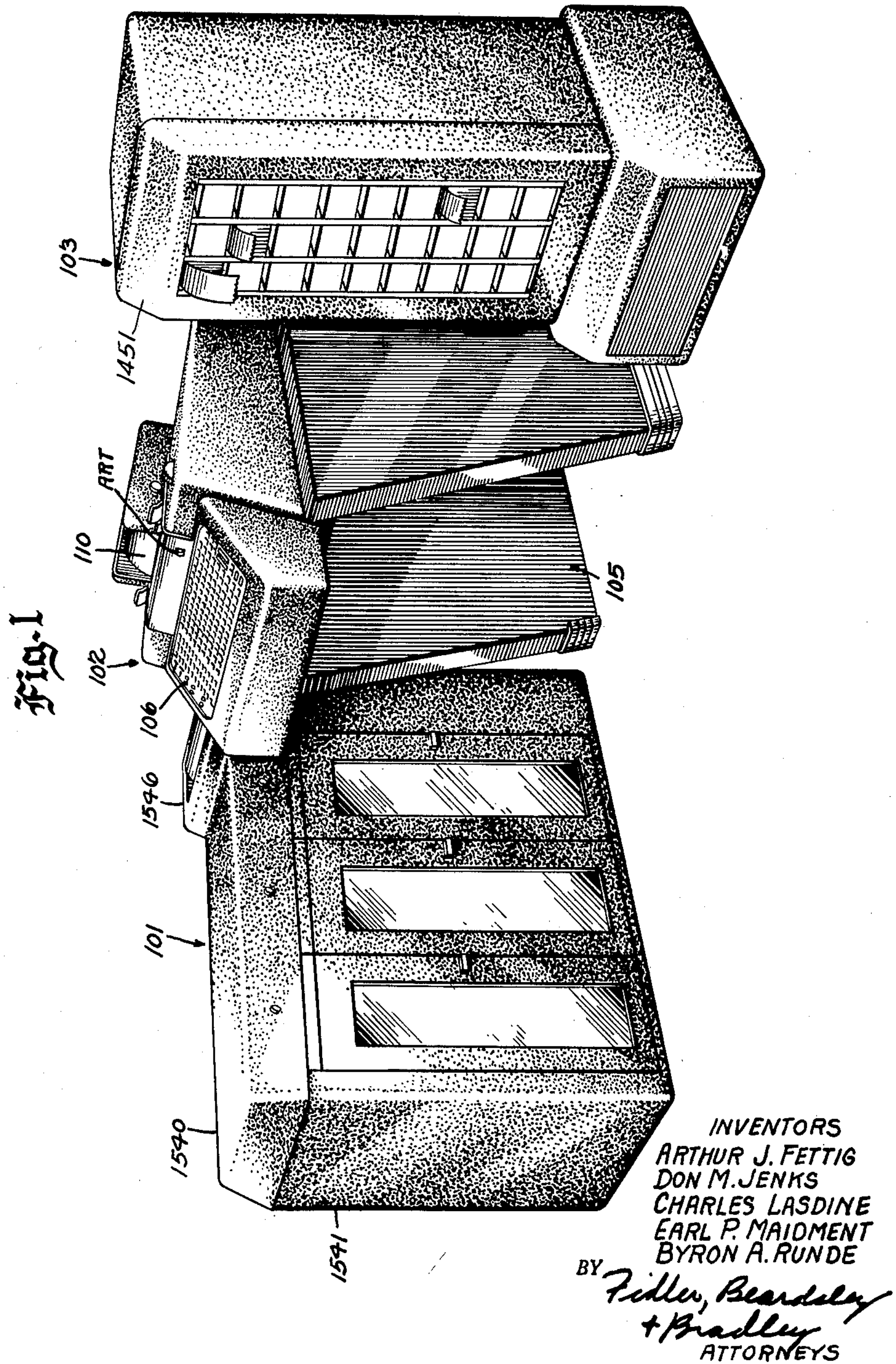
Fig. 1 shows in perspective a sorter unit in accordance with the present invention as employed in an accounting system including a master accounting machine and a multiple tape printing unit also shown.

In this specification, the terms clockwise and counterclockwise will be employed uniformly as denoting the directions of rotary or arcuate movements as viewed from the tops, fronts or right sides of the machine units which are viewed from a point forwardly, rightwardly and above them in Fig. 1. All other terms denoting directions of movements and relative positions of parts will be employed to describe such positions and movements as viewed from in front of the machine units.

An accounting system and apparatus in which the illustrated preferred embodiment is especially adapted to be used is described in detail in the above-mentioned original application Ser. No. 705,443, which also describes in detail an example of work adapted to be performed by said system and apparatus and involving the sorting of documents, specifically bank checks and other media involved in bank proof, clearing and settlement operations. As embodied in that system the sorting apparatus is constructed as a unit 101 (Fig. 1) constructed as shown in detail in Figs. 3 to 30.

*Frame and casing*

Figure 3:
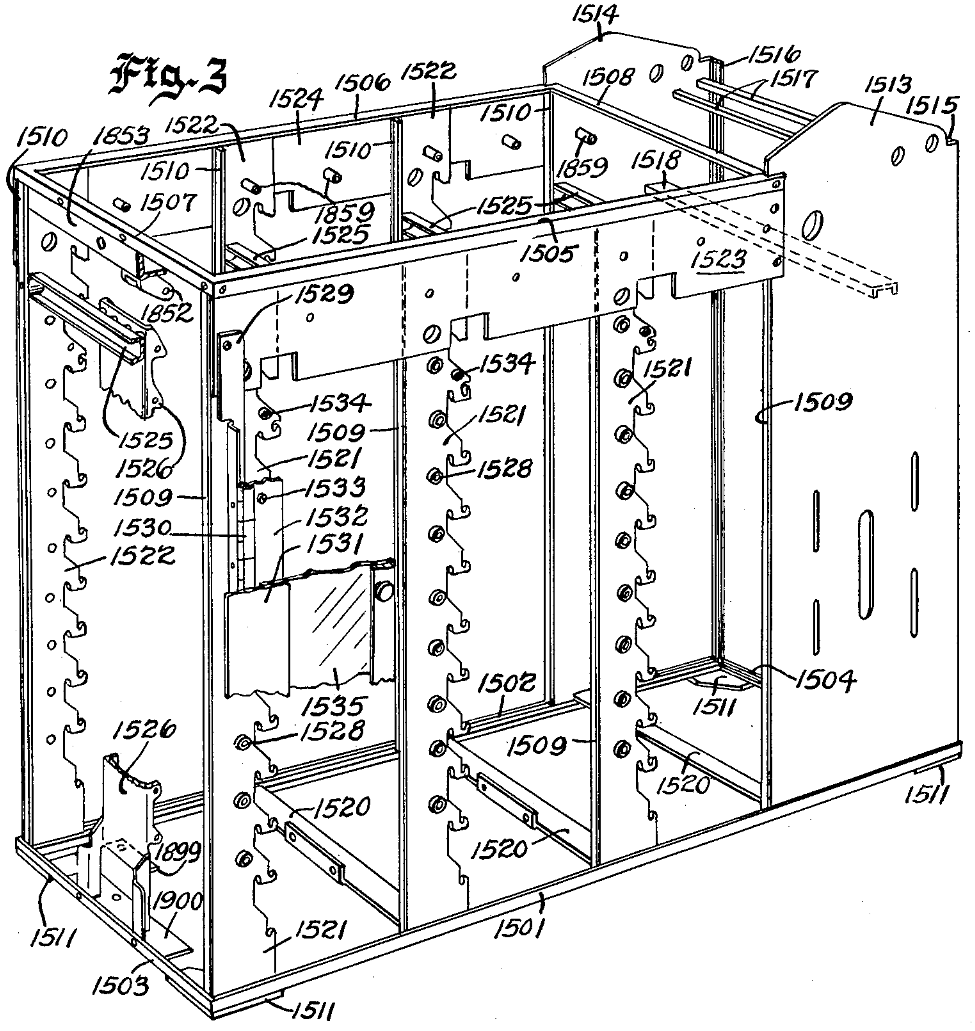
Fig. 3 illustrates the main frame of the sorter unit.
Figure 5:
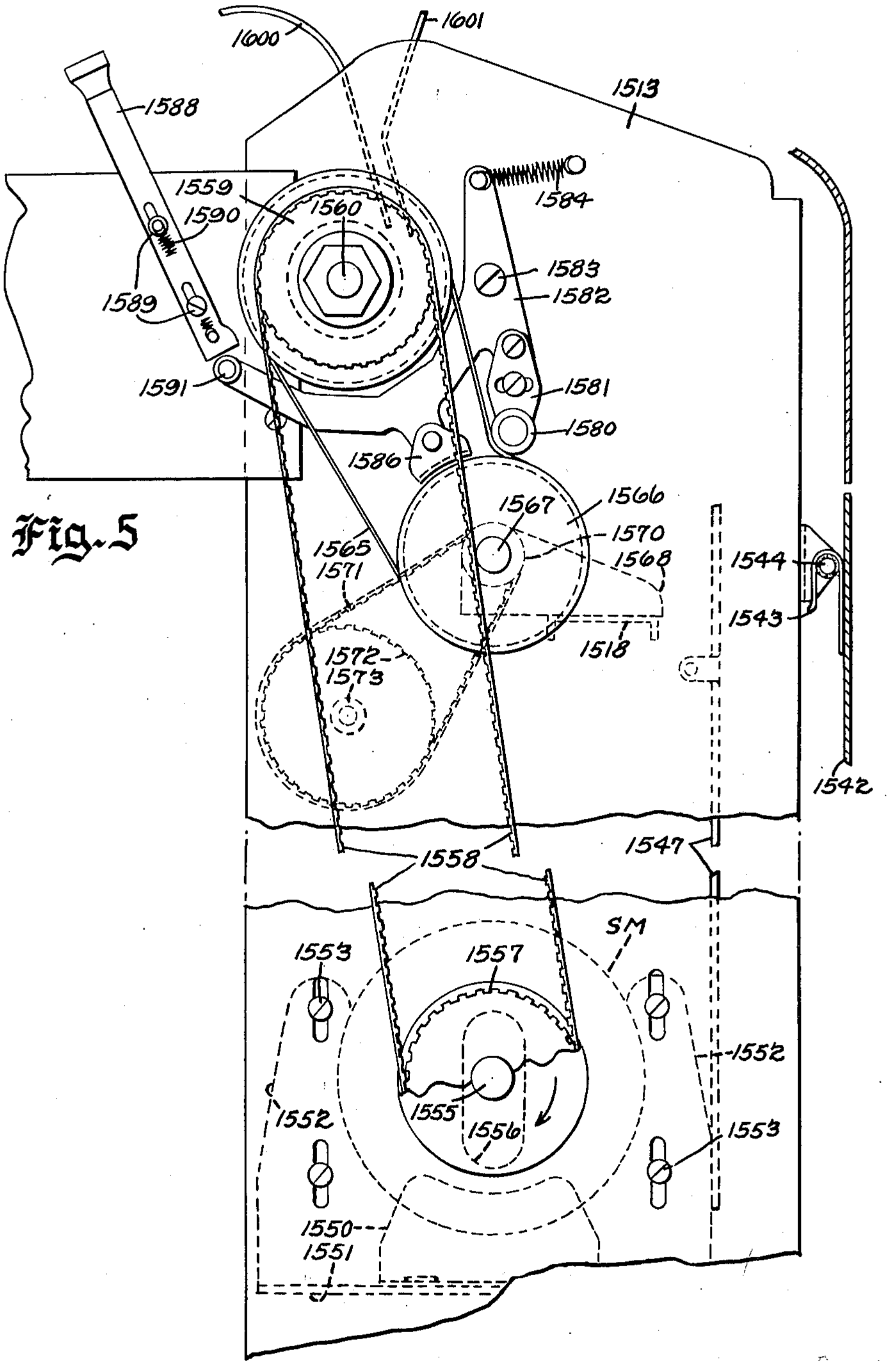
Fig. 5 is a right side elevation of a portion of the sorter unit showing the arrangement of the motor and drive pulleys and belts.

The sorting machine frame as shown in Fig. 3 comprises a rectangular base frame formed of right and left side members 1501 and 1502 and front and rear end members 1503 and 1504 and a rectangular top frame composed of right and left side members 1505 and 1506 joined to front and rear end members 1507 and 1508. The top and bottom frames are joined on the right side by four upright frame members 1509 and on the left side by four upright frame members 1510. All of the frame members 1501 to 1510 are preferably L-angle members secured together in any suitable manner, and the members of the lower frame may be braced by corner plates 1511. The bottom frame 1501–1504 extends rearwardly beyond the rear end of the top frame 1505–1508 and the bottom edges of upright right and left side plates 1513 and 1514 are secured to the rear portions of the right and left side of bottom frame members 1501 and 1502, respectively. The front edges of the side plates 1513 and 1514 are secured to the rearmost upright members 1509 and 1510, respectively. Upright angle members 1515 and 1516 are secured at their lower ends to the right and left rear corners of the bottom frame and are also secured against the inward surfaces of the plates 1513 and 1514, respectively, along the rear edges of those plates. At their upper portions the side plates 1513 and 1514 are also connected together by a pair of cross bars 1517 and by another transverse member 1518 of inverted channel section. The bottom frame side members 1501 and 1502 are also connected together by three horizontal transverse plates 1520.

On the right side of the frame, three vertical plates 1521 are secured at their upper and lower ends to the top and bottom frame members 1505 and 1501, respectively, and are secured also to respective ones of the upright members 1509 on the outer sides thereof. At the left side of the frame, three similar plates 1522 are similarly secured to the frame members 1502, 1506 and 1510.

On the right side of the frame immediately below the top frame member 1505, an upper side plate 1523 is connected to the upper portions of each of the plates 1521 and is also connected at its rearward end to the side plate 1513. At the left side of the machine a plate 1524 similar to the plate 1523 is similarly mounted on the upper portions of the plates 1522 and connected at its rear end to the plate 1514.

Each of the pairs of uprights 1509 and 1510 supports the opposite ends of a respective one of four transverse channel members 1525. A front vertically extending member 1526 is secured at its upper end to the rear side of the front transverse channel member 1525 and is formed at the opposite sides of its lower portion with forwardly and outwardly bent flange portions which are secured to the inner side of the upright flange of the front bottom frame member 1503. Two further vertical members 1526 are similarly secured at their upper ends to the next two transverse channel members 1525 and at their lower ends to upright flanges on the forward edges of the foremost two plates 1520.

On the right side of the frame three vertical members 1529 parallel to the foremost three uprights 1509 are secured by screws to a series of threaded bushings 1528 which are secured in the plates 1521. Each of these three members 1529 has an outwardly turned flange to which is secured one leaf of a piano hinge 1530, the other leaf of which is divided into a number of sections, alternate ones of which are secured respectively to the inner face of one side of a metal door frame 1531 and to the outer side of an upright plate 1532. Outward swinging movement of the plate 1532 is normally prevented by a plurality of screws 1533 passing through the plate 1532 and into bushings 1534 secured in the plate 1521. The plate 1532 normally conceals certain mechanical elements hereinafter described, but after opening the door 1531 and removal of the screws 1533, the plate 1532 may be swung outward to permit access to such elements for mechanical servicing. The same hinge 1530 thus serves to mount both the plate 1532 and the door 1531 for opening and closing movement of the door independently of movement of the plate 1532. Each metal door frame plate 1531 has a large aperture closed by a transparent plastic window plate 1535.

Each of the three doors 1531 on the right side of the sorter unit is yieldingly releasably retained in closed position by a plate 1536 secured to the rear edge of the door frame and supporting a door handle or knob 1537 (Fig. 11) and having an inwardly turned and apertured flange positioned to cooperate with a yielding detent 1538 carried on a bracket 1539 secured to the inwardly turned flange of the next rearward member 1509.

The left side of the sorter unit may be provided with three similarly mounted doors directly opposite the three doors on the right side or may be completely closed by a single casing member.

Apart from the doors 1531, the sorter unit is enclosed by a multiple panel casing as shown in Figure 1, comprising a top cover member 1540 spaced upwardly from and removably secured to the top frame member 1505–1508 by screws passing through the panel 1540 through spacing collars and into the horizontal flanges of said frames. The casing also comprises a front panel 1541 (Fig. 1), and a rear panel 1542 (Fig. 5), both provided on their inner sides adjacent their lateral edges with hooks 1543 (Fig. 5) engageable over studs 1544 supported on brackets secured to the upright members 1509 and 1510 at the front or to the upright members 1515 and 1516 at the rear. On the right side of the sorter unit, the space between the top edges of the doors 1531 and the edge of the top panel 1540 is enclosed by a further panel member 1545 (Fig. 19) removably secured to the frame, and if the doors are provided on the left side of the machine, a similar casing panel member may be provided above the latter doors. The upper rear portion of the sorter unit is enclosed by a rear top casing member 1546 (Fig. 1) extending across and above the upper ends of the frame plates 1513 and 1514 and provided with a suitable slot to accommodate a document inserting chute which will be described more particularly hereinafter.

An upright plate 1547 (Figs. 5 and 20) extending transversely between the frame plates 1513 and 1514 and secured to the rearward portion of each of the latter by screws passing through forwardly turned lugs on the lateral edges of said plate supports a number of relays, resistors and other circuit elements as described more particularly hereinafter.

*Power drive*

The sorter is driven by an electric motor SM (Fig. 5), the base member 1550 of which is secured to a transverse plate 1551 having at each end a pair of upstanding straps 1552 secured to the respective one of the plates 1513 and 1514 by screws 1553 passing through vertically elongated slots and in the plate 1513 or 1514 and threaded into said straps. The motor shaft 1555 extends rightwardly through a vertically elongated opening 1556 in the plate 1513 and has secured thereto, outwardly of the plate 1513, a pulley 1557. A belt 1558 passes around the pulley 1557 and around the smaller diameter portion of a double pulley 1559 which is freely rotatably mounted on the rightward end of a shaft 1560 which passes freely through an opening in the plate 1513. The shaft 1560 is journaled near its rightward end in a bearing 1561 (Fig. 12) mounted in a bracket 1562 supported on the inner side of the plate 1513 and in spaced relation thereto by posts 1563. The leftward end portion of the shaft 1560 extends through and is journaled in a bearing (not shown) mounted in the left side plate 1514.

A belt 1565 passing around the larger diameter portion of the pulley 1559 also passes around a pulley 1566 secured on the outer end of a short shaft 1567 which is journaled in a bearing in the plate 1513 and in a second bearing mounted on a bracket 1568 mounted on the transverse frame member 1518 a short distance from the plate 1513. A small pulley 1570 is secured on the shaft 1567 adjacent the bracket 1568. A belt 1571 passes around the pulley 1570 and around the large pulley 1572 secured on the rightward end of a tubular shaft 1573 which is journaled in bearings in forwardly and downwardly extending portions of a pair of upper side plates 1575 and 1576 (Fig. 6) of the frame of an endorser unit described in detail hereinafter, the plates 1575 and 1576 being secured to the transverse frame member 1518 and to the front one of the two cross bars 1517. The left end of the hollow shaft 1573 extends through and is journaled in a bearing mounted in the left side plate 1514.

The belts 1558 and 1571 are of the toothed variety such as those which are known as "Timing" belts and the pulleys 1557, 1570 and 1572 and the smaller diameter portion of the pulley 1559 are toothed complementarily to the belts 1558 and 1571. The pulley 1566 and the larger diameter portion of the pulley 1559 are non-toothed and the belt 1565 is of the common flat, smooth variety and is normally maintained under tension by an idler roller 1580 mounted on a bracket 1581 which is adjustably mounted on a rear downward arm of a three-armed lever 1582 pivotally mounted on a shouldered screw stud 1583 secured in and extending rightwardly from the plate 1513. A tension spring 1584 anchored at its rearward end on a stud secured in the plate 1513 is connected at its forward end to a stud secured in the upper arm of the lever 1582 so as normally to press the idler roll 1580 against the belt 1565 to maintain the latter under drive tension around the pulleys 1566 and 1559. A forward arm of the lever 1582 pivotally supports a brake shoe 1586 which is normally spaced slightly away from the pulley 1566.

The stem of a manipulative key 1588 is slidably mounted on studs 1589 secured in the outer face of the plate 1513 and extending through longitudinal slots in the stem of the key. A tension spring 1590 connected at its lower end to a stud secured in the key stem and at its upper end to one of the studs 1589 normally maintains the key in elevated position. A roller 1591 mounted on a stud secured in the forward end of the forward arm of the lever 1582 is located under the lower end of the stem of the key 1588 so that by depression of the key 1588 the lever 1582 will be rocked counterclockwise against the tension of the spring 1584 to press the brake shoe 1586 against the pulley 1566 to arrest the latter as the idler roller 1580 slackens the belt 1565 to permit the latter to slip on the pulleys 1566 and 1559 for a purpose which will be described fully hereinafter.

The power circuit of the motor SM, as will be explained more fully hereinafter, is normally closed continuously while the sorter is in use so that the motor and the pulley 1559 are continuously running and the shafts 1567 and 1573 also run continuously except while the key 1588 is held depressed.

*Document insertion*

Figure 6:
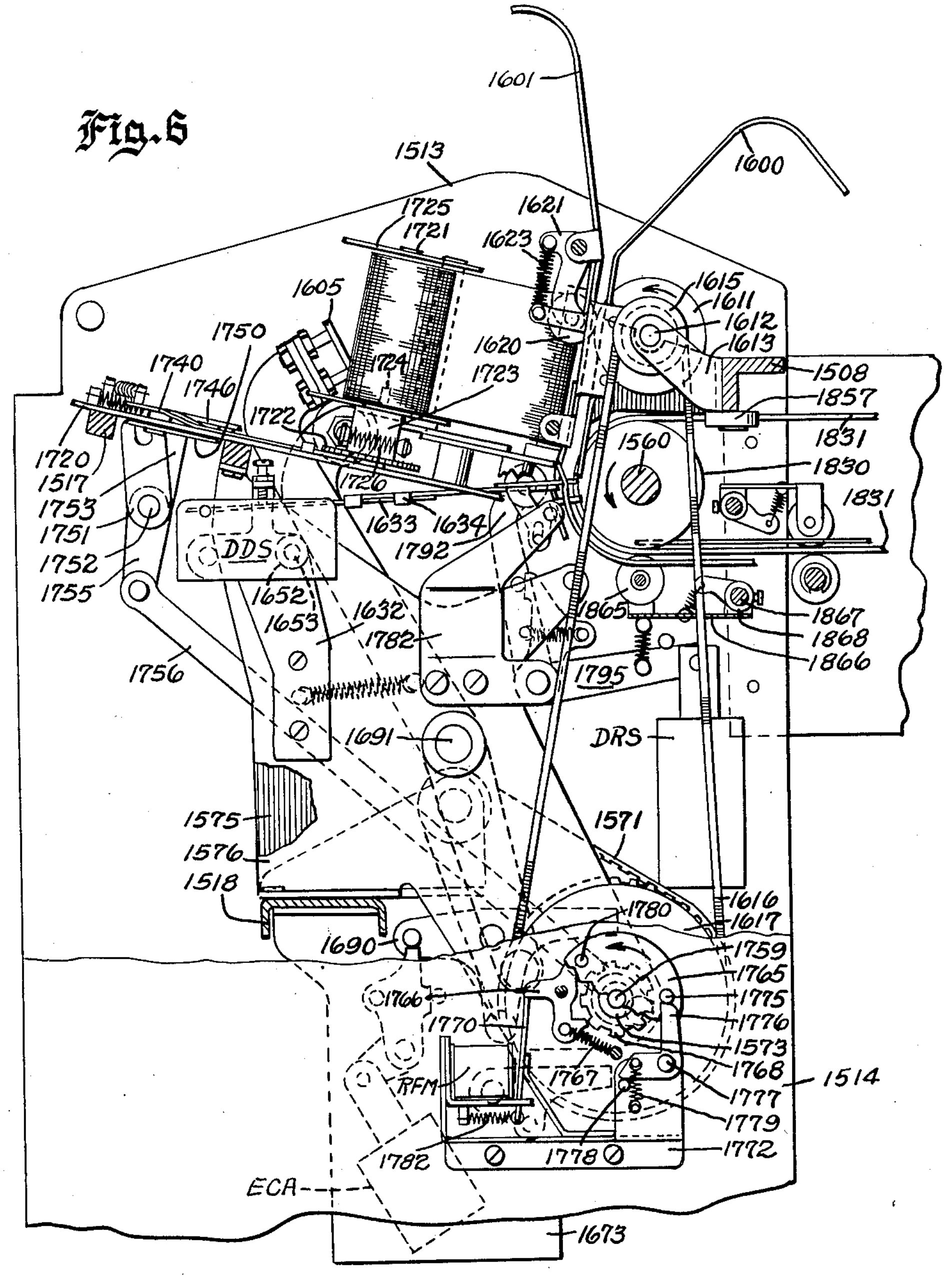
Fig. 6 is a partial vertical section of a portion of the sorter unit showing the document receiving chute, the document detecting switches and endorser mechanisms.
Figures 7, 8:
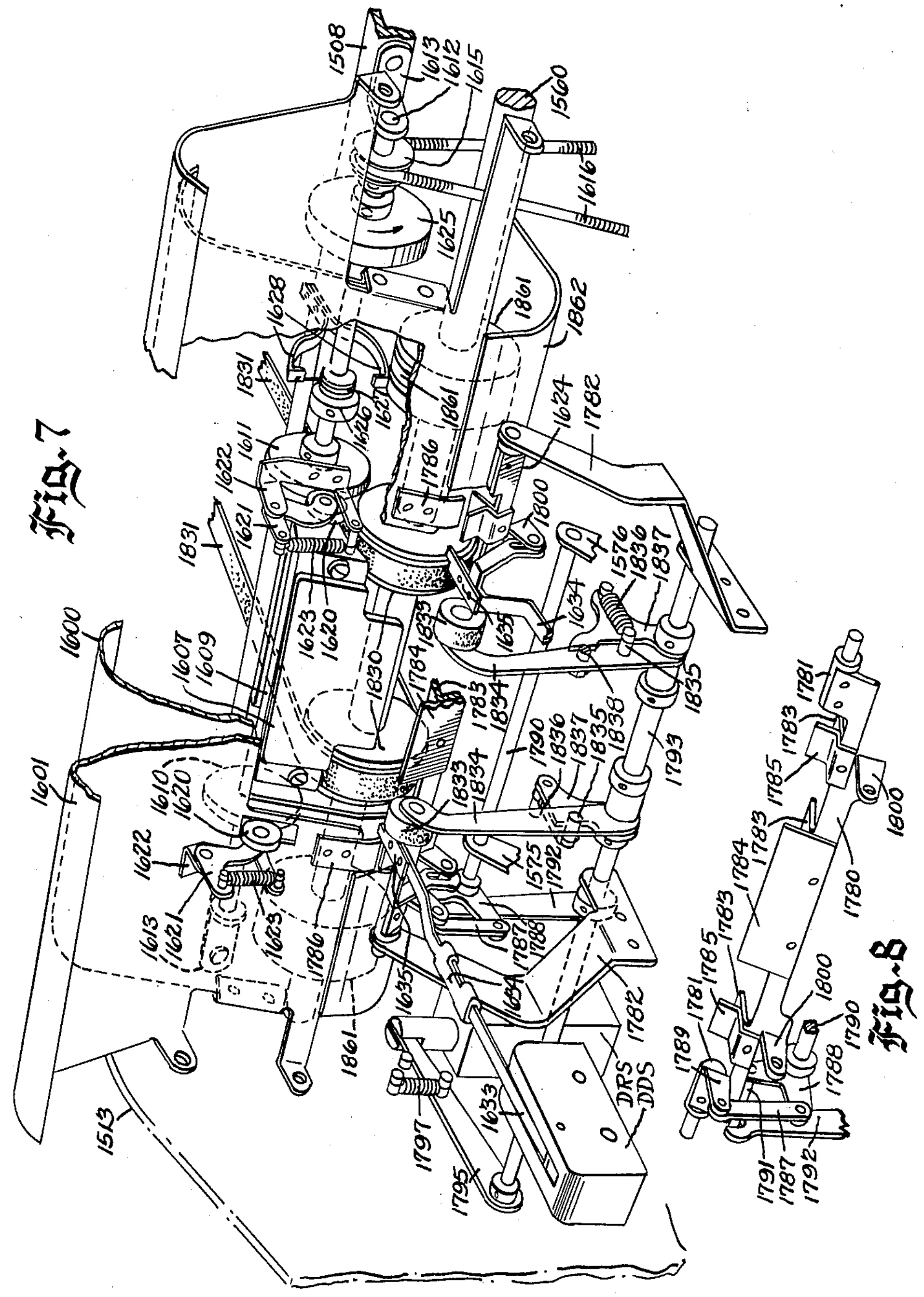
Fig. 7 is a perspective of portions of the document chute and elements associated therewith as viewed from the left and rear.
Fig. 8 is a detail in perspective of the document stop means associated with the document chute.

A document insertion chute is provided between a pair of formed plates 1600 and 1601 (Figs. 6 and 7), which as shown in Fig. 7, are secured together by securing elements passing through forwardly bent lateral flanges of both plates. Rearwardly bent portions of lateral lugs of the rear plate 1601 are secured to the plates 1513 and 1514 by screws (not shown) passing through said lugs and threaded into said plates. The central lower portions of both plates 1600 and 1601 are formed with rectangular cut-outs sufficiently large to accommodate a printing plate 1605 (Figs. 6 and 9), a line of printing type wheels 1606, and a printing platen 1607 of an endorsing mechanism described in detail hereinafter. The platen 1607 consists of a plate of resilient material and is mounted on the rear face of a block 1609 which is supported on the transverse frame member 1508 so that the rear face of the platen 1607 is slightly forward of the plane of the rear surface of the plate 1601. The printing plate 1605 and type wheels 1606 are normally retracted rearwardly of the plate 1600.

On opposite sides of the opening for the printing elements, the plate 1600 is formed with small apertures to accommodate the rearward portions of respective ones of two smooth surfaced narrow metal friction feed rollers 1610 and 1611, both secured on a shaft 1612, the opposite ends of which are retained in and rotatably supported by small brackets 1613 mounted on the transverse frame member 1508. A pulley 1615 secured on the shaft 1612 near its leftward end is driven by a tensioned coiled spring belt 1616 which also runs around a pulley 1617 (Fig. 6) secured on the hollow shaft 1573 near the inner face of the left frame plate 1514 so that the shaft 1612 and rollers 1610 and 1611 are normally continuously driven in the direction of the arrows in Figs. 6 and 7.

Opposite the rollers 1610 and 1611, the rear plate 1601 of the document chute is formed with small apertures to accommodate small pressure rollers 1620, each of which is rotatably mounted on a stud secured in a bell crank 1621 which is pivotally mounted on a stud carried by a small angle bracket 1622 secured to the plate 1601 on the rear side thereof. Each of two tension springs 1623 is connected at its upper end to a stud in the rearward arm of a respective one of the bell cranks 1621 and at its lower end to a stud secured in a rearward projection of the associated bracket 1622 and normally holds the respective one of the rollers 1620 pressed forwardly against the adjacent feed roller 1610 or 1611.

When a document such as a check is dropped into the chute between the plates 1600 and 1601 it falls into the bight of each of the pairs of rolls 1610, 1611 and 1620 and is rapidly fed downwardly by the constantly driven rollers 1610 and 1611 until the lower edge of the check rests on a stop member 1624 (Fig. 7) adjacent the roller edge of the chute. When the feed of the document is thus arrested by the stop member 1624 the rollers 1610 and 1611 slip on the document because of the smooth document engaging peripheries of those rollers. The inserted document is thus held in position in the chute until, as hereinafter described in detail, it is either released from the stop 1624 at a predetermined time in a sorting operation cycle or ejected prior to that time.

*Document ejecting means*

It may happen now and then that an operator, after having dropped a check or other document into the chute, will wish to re-examine it before it is sorted. When the check is resting on the stop member 1624, the operator is unable to grasp it by inserting the fingers into the chute. However, it is only necessary to depress the document ejecting key 1588 (Fig. 5) to cause the check to be returned upwardly in the chute to a position where the operator may easily grasp it between the fingers and remove it from the chute for re-examination.

A flywheel 1625 is secured on the shaft 1612 just inwardly of the pulley 1615. Inwardly of the flywheel a hub 1626 is secured on the shaft 1612, said hub having a portion of reduced diameter about which a coil spring 1627 is wound. The coils of the spring 1627 are of sufficiently small diameter so that they exert some pressure radially against the hub 1626. One end of the coil spring extends tangentially so that as the shaft 1612 rotates, such end of the spring normally bears against the upper one of two stop members 1628, both secured to the transverse frame member 1508. The direction in which the spring 1627 is wound about the hub 1626 is such that the normal rotation of the hub 1626, while the projecting end of the spring is stopped by the upper stop member 1628, tends to expand the coils of the spring so that the spring slips on the hub as the latter rotates.

When the document ejecting key is depressed the brake 1586 (Fig. 5) will arrest the pulley 1566 and thus also arrest the shafts 1567 and 1573 together with the pulley 1572 and the pulley 1617 (Fig. 6) on the latter shaft. However, the inertia of the shaft 1612 and the parts secured thereto and rotating therewith, and particularly the inertia of the flywheel 1625, will cause the shaft 1612 to rotate a revolution or so further and reverse the relative tensions in the two spans of the coiled spring belt 1616 so that the forward span is considerably stretched and the rearward span is permitted to contract to a substantial extent. When the shaft 1612 and pulley 1615 and the feed rollers 1610 and 1611 come to rest, the tension which has been produced in the forward span of the spring 1616 in bringing the shaft 1612 to rest then reverses the shaft and drives it in the direction reverse to that of the arrows in Figs. 6 and 7 until, after one-half revolution of the shaft 1612 in the reverse direction, the projecting end of the spring 1627 encounters the lower stop member 1628 which causes the spring 1627 to be tightened about the hub 1626 and arrest shaft 1612, together with the feed rollers 1610 and 1611 thereon. The one-half rotation of the feed rollers 1610 and 1611 in the reverse direction is adequate to lift the document sufficiently high in the chute to permit the operator easily to grasp it between the fingers and remove it from the chute.

Unless the document ejecting key 1588 is depressed, the inserted document will remain in the chute resting upon the stop 1624 until a sorting operation cycle has been initiated and has proceeded to a predetermined point. A sorting operation cycle can be initiated only while a document is present in the chute ready for sorting. Except when conditioned for a non-sort operation, the cycling control circuit, as hereinafter described in detail, is controlled in part by a pair of switches DDS (Figs. 6 and 7), each mounted on a respective one of two brackets 1632 (one shown in Fig. 6), each secured to the outward face of a respective one of the endorser frame side plates 1575 and 1576. Each switch DDS has a forwardly extending operating arm 1633 on the forward end of which an arm extension 1634 is forwardly and rearwardly slidably mounted. On the forward part of each extension member 1634 there is secured a finger 1635 which extends across the chute through the large central cut-outs in the lower portions of the chute plates 1600 and 1601 adjacent one or the other side of such opening and normally in such position relative to the document stop member 1624, that as a document is moved by the rollers 1610 and 1611 into engagement with the stop 1624, the lower edge of the document will also engage and depress both document feeler fingers 1635 and likewise depress both extensions 1634 and both operating arms 1633 to operate both switches DDS to closed condition. It may be mentioned here that as the two switches DDS are connected in series in the cycling control circuit, a document in the chute must be properly positioned to close both switches before a sorting cycle can be initiated.

*Endorsing means*

Figure 9:
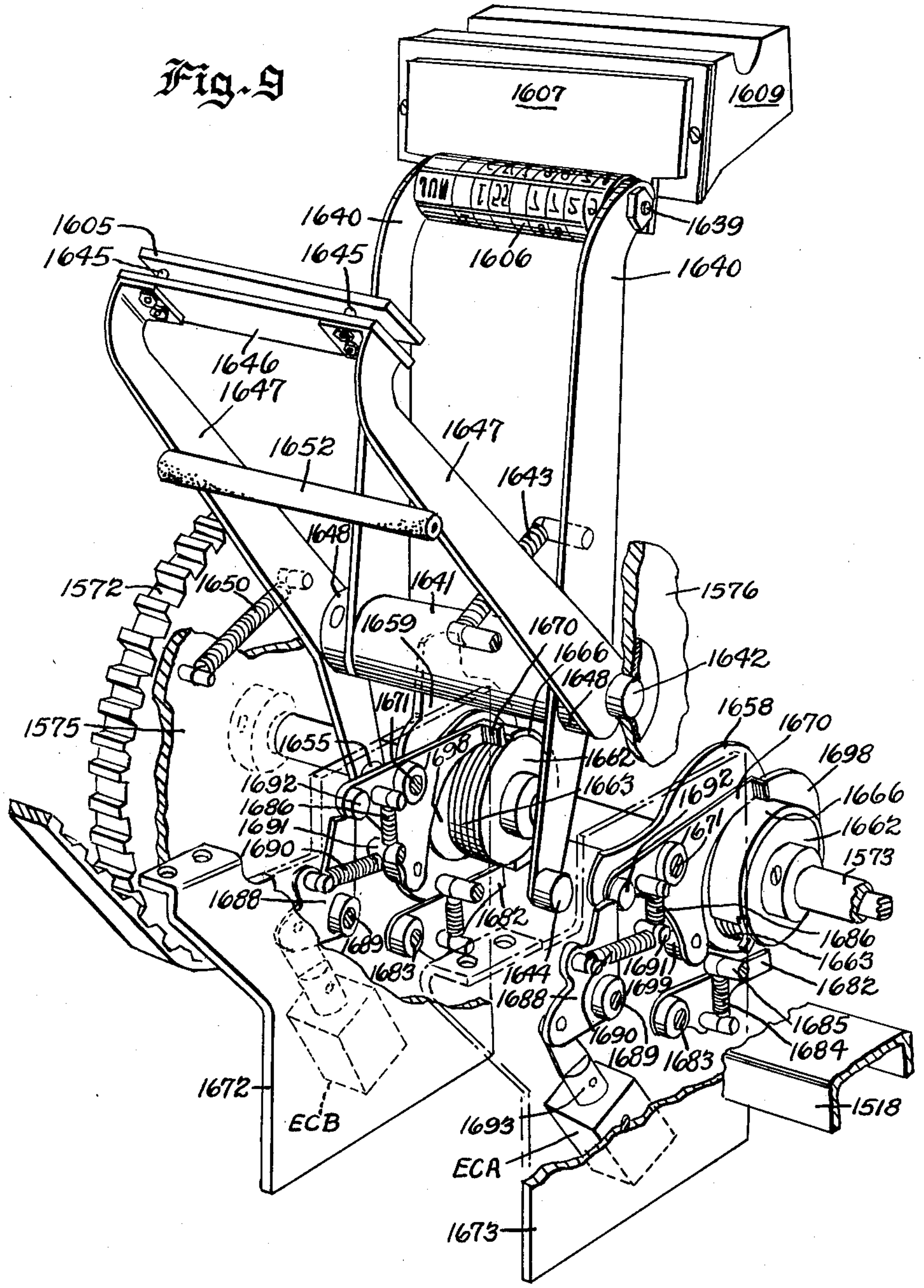
Fig. 9 shows, in perspective, the operating means for the endorsers.

When a sorting cycle is initiated, the inserted document is not immediately fed from the chute 1600, 1601, but is retained therein for a brief but sufficient time to permit an endorsing means to be operated to print a partial or a full endorsement on the back of the document while the latter is still in the chute and in back of the platen plate 1607. The endorsing mechanism is best shown in Fig. 9. One of its two printing devices comprises a line of type wheels 1606 which is operated to print the date and a number when either a full or a partial endorsement is effected and the second printing device comprises the printing plate 1605 which is operated to print non-varying matter including the bank's name and clearing house number and a statement of endorsement when a full endorsement is effected. A shaft 1639 extending through and supporting the line of type wheels 1606 is mounted at its ends in the upper ends of a pair of arms 1640 which at their lower ends are secured to the opposite ends of a sleeve 1641 rotatably mounted on a short shaft 1642 which in turn is rotatably mounted at its ends in the two side plates 1575 and 1576. The type wheels 1606 and the arms 1640 supporting them are normally held in retracted position by a tension spring 1643 connected to a stud secured in the left-hand arm 1640 and to a stud secured in the plate 1576. The left-hand arm 1640 has a downward extension carrying roller stud 1644 which is engageable by an actuating cam 1658, as hereinafter described, for impelling the type wheels 1606 toward the platen.

The second printing device consisting of the plate 1605 for printing the bank's name, clearing house number and statement of endorsement is adjustably mounted by means of four screws 1645 near its four corners on the member 1646 extending across and secured to the upper ends of two arms 1647, each rigidly secured on an individual bushing 1648 pinned on the shaft 1642. The plate 1605 is normally held in a retracted condition by a spring 1650 connected between a pin secured in the right hand arm 1647 and a second pin secured in the plate 1575. A sleeve 1652 formed of a suitable elastomer surrounds a metal rod 1653 (Fig. 6) which is secured at its ends in the frame plates 1575 and 1576 and provides a resilient stop against which the arms 1640 and 1647 are normally held by the springs 1643 and 1650. The right hand arm 1647 has a downward extension carrying a lower stud 1655 which is engageable by another cam 1659 for impelling the plate 1605 toward the platen 1607.

Figure 13:
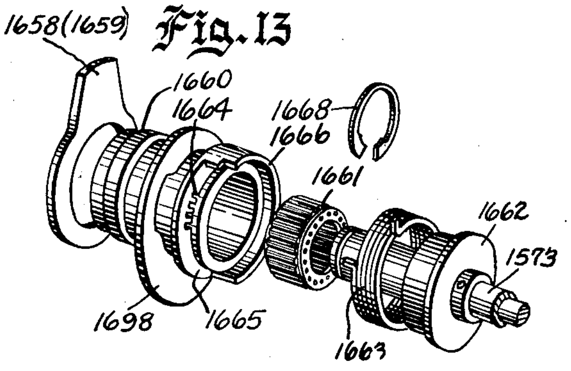
Fig. 13 is a spread perspective of an endorser drive clutch.

The cam 1658 for operating the printing wheels 1606 and the cam 1659 for operating the printing plate 1605 are each operable by a separate clutch mounted on and driven by the constantly running hollow shaft 1573, both clutches being constructed as illustrated in Fig. 13. The printer operating cam 1658 or 1659, as the case may be, is secured upon the rightward end of a sleeve 1660 against an annular shoulder thereon and in fixed angular relation thereto. The sleeve 1660 is rotatably supported by an anti-friction bearing 1661 upon the extended hub of a small drum 1662 which is secured on the hollow shaft 1573 for rotation therewith. A coil spring 1663 is coiled about the drum 1662 and has one end bent in the axial direction to engage in one of a series of apertures 1664 in the inner portion of an annular radial flange 1665 secured on the leftward end portion of the sleeve 1660, as by welding. The other end of the coil spring 1663 is bent outwardly for engagement against one end edge of a half-annular axially extending flange portion 1666 of the flange member 1665. The parts are retained in assembled relation by means of a split spring retaining ring 1668 which is snapped into a groove in the leftward end of the hub of the drum 1662. The parts are so-dimensioned and the spring 1663 is wound in such direction and with its coils of such diameter that the spring tends to move its radially bent end away from the end of the axial flange 1666 and coil itself about the drum 1682 sufficiently tightly to effect driving engagement with the drum 1662 and thus drive the sleeve 1660 and the cam 1658 or 1659 for operating the respective printing device, the rotation of the shaft 1573 and drum 1662 being in the direction to aid such tightening of the coils of the spring. However, the radially bent end of the spring 1663 extends sufficiently radially beyond the flange 1666 so that it is normally engaged by the laterally turned forward end of a respective one of two clutch control levers 1670 pivotally mounted on a stud 1671 secured in and extending leftwardly from the adjacent one of a pair of lower side plates 1672 and 1673 (Figs. 6 and 9) of the endorsing mechanism. The plates 1672 and 1673 are formed at the rear portions of their upper edges with laterally turned lugs which are secured to the underside of the transverse frame member 1518, there being one such control lever for each of the two clutches. When the radially extending end of the spring 1663 is so engaged and arrested by the control lever 1670, one end edge of the flange 1666 is also moved against the end of the control lever by momentum, said edge of the flange 1666 being notched to accommodate the radially bent portion of the spring. As the one end edge of the flange 1666 engages the end of the control lever 1670, the end of a non-return pawl 1682 moves into position behind the other end edge of the flange 1666 to prevent retrograde rotation of the sleeve 1660 by the spring 1663 and re-tightening of the coils of the latter about the drum 1662. Each non-return pawl 1682 is pivotally mounted at its rearward end on a stud 1683 secured in the plate 1672 or 1673 and is yieldingly urged to effective position by a tension spring 1684 connected between a stud secured in the pawl and a stud 1685 which is secured in the plate 1672 or 1673 and serves as a limit stop to prevent the edge of the pawl from making wearing engagement with the coils of the spring 1663.

The control lever 1670 is yieldingly urged upwardly out of the path of the radial end of the spring 1663 by a tension spring 1686 connected between a stud in the rearward arm of the control lever and a stud secured in the plate 1672 or 1673, but is normally retained in effective position to engage the radial end of the spring 1663 and thereby uncouple the clutch by means of a latch bell crank 1688 pivotally mounted on a stud 1689 secured in the plate 1672 or 1673. A tension spring 1690 connected between a stud and the latch bell crank 1688 and a stud 1691 secured in the plate 1672 or 1673 normally yieldingly holds the latch bell crank in a limit position in which its upper arm engages against the stud 1691 and is located under a roller stud 1692 mounted on the rearward arm of the control lever 1670. The rearward arm of the latch bell crank 1688 is pivotally connected to the upper end of a link 1693 which in turn is pivotally connected to one end of the plunger of a respective one of two solenoids ECA and ECB by means of which the two endorsement printing clutches may be individually controlled.

It will be apparent that when the solenoid ECA or ECB is energized, the latch bell crank 1688 for the respective clutch will be rocked to disengage it from the roller stud 1692 and permit the spring 1686 to rock the control lever 1670 out of engagement with the flange 1666 and out of engagement with the radial end of the spring 1663 which thereupon will tighten itself about the drum 1662 and drive the sleeve member 1660 and the cam 1658 or 1659, as the case may be. During the rotation of the cam the rise thereof acts on the roller 1644 or 1655, as the case may be, to enable the respective printing device 1606 or 1605 toward the platen. The rise of the cam is of insufficient height to positively drive the printing device into engagement with the platen 1607 but nevertheless sufficient momentum is imparted to the printing device so that the movement of the printing device toward the platen continues after the roller 1644 or 1655 has moved away from the cam 1658 or 1659 until the printing device strikes against the platen with sufficient impact to effect the desired printing impression. The printing stroke of the printing device is effected in the first half of a rotation of the clutch sleeve 1660. As the clutch sleeve 1660 continues to rotate a rise of a second cam 1698 secured to said sleeve acts on a roller stud 1699 mounted on a downward third arm of the control lever 1670 to rock the control lever back to its normal clutch-uncoupling position and thereby elevate the roller stud 1692 sufficiently to permit the latch bell crank 1688 to be returned to latching position by its spring 1690. The energization of the solenoid ECA or ECB is terminated prior to the time the clutch has rotated sufficiently to restore the control lever 1670 to normal position, and permits the spring 1690 to restore the latch pawl 1688 in time for relatching of the control lever 1670 in its normal position.

*Ink ribbon mechanism*

The ink ribbon mechanism is assembled on a base frame 1720 (Figs. 6 and 10) mounted on the two frame cross bars 1517, said plate having a transversely extending central portion rearward of the pairs of arms 1640 and 1647 carrying the printing devices 1606 and 1605, and two side portions extending forwardly on either side of said pairs of arms. On each of the side portions of the plate 1720, the lower end of a respective one of two upstanding ribbon spool shafts 1721 is secured. Rotatable about each shaft 1721 is a ribbon feed ratchet wheel 1722 having secured to its upper face an inverted U-formed metal strip 1723, the transverse central portion of which is apertured to pass the shaft 1721 and is formed with an upwardly turned lug 1724 (Fig. 6) for engagement in an aperture in the lower end of a ribbon spool 1725 so that the ribbon spool may be rotated by the ratchet wheel.

Rotation of the ribbon spool 1725 and ratchet wheel 1722 about the shaft 1721 is yieldingly resisted by a friction brake device comprising a tension spring 1726 connected at its opposite ends, adjacent one side leg of the U-shaped member 1723, to one end of each of two brake arms 1727, each of which is pivotally supported at its other end in an aperture in the opposite side leg of the member 1723 whereby the central portions of the brake arms 1727 are pressed into frictional engagement with the stationary shaft 1721 by the tension of the spring 1726.

Figure 10:
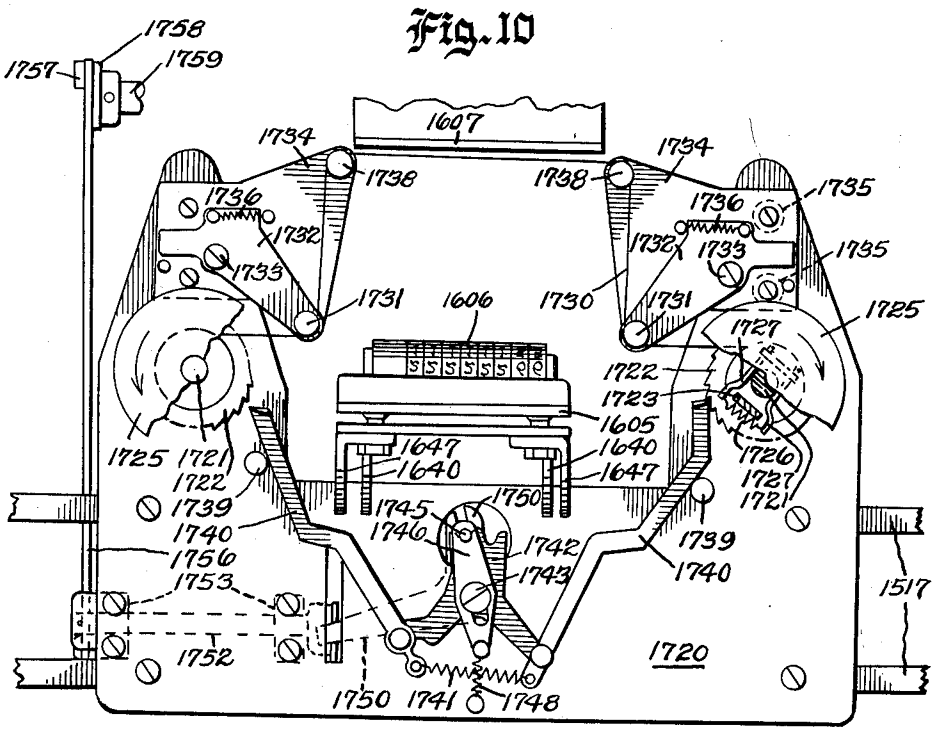
Fig. 10 is a partial top plan of the ink ribbon feeding and reversing mechanism for the endorsers.
Figure 11:
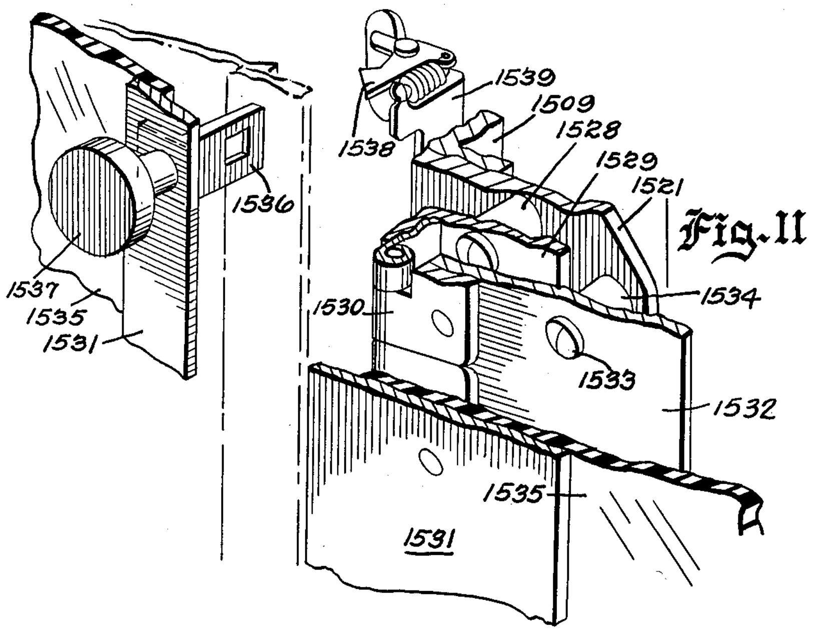
Fig. 11 is a detail of the door mounting and latch means of the sorter unit.

From the ribbon spools 1725, the ink ribbon 1730 extends first around ribbon tensioning guide posts 1731, each mounted at its lower end on one end of a ribbon tensioning lever 1732 which is pivotally mounted on a shouldered screw 1733 secured in the upper side of a small plate 1734 mounted on the upper ends of two posts 1735 extending upwardly from the forward end of a side portion of the base plate 1720. A tension spring 1736 connected between a stud in the plate 1734 and a stud in the lever 1732 urges the latter to move the ribbon tensioning guide post 1731 to a rearward limit as shown in Figure 10. There are two such ribbon tensioning assemblies, one adjacent each ribbon spool on each side portion of the plate 1720.

From the tensioning guide posts 1731 the ribbon 1730 extends forwardly around and between a pair of fixed guide posts 1738, each mounted at its lower end and extending upwardly from a forward inward corner portion of a respective one of the two plates 1734. The stretch of ribbon between the guide post 1738 extends across the central opening in the rear chute plate 1601 rearwardly of the platen 1607 and sufficiently rearwardly of the plate 1601 so as normally not to contact a document inserted in the chute except when driven against the document by one or both printing devices for inking the printing impression.

The ribbon feed is effected by a pair of ratchet pawls 1740, each formed at its forward end with a ratchet tooth to engage a respective one of the ratchet wheels 1722 and each pivotally supported at its rearward end on a stud in a respective one or two rearward arms of a three-armed lever 1742 pivotally mounted on a shouldered screw stud 1743 secured in the upper side of the central portion of the base plate 1720. The drive pawls 1740 extends a short distance rearward of their pivotable connections of the rearward arms of the lever 1742 and are connected by a tension spring 1741 which normally urges the forward portions of the pawls outwardly against guide studs 1739 secured in the base plate 1720.

The forward end of the forward arm of the lever 1742 is formed with two notches which are separated by an intervening projection with sloping sides and are adapted to receive a stud 1745 secured in and extending downwardly from the forward end of a small slide 1746. The latter is formed with a forwardly and rearwardly elongated slot through which the screw stud 1743 extends, whereby the slide 1746 may slide forwardly and rearwardly on the upper face of the lever 1742 as well as oscillate laterally about the stud 1743. A tension spring 1748 connected between a stud in the rear central portion of the base plate 1720 and a stud on the rear end of the slide 1746 normally holds the slide 1746 rearwardly with the stud 1745 seated in one of the other of the two notches in the forward arm of the lever 1742.

The stud 1745 extends below the lever 1742 through a clearance aperture into a slot in the end of the forward arm of the bell crank 1750 which is pivoted on the lower end of the stud 1743 on the underside of the base plate 1720. The end of the laterally extending arm of the bell crank lever 1750 engages in the forked upper end of an arm 1751 secured on the inward end of a short shaft 1752 rotatably supported by a pair of brackets 1753 secured against the underside of the plate 1720. The rightward outward end of the shaft 1752 is secured thereon an arm 1755 which is pivotally connected at its lower end to one end of a link 1756 which at its downward forward end is pivotally connected to a crank stud 1757 carried by a small crank 1758, secured on the rightward end of a shaft 1759 which extends through the interior of the hollow shaft 1573 beyond the leftward end thereof and through the right side frame plate 1514.

Immediately outward of the left end of the hollow shaft 1573 a disk 1765 is secured on the end of the shaft 1759. A three-armed clutch pawl 1766 is pivotally mounted adjacent the inward side of the disk 1765 upon a stud secured in the latter. A tension spring 1767 connected between a stud on the inner side of the disk 1765 and a stud secured in the pawl 1766 urges the pawl in a direction to engage a clutch tooth on one arm thereof with a toothed clutch disk 1768 secured on the leftward end of the constantly driven shaft 1573. However, a second arm on the clutch pawl 1766 normally engages the free end of the pivoted armature 1770 of an electromagnet RFM mounted on a bracket 1772 secured to the outer face of the left side plate 1514. Normally also a stud 1775 secured to the outer face of the disk 1765 is engaged above the end of the upward arm of a latch bell crank 1776 pivotally mounted on a stud 1777 secured in the bracket 1772. The latch bell crank is normally held in latching position against the limit stud 1778 by a tension spring 1779 connected with a stud secured in the latch bell crank and with a stud secured in the bracket 1772. The latch bell crank 1776 holds the disk and thus also a pivot mounting stud of the clutch pawl 1766 against retrograde rotation. The armature 1770 of the electromagnet RFM holds the clutch pawl 1766 rocked to an uncoupled position against a limit stud 1780 secured in the disk 1765.

A return spring 1782 anchored on the frame of the electromagnet RFM normally holds the armature 1770 in its clutch uncoupling position but upon energization of the electromagnet the armature 1770 is pulled up to release the clutch pawl 1766 to engage its clutch to the bottom teeth of the clutch members 1768 to thereby drive the shaft 1759. As the electromagnet RFM is again deenergized, the spring 1782 will return the armature 1770 to a normal position in the path of the clutch pawl 1766 so that at the end of a revolution of the shaft 1759, the clutch pawl will be rocked to disengage it from the toothed clutch member 1768, whereupon the spring 1779 will snap the upper arm of the bell crank 1776 under the stud 1775 again to prevent retrograde rotation of the shaft 1759 and disk 1765 and prevent reengagement of the clutch pawl 1766 with the teeth of the member 1768.

The rotation of the shaft 1759 and crank 1758 will oscillate the link 1756, arm 1755, shaft 1752, arm 1751 and bell crank 1750 to oscillate the stud 1745 and with it the three-armed lever 1742. The ribbon feed pawls 1740 are of such length and shape and are so-guided by the studs 1739 that, in each oscillation of the lever 1742, first clockwise from the position of Figure 85 and then counterclockwise back to that position while the stud 1745 is seated in the right hand notch in the forward arm of the lever 1742 as shown in Figure 10, the right hand pawl 1740 will effectively act on the ratchet disk 1722 of the right hand ribbon spool to drive it counterclockwise one step while the left hand pawl 1740 reciprocates first rearwardly away from and then forwardly again into engagement with the left hand ratchet disk 1722.

When all of the ribbon has been unwound from the left hand spool 1725, further feed of the ribbon in the same direction is prevented by the securement of the end of the ribbon to the spool. Consequently, further counterclockwise rotation of the right hand ratchet disk 1722 is resisted by the ribbon and as the bell crank 1750 is again rocked clockwise, it will shift the stud 1745 from the right hand notch in the lever 1742 over the intervening projection and into the left hand notch in the lever 1742 so that, as the bell crank 1750 is returned counterclockwise to its normal position shown in Figure 10, the lever 1742 will likewise be rocked counterclockwise to advance the left hand ribbon feed pawl 1740 into effective driving relation to the left hand ratchet wheel 1722 and retract the right hand pawl 1740 to an idling position. After the ribbon 1730 has been rewound on the left hand spool and entirely unwound from the right hand spool the resistance to further rotation to the left hand ratchet 1722 will similarly bring about a shift to the stud 1745 from the left hand to the right hand notch of the lever 1742 during the counterclockwise stroke of a further oscillation of the bell crank 1750.

The ribbon feed magnet RFM, as explained hereinafter, is energized at a time sufficiently later than the time at which one or both of the endorsement printing solenoids ECA and ECB may be energized that the ribbon remains stationary until after the printing devices, if they are operated, have completed their printing strokes and have been retracted from the platen.

*Releasing document from insertion chute to sorting conveyor*

At a time in the sorting cycle shortly after the time at which the endorsement printing devices may be operated, the document in the insertion chute is released from the stop member 1624 by means which is best illustrated in Figures 7 and 8.

The stop device 1624 comprises a transversely extending strip 1780 (Fig. 8) having at each end a short upwardly extension secured to a respective one of two hubs 1781 having outer ends of reduced diameter rotatably supported in the upper ends of upward arms of two brackets 1782 secured respectively to the plates 1575 and 1576 (Fig. 6). Intermediate its ends the strip 1780 has on its upper edge three forwardly bent projections 1783, the central one of which is of considerable width whereas the other two are relatively narrow. The projections 1783 normally extend across the lower end of the document chute to engage and arrest the lower edge of the inserted document. A flat plate 1784 of the same width as the central projection 1783 is secured to the rear face of the strip 1780 behind the central projection 1783 and extends substantially above the rear edge of that projection. Two smaller pieces 1785 secured to the rear face of the strip 1780 behind the outer two projections 1783 are bent first forwardly in engagement with the rear portions of the upper faces of the latter projections 1783 and then upwardly from approximately the centers of the latter projections 1783. The upwardly bent portions of the forward pieces 1785 are normally only slightly rearward of the lower ends of two small guide strips 1786 secured to the rear face of the rear chute plate 1601 on opposite sides of the central aperture therein and extending downwardly below the lower edge of the plate 1601. The upper edge of the plate 1784 is somewhat rearward of the upper edges of the pieces 1785 so that it will not engage the lower edge of a document being inserted in the chute even though the lower edge of the document may extend substantially rearwardly of the rear plate 1601 of the chute because of the document having become bent or crumpled in handling prior to insertion in the chute.

Adjacent the inner end of the rightward hub 1781, the strip 1780 has a short rearwardly bent arm 1789 which is pivotally connected to the upper end of a link 1787 which is pivotally connected at its lower end to the rearward arm of a bell crank 1788 mounted on the rightward end of a shaft 1790 rotatably supported in forward extensions of the plates 1575 and 1576. The upper arm of the bell crank 1788 carries a stud 1791 engaged in the slotted upper end of an arm 1792 which is secured at its lower end on a shaft 1793 rotatably supported in forward arms of the brackets 1782. An arm 1795 is secured at its rear end on the rightward end of the shaft 1793 and is pivotally connected at its forward end to the plunger of a solenoid DRS. A tension spring 1797 connected between a stud in the arm 1795 and a stud secured in the plate 1513 normally holds the forward end of the arm 1795 in an upward position against a limit stud secured in the plate 1513 and thereby also maintains the stop device 1624 in the normal position illustrated in Figure 7.

When the solenoid DRS is energized, it pulls its plunger downwardly thereby rocking the arm 1795, shaft 1793, arm 1792, bell crank 1788 and the stop member 1624 counterclockwise (clockwise as used in Fig. 7) to tilt the document supporting projections 1783 thereof downwardly and forwardly while the upper edges of the elements 1784 and 1785 are moved forwardly to release the lower edge of the document from the stop member and thereby permit the document to be fed into the document sorting conveyor means hereinafter described in detail. At the same time the fingers 1635 on the operating arms of the document sensing switches DDS are retracted from the chute so as not to interfere with the release of the document. For that purpose the strip 1780 of the document stop device is formed with two rearwardly and downwardly turned short arms 1800, each carrying in its rearward end a stud extending through an elongated slot in a laterally and downwardly extending portion of the operating arm extension 1634 which is slidably mounted on the arm 1633 of the respective one of the switches DDS. The arrangement is such that as the stop device 1624 is rocked as described above to release the document, the operating arm extensions 1634 are caused to slide rearwardly on the switch operating arms 1633 and thereby retract the document sensing fingers 1635 from beneath the lower edge of the document in the chute and thus also incidentally permit the switches DDS to restore to opened condition.

*Document sorting conveyor drive*

The document sorting conveyor means is driven entirely from the shaft 1560 which normally is not rotating, but in each sorting operation is driven by the continuously running double pulley 1559 through a clutch which is engaged at substantially the same time that the endorser control solenoids ECA and ECB may be energized and is again disengaged only after the document being sorted has arrived at the proper destination.

Figure 12:
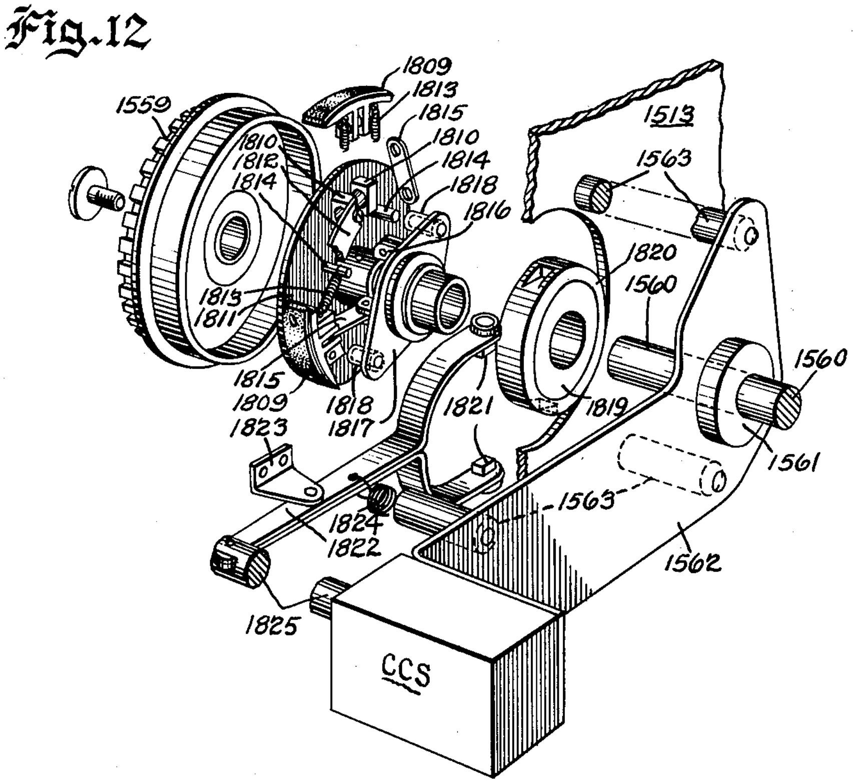
Fig. 12 is a spread perspective of the drive clutch and clutch control means of the sorter unit.

The document conveyor drive clutch is shown in Figure 12, from which it will be seen that the larger diameter portion of the pulley 1559 is hollow and serves as the drum of a friction clutch comprising three clutch shoes 1809 (two shown in Fig. 12) radially slidably mounted between pairs of guide blocks 1810 carried on the leftward surface of a disk 1811 having a hub secured on the rightward end portion of the shaft 1560. The clutch shoes are also slidably confined between the disk 1811 and an annular plate 1812 secured to the blocks 1810. Each clutch shoe is normally held inwardly separated from the internal surface of the pulley 1559 by a pair of tension springs 1813, each connected at one end to the clutch shoe 1809 and at the other end to one of three studs 1814 secured in the disk 1811, each of said studs serving to anchor two springs connected to adjacent sides of two clutch shoes. Each clutch shoe 1809 is pivotally connected to a respective one of three links 1815, the other end of which is pivotally supported by one of three pairs of lugs 1816 on a clutch control member 1817 axially movably mounted on the shaft 1560 and guided in such movement by studs secured in the disk 1811 and extending into bores in sleeves 1818 secured to the control member 1817. The springs 1813 by normally maintaining the clutch shoes 1809 retracted from the clutch drum portion of the pulley 1559 likewise normally maintain the control member 1817 in a leftward retracted position such that the links 1815 are normally positioned at an angle substantially less than 90 degrees to the axis of the shaft 1560. When the control member 1817 is moved rightwardly toward the disk 1811 it swings the links 1815 to positions more nearly at a right angle to the axis of the shaft 1560 and thus moves the clutch shoes 1809 outwardly into frictional power transmitting contact with the drum portion of the constantly driven pulley 1559 and thereby sets the shaft 1560 into rotation.

For so-engaging the sorting conveyor clutch, the hub of the control member 1817 is connected through an antifriction bearing 1819 with a collar 1820 having at diametrically opposite portions of its periphery, notches receiving the inner squared ends of studs 1821 carried by the two branches of a forked lever 1822 pivotally mounted intermediate its ends on a small bracket 1823 secured to the inner surface of the side plate 1513. The forward forked arm of the lever 1822 is normally urged leftward to clutch releasing position by a tension spring 1824 connected thereto and to the bracket 1562. The end of the rear arm of lever 1822 is pivotally connected to the outer end of the plunger or movable core element 1825 of a solenoid CCS mounted on a leftwardly turned rear portion of the bracket 1562.

It will be apparent that when and as long as the solenoid CCS is energized it will draw its plunger leftwardly thereby moving the collar 1820 and the clutch control member 1817 to and holding them in clutch engaging position for driving the shaft 1560 and other elements of the sorting conveyor means which are driven by that shaft.

*Feeding document into horizontal conveyor*

Two conveyor pulleys 1830 (Fig. 7) are secured in such positions on the shaft 1560 that their rearward portions are at the sides of the lower central aperture therein. Each of two conveyor belts 1831 passes around a respective one of the pulleys 1830 and extends forwardly therefrom. The rear surface of each belt 1831 on the rearward side of the pulley 1830 is close to the plane of the the rearward face of the chute plate 1600.

Each of a pair of small rollers 1833 is carried on the upper end of an individual arm 1834, the lower end of which is swingably supported on the shaft 1793. In each arm 1834 a short distance above the lower end thereof a stud 1835 is secured and is connected to the rear end of a tension spring 1836 which at its forward end is connected to a stud in an arm 1837 secured to and extending upward and forwardly from the shaft 1793. The spring 1836 for the right-hand arm 1834 normally holds the stud 1835 in that arm against the rear edge of the right-hand arm 1837. The left-hand arm 1837 is cut away sufficiently to provide clearance of the stud 1835 in the left-hand arm 1834 and is also formed with an upper rearward extension which is normally held in contact with an eccentric portion of a stud 1838 which is rotatably adjustably mounted in the left-hand arm 1834 to permit adjustment of the left-hand one of the rollers 1833 forwardly and rearwardly relative to the right-hand roller 1833 for a purpose which will be mentioned shortly.

It will be apparent that when the shaft 1793 is rocked by the solenoid DRS to rock the document stop device 1624 to release the lower edge of the document in the chute, the arms 1837 will also be swung forwardly and the arms 1834 carrying the rollers 1833 will be swung forwardly by the springs 1836 until they press the lower portion of the document against the rearward surfaces of each of the conveyor belts 1831 on the rear side of the pulleys 1830 a short distance above the stop device 1624. As, at that time, the shaft 1560, the pulleys 1830 and the belts 1831 are being driven in the direction of the arrows in Figure 6, the inserted document will be driven downwardly out of the chute and into the conveyor means.

By adjustment of the eccentric stud 1838, the normal position of the left-hand arm 1834 may be so adjusted relative to the arm 1837 and shaft 1793 and thus also relative to the right-hand arm 1834 that as the solenoid DRS rocks the shaft 1793, both rollers 1833 will engage the document simultaneously and with equal pressure so as to cause the document to be fed downward out of the chute straight and without skewing, which could interfere with proper passage of the document through the conveyor.

*Horizontal conveyor*

The two belts 1831 extend forwardly to the front of the sorting machine where they are looped around respective ones of a pair of pulleys 1850 (Figs. 15 and 19), each mounted on separate short shaft journaled at its ends in a mounting frame 1851 formed metal strap bent into the shape of inverted U and pivotally mounted at the lower ends of its side legs on studs carried by brackets 1852 which in turn are secured to the lower side of a length of angle member 1853 secured to and supported from the upper front transverse frame member 1507 and the upper ends of the foremost vertical frame members 1509 and 1510. A second U-shaped member 1854 is pivotally supported at its ends on the outer ends of the shaft of the pulley 1850 and has secured to the center of its transverse portion a screw 1855 which passes through and aperture in the vertical flange of the member 1853 and through a coil spring 1856 which is compressed between the forward face of the member 1853 and a nut threaded on to the end of the screw 1855 to a greater or lesser extent to adjustably tension the respective one of the belts 1831.

To insure that the belts 1831 will properly track around the pulleys 1830, the upper pass of each belt is guided at a point just forwardly of its pulley 1830 between a pair of guide rollers 1857 (Figs. 6 and 16) rotatably supported on studs secured to the downward flange of the frame member 1508.

Figure 15:
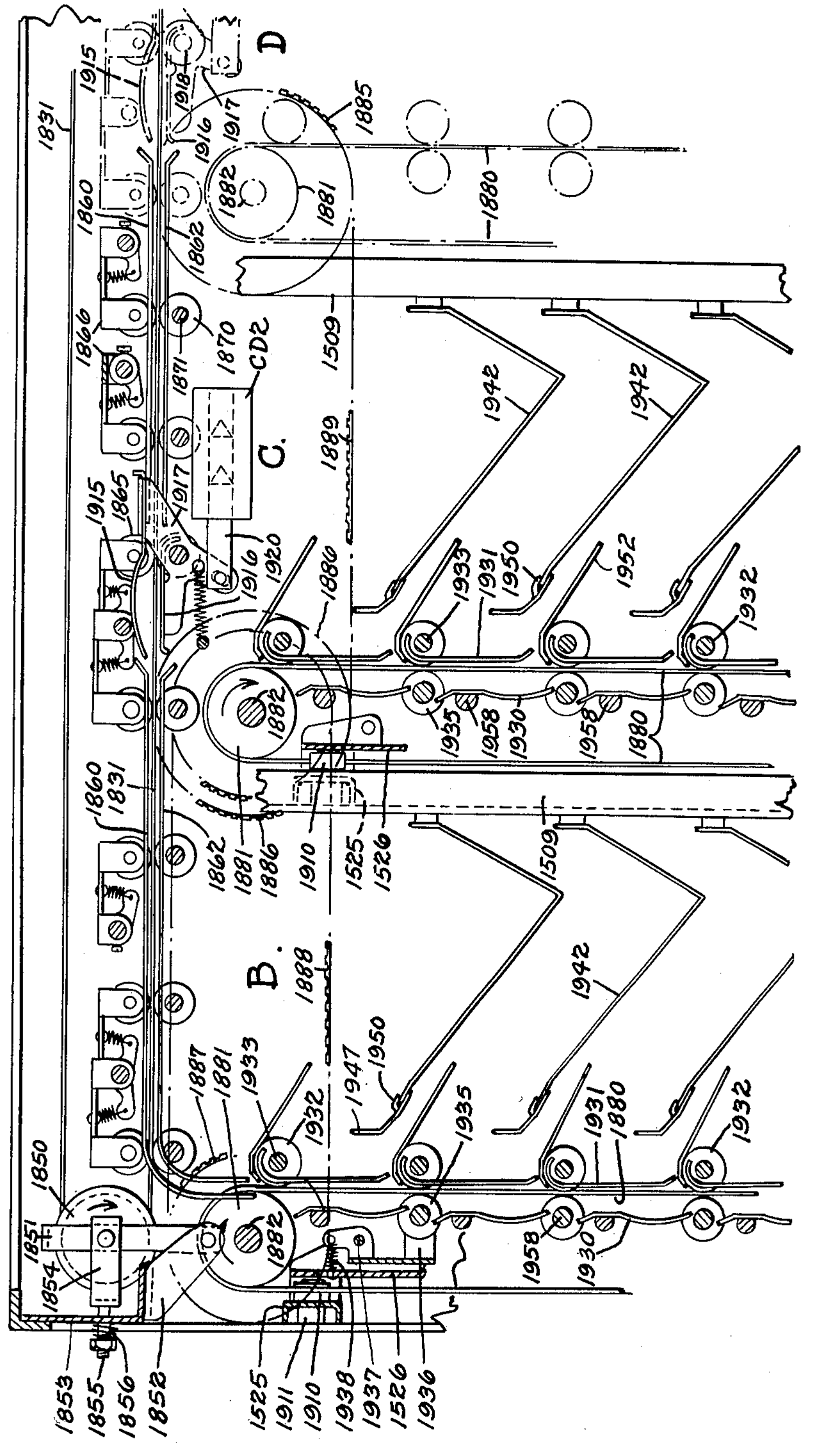
Figs. 15, 16, 17 and 18 show the general arrangement of the document conveyors, document bins, and column and bin deflectors as seen in vertical fore and aft section, these four figures showing respectively the upper front, upper rear, lower rear and lever front portions of the sorter unit.
Figure 16:
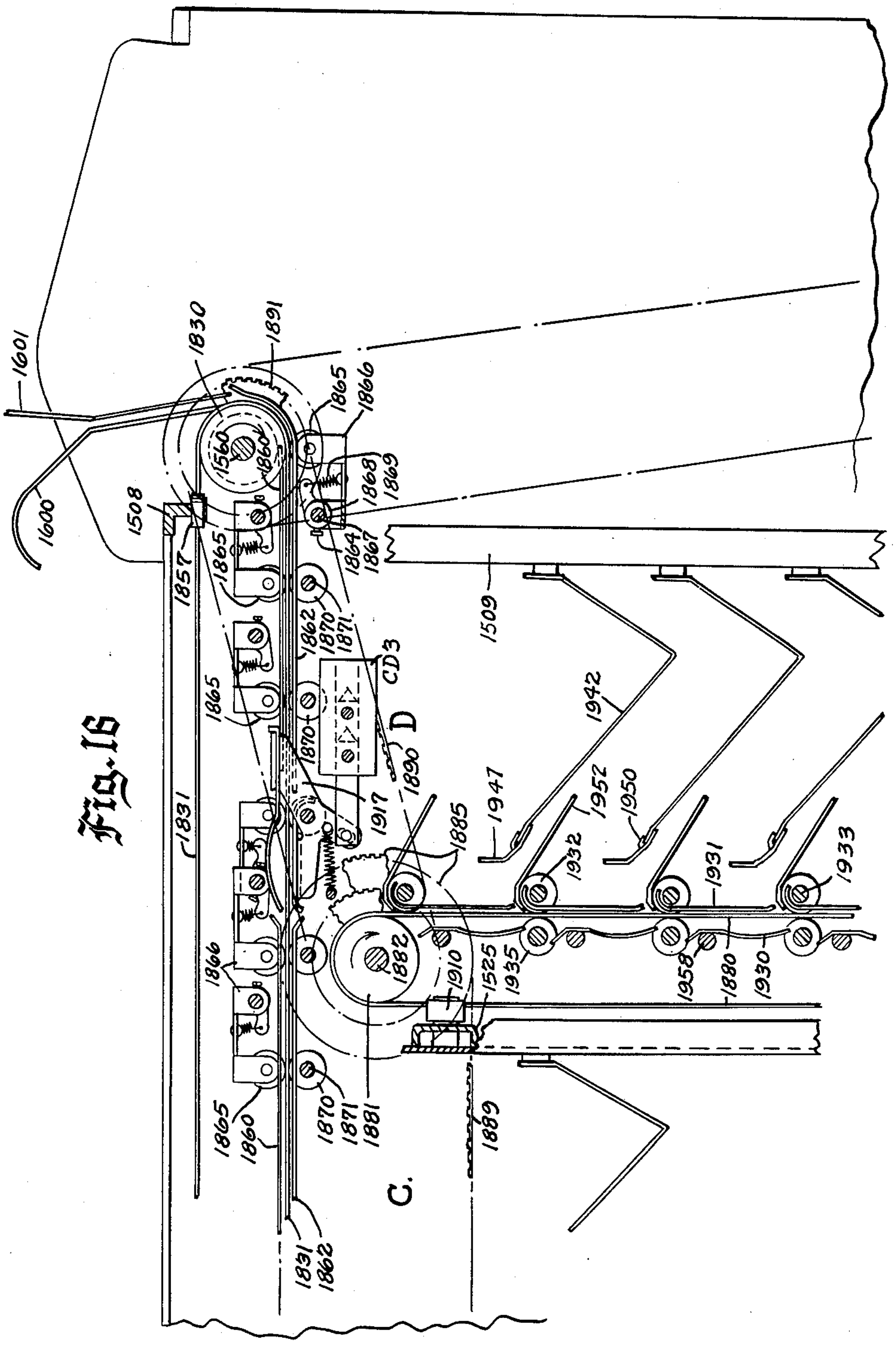
Figure 17:
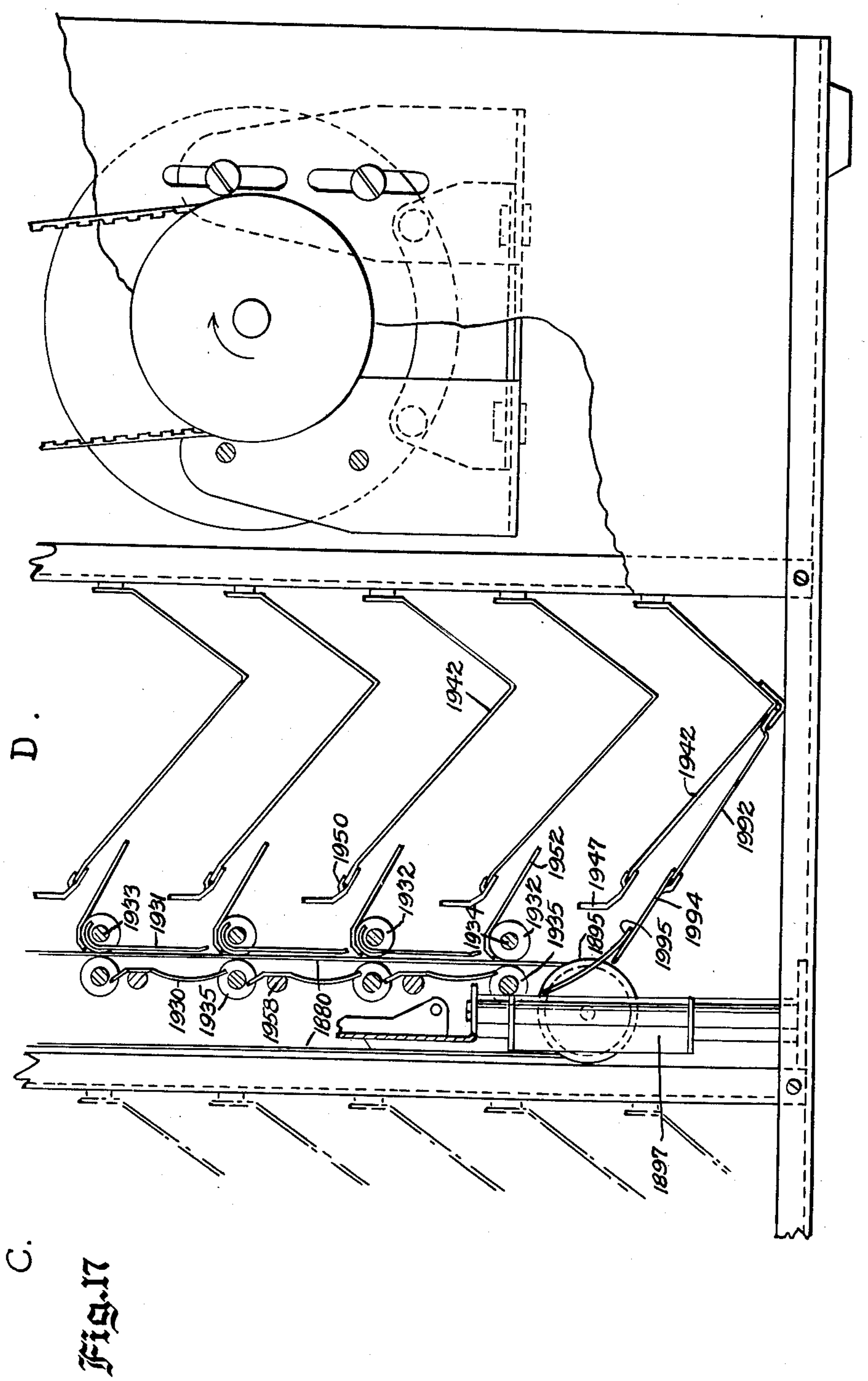
Figure 18:
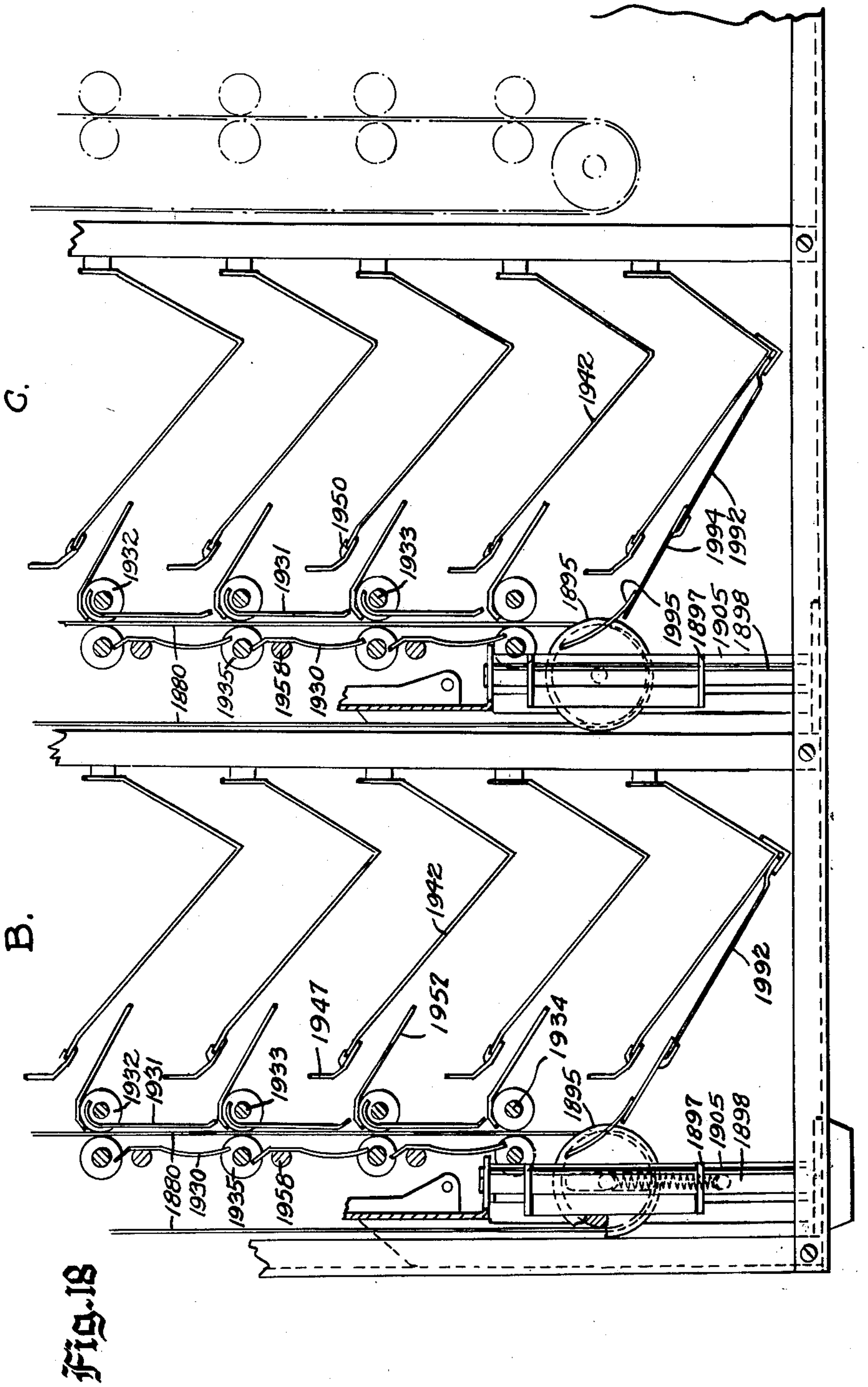
Figure 19:
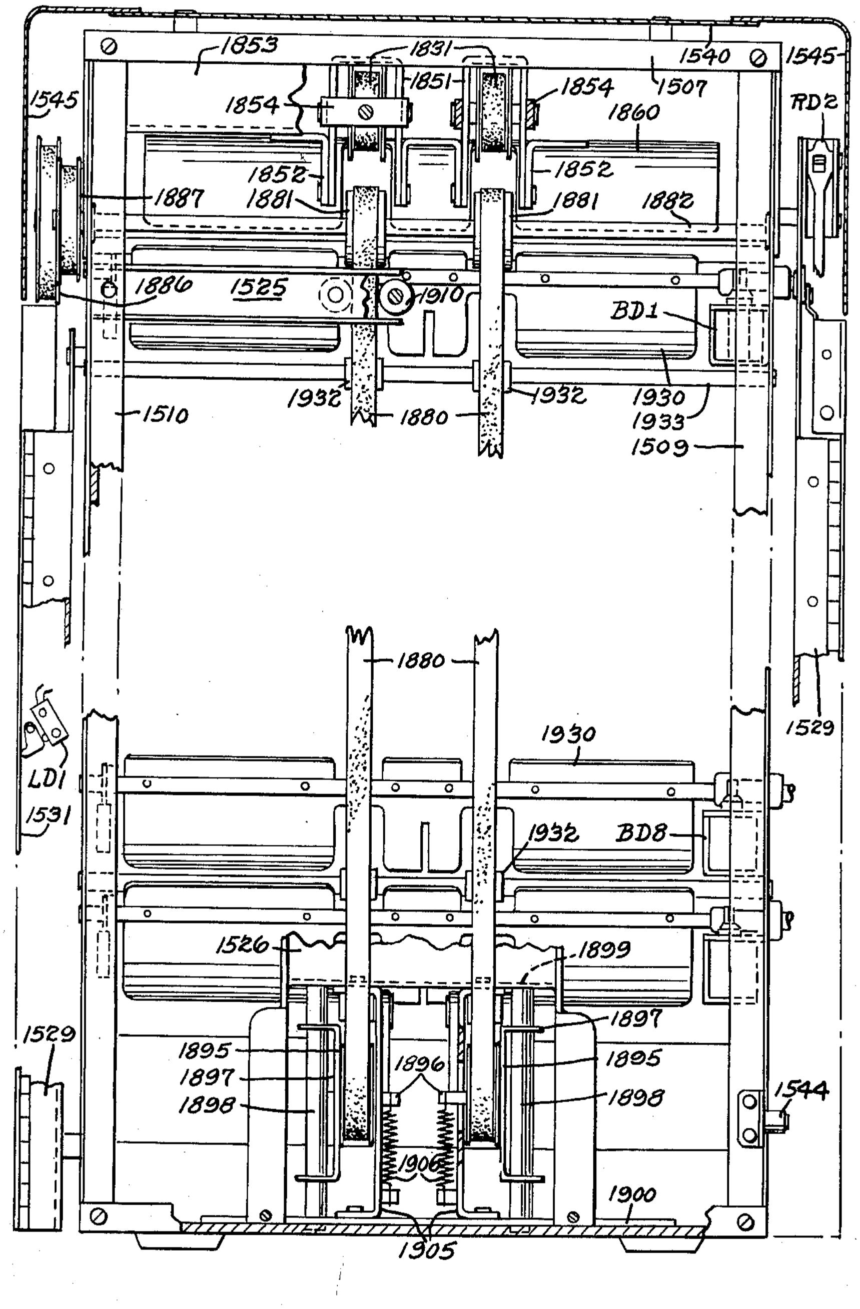
Fig. 19 is a partial front elevation of the sorter unit with a front casing panel removed.
Figure 20:
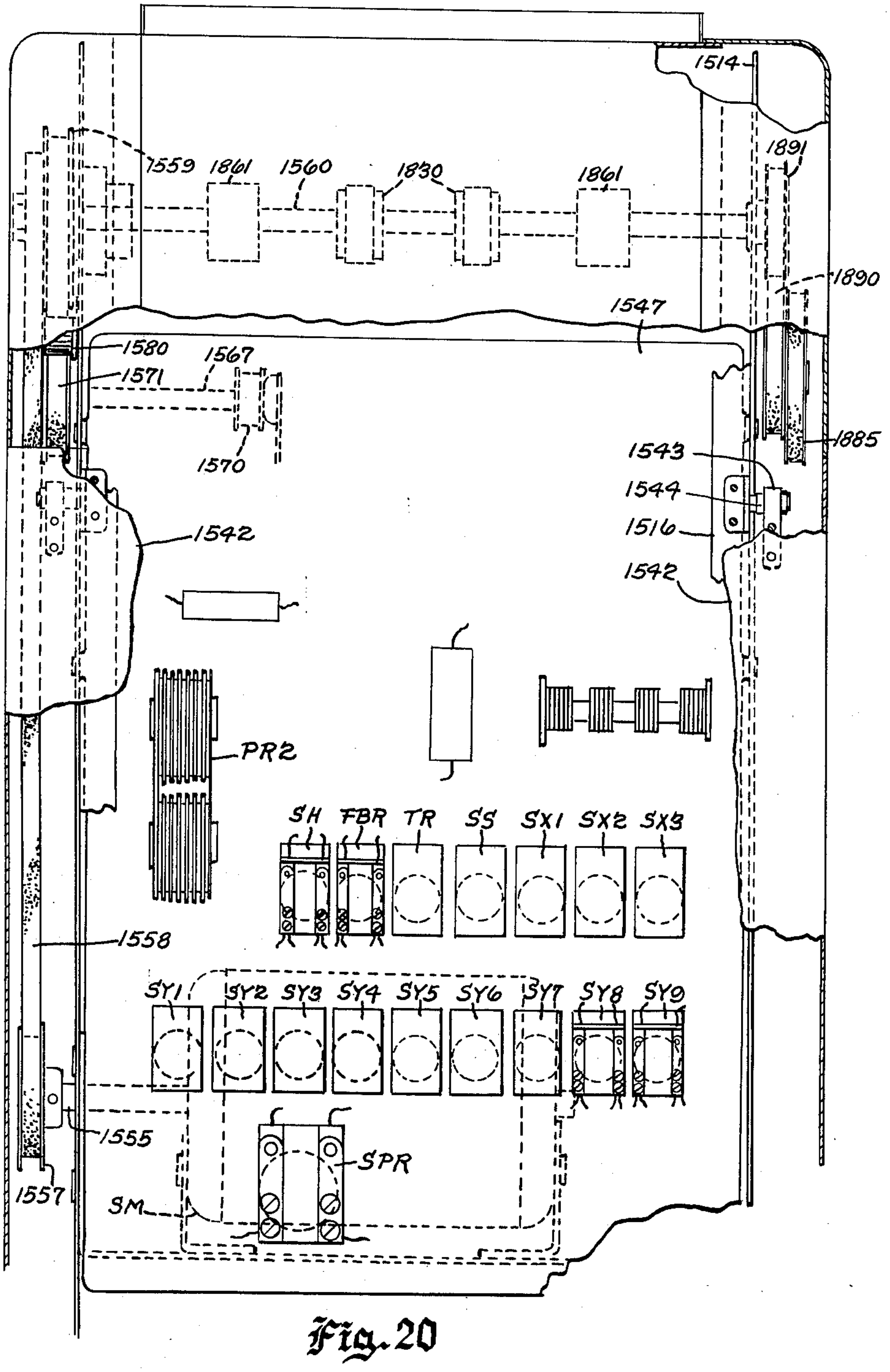
Fig. 20 is a partial rear elevation of the sorter unit with part of the rear casing panel broken away.
Figure 21:
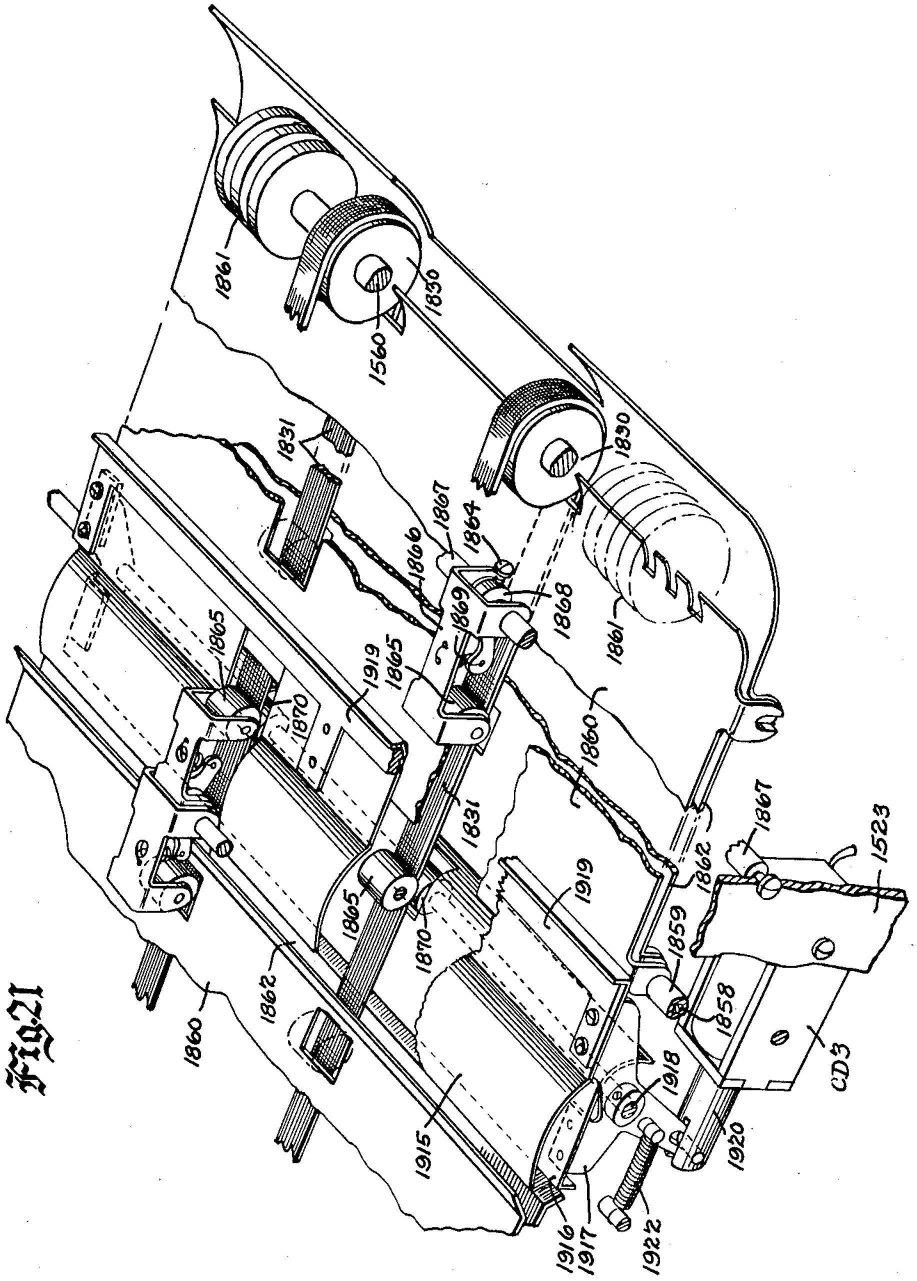
Fig. 21 is a detail in perspective of the rear portion of the horizontal document conveyor.

The lower passes of both belts 1831 extend through a document passage between pairs of upper and lower horizontal guide plates as shown in Figures 15 and 16, supported on the side plates 1523 and 1524 by screws 1858 (Fig. 21) passing through down-turned lugs on the side edges of said guide plates and threaded into posts 1859 (Figs. 3 and 21) secured in the side plates. The upper plate 1860 (Fig. 16) of the rearmost pair of horizontal guide plates has its rear edge notched to accommodate the bottom portions of the two pulleys 1830 and is also notched (as shown in Fig. 21) outwardly from the pulleys 1830 to accommodate the bottom portions of two peripherally grooved guide rollers 1861 (Figs. 7, 16 and 21). The rear edge portions of the plate 1860 between the notches therein are curved upwardly sufficiently to avoid blocking engagement with the forward edges of the documents advancing around the pulleys 1830 and rollers 1861 into the document conveying passage.

The lower horizontal plate 1862 of the rearmost pair has its rearward portion extended rearwardly upwardly partially around the rollers 1861 to a point just rearward of the lower edge of the rear plate 1601 of the document insertion chute. However, the rearward portion of the bottom plate 1862 is cut away to avoid interference with the document stop device 1624, the document sensing fingers 1635 and the rollers 1833 as shown in Figure 82. Also, directly beneath the pulleys 1830 the bottom plate 1862 is apertured to permit a pair of small rollers 1865 (Figs. 6 and 16) to enter the document passage to engage against the belts 1831 at the bottom of each pulley 1830. The rollers 1865 are each mounted on a short shaft rotatably supported at each side of the roller in parallel arms of a small roller supporting frame 1866 having a second pair of arms pivotally supported on a rod 1867 which at its ends is secured in the side plates 1523 and 1524. Intermediate the pairs of arms of the roller supporting frame 1866, a small hub 1868 is supported on the rod 1867, said hub being provided with a short arm connected at its end with one end of a tension spring 1869, the other end of which is secured to the mid section of the frame 1866 so that the pressure of each roller 1865 against the belt 1831 may be adjusted by rotating the hub on the rod 1867 and then securing it in the adjusted rotary position on the rod 1867 by tightening a set screw 1864 threaded through the hub.

Forwardly of the pulleys 1830 the upper guide plate 1860 is formed with two pairs of apertures to permit engagement of the belts 1831 by two pairs of additional rollers 1865, each roller being adjustably mounted in a manner similar to that just previously described. Beneath each roller 1865 of the last mentioned two pairs a supporting roller 1870 engaging the underside of the respective belt 1831 through an aperture in the bottom guide plate 1862 is rotatably mounted on a shaft 1871 secured at its ends in the side plates 1523 and 1524.

From the pair of guide plates 1860 and 1862 described above, the horizontal document conveying passage extends forwardly through the spaces between two further pairs of upper and lower guide plates 1860 and 1862 (Fig. 15) mounted on posts 1859 secured in the side plates 1523 and 1524. The guide plates 1860 and 1862 of the last mentioned two pairs are also similarly apertured to permit both belts 1831 to be engaged by additional pressure rollers 1865 pressing the belts downwardly against supporting rollers 1870, all of the pressure rollers 1865 being mounted in the same manner as the previously mentioned rollers 1865 and all of the additional rollers 1870 being rotatably supported on shafts 1871 or 1918 supported in the side plates 1523 and 1524. The sets of rollers 1865 and 1870 are so-spaced along the bottom pass of each horizontal conveyor belt 1831 that documents in the horizontal conveyor passage will be maintained pressed against the undersurfaces of the belts substantially continuously during their travel through the horizontal conveyor passage.

Between the forward edges of the rearmost pair of guide plates 1860 and 1862 and the rear edges of the middle pair of plates 1860 and 1862 and between the forward edges of the latter pair of plates and the rearward edges of the foremost pair of guide plates, the horizontal conveyor passage extends through two document sorting switches or deflectors, each of which, as hereinafter described in detail, is operable from a normal position for conveyance of documents straight forward to an operating position for deflecting or switching a document downwardly from the horizontal conveyor passage into the upper end of a respective one of two vertical conveyor passages. The forward end portions of the foremost guide plates 1860 and 1862 are bent downwardly on substantial radii to turn the forward end of the horizontal conveyor passage downwardly into the upper end of a third vertical conveyor passage.

*Vertical column conveyors*

For each of the three vertical conveyor passages, as shown in Figures 15 to 18, there is a pair of vertical conveyor belts 1880 which at their upper ends run around pulleys 1881 secured in laterally spaced relation on a respective one of three shafts 1882, the end portions of which are of reduced diameter and are rotatably mounted in anti-fraction bearings 1883 (Fig. 4) supported in cups 1884, each extending through an aperture in the side plate 1523 or 1524 and through a registering aperture in a member 1521 and secured to the latter by screws passing through ears on the cup 1884 and through the plate 1523 or 1524. The leftward end of each shaft 1882 extends outwardly beyond the plate 1524 and through the bearing 1883 and cup 1884 and has a drive pulley 1885, 1886 or 1887 (Figs. 15, 16, 19 and 20) secured thereon, the pulley 1887 on the front shaft 1882 being a single pulley and the pulleys 1886 and 1885 on the rearward two shafts 1882 being double pulleys. A drive belt 1888 extends around the pulley 1887 and around one portion of the pulley 1886 on the central shaft 1882. Another drive belt 1889 extends around the other portion of the pulley 1886 and around one portion of the pulley 1885. Another drive belt 1890 extends around the remaining portion of pulley 1885 and around a pulley 1891 secured on the left end of the shaft 1560 just leftward of the plate 1514 so that all three shafts 1882 are driven at the same speed as the shaft 1560 at all times when the conveyor drive clutch is engaged to drive the shaft 1560. As the pulleys 1881 and 1830 are all of the same diameter, the belts 1880 and 1831 are driven at the same linear speed.

The lower portion of each belt 1880 passes around a flanged pulley 1895 (Figs. 17, 18 and 19), each mounted on a short shaft 1896 (Fig. 19) secured at its outward end to the vertical portion of a bracket 1897 having outwardly turned upper and lower end portions apertured for sliding guidance on a rod 1898. The two guide rods 1898 for each pair of pulleys 1895 are secured at their upper ends to a rearwardly turned horizontal flange 1899 on the adjacent one of the members 1526 near the lower end of the latter and are secured at their lower ends either to the horizontal flange of the adjacent member 1520 or, in the case of the foremost pair of rods 1898, to a rearwardly extending horizontal plate 1900 secured to the bottom front cross member 1503 of the sorter frame. On the inner side of its associated pulley 1895, the shaft 1896 extends inwardly through a vertical slot in a guide strip 1905, the outwardly turned upper and lower ends of which are secured respectively to the flanges 1899 and to the adjacent member 1520 or 1900. The inward end of each pulley shaft 1896 is connected to the upper end of a tension spring 1906, the lower end of which is anchored on a stud secured in the guide member 1905 whereby the pulleys are urged downwardly to maintain the respective belts 1880 under suitable tension.

Just below each pulley 1881 the upwardly running forward pass of each belt 1880 is guided between a pair of rollers 1910 (Figs. 15 and 16), each rotatably mounted on a stud 1911 secured in the adjacent transverse channel member 1525.

*Document column deflectors*

Each of the two column deflectors is constructed and arranged as shown more particularly in Figure 21. It comprises a pair of vertically spaced upper and lower plates 1915 and 1916 secured at their right and left ends to inwardly turned flanges of a pair of end members 1917 having hubs secured on a shaft 1918 rockably supported at its ends in the side plates 1523 and 1524. The rearward edge portion of the bottom plate 1916 is turned downwardly substantially cylindrically about the axis of the shaft 1918 and substantially tangentially to the plane of the lower horizontal guide plate 1862. The curved portion of the plate 1916 has two apertures therein below the belts 1831 to accommodate a pair of belt supporting rollers 1870 rotatable thereon and engaging the undersides of the belt 1831.

The upper plate 1915 has a rearward flat portion extending over the forward edge of the next rearward top horizontal guide plate 1860 and a forward portion curved cylindrically about an axis extending transversely substantially below and forward of the shaft 1918. Above each of the belts 1831 the plate 1915 is formed with a slot opening through the forward edge of the plate 1915 and having sufficient width and length as to avoid interference with the belts 1831 and to avoid interference with the mounting frames 1866 of the two pressure rollers 1865 which engage the belts 1831 above the two rollers 1870 on the shaft 1918.

For stiffening the deflector structure, the forward edge of the plate 1916 is formed with a downwardly turned flange and the rear edge of the plate 1915 is formed with an upwardly turned flange. Furthermore, an additional stiffening member in the form of a transversely extending flat bar 1919 having a plurality of forward extensions is secured to the upper face of the rearward portion of the member 1915. The right side member 1917 has a downward arm having a slotted engagement with a stud secured in the plunger or movable core member 1920 of a respective one of two column deflector solenoids CD2 and CD3 secured to the inner side of the plate 1523. A tension spring 1922 connected between a stud secured in the plate 1523 and a stud secured in the downward arm of the member 1917 normally maintains the solenoid plunger 1920 in its outward released position and the deflector in the position shown in Figures 15, 16 and 21 wherein the exit slot between the forward edges of the plates 1915 and 1916 is aligned with the slot between the outwardly flaring rear edges of the next forward pair of horizontal guide plates 1860 and 1862 for directing a conveying document into the conveyor passage between the next forward plates 1860 and 1862. When however, the solenoid CD2 or CD3 is energized, the connected one of the deflector assemblies is rocked counterclockwise so that the exit slot between the forward edges of the plates 1915 and 1916 is positioned downwardly to direct the conveyed document into the respective vertical column conveyor.

*Document bin deflectors*

Each of the three vertical conveyor passages through which the rear downwardly moving passes of a respective pair of belts 1880 run is formed by the spaced front and rear plates 1930 and 1931 (Figs. 15–18) of a respective one of three vertical series of document sorting deflectors, each series comprising nine such deflectors. The rear pass of each vertical conveyor belt 1880, immediately below a point at which it leaves its upper pulley 1881, is engaged on its rearward outward surface by the uppermost one of a series of rollers 1932 which are rotatably mounted on the operating and supporting shafts 1933 of the rear deflector plates 1931. At the bottom of each series of nine deflectors the rearward surfaces of the rear passes of the belts 1880 are similarly engaged each by an additional roller 1932 mounted on a further rod 1934.

Directly in front of each roller 1932, excepting the uppermost roller 1932 of each vertical series, the forward front surface of the rear pass of each belt 1880 is engaged by a pressure roller 1935 carried in an individual small frame 1936 (Fig. 15) which is similar to the frames 1866 for the rollers 1865 except that each frame 1936 has a short arm extending upwardly from its axis of pivoted support on a rod 1937 which is secured at its opposite ends in the rearwardly turned flanges of the adjacent member 1526. The short upward arm of the roller supporting frame 1936 carries a stud to which is connected one end of a tension spring 1938, the other end of which is anchored on the member 1526. Thus, at the entrance to each deflector in the three vertical conveyors, the conveyed document will be pressed into frictional conveying contact with each of the two belts 1880 of that conveyor and is thus maintained in frictional contact with the conveyor belts substantially continuously until it is delivered to its destination.

The front and rear plates 1930 and 1931 on all of the document deflectors of each of the three vertical series are normally in the vertical position shown in Figures 15 to 18 to form a continuous vertical conveyor passage, but each deflector may be operated to swing its deflector plates 1930 and 1931 simultaneously rearward to deflect a conveyed document rearwardly into a respective one of the twenty-seven document bins associated, respectively, with the twenty-seven deflectors. The nine bins of each of the three vertical columns are formed between successive ones of a series of ten plates 1942 bent at approximately right angles to an obtuse upwardly diverging form along a line intermediate its front and rear edges. The upper rear edge of each plate 1942 is secured at its outward end portions to the inward flanges of a respective one of the rear three pairs of vertical frame members 1509 and 1510. Each of the bin plates 1942 excepting the uppermost plate of the ten in each vertical column supports a document tray which will be described in detail following a description of the construction and operation of the pocket deflectors.

Figures 22, 23, 24:
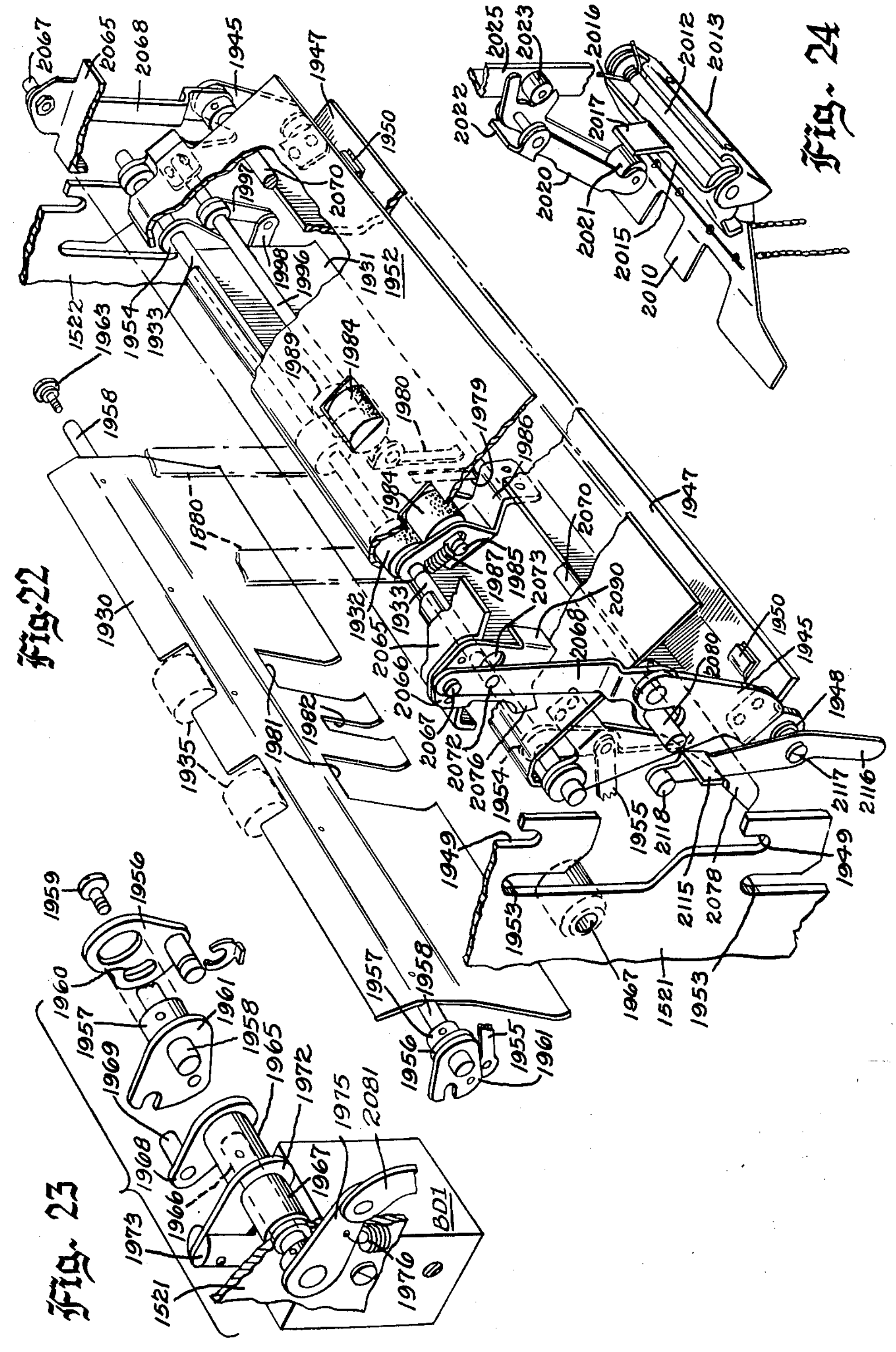
Fig. 22 is a spread perspective of portions of a bin deflector and associated parts.
Fig. 23 is a detail of the bin deflector operating means.
Fig. 24 is a detail in perspective of a packer bail.

The structural detail of one bin deflector is best illustrated in Figure 22. Each bin deflector unit comprises a pair of right and left side members 1945 having at its lower end an inwardly turned flange secured to the upper face of a respective end of a formed transverse member 1947. The latter has at each end a downwardly turned lug in which is secured an outwardly projecting bushing 1948 adapted to seat in a slot 1949 opening upwardly through the upper edge of a rearward projection of the adjacent member 1521 or 1522. An upward forward branch of each side member 1945 is also formed with an inwardly turned lug secured against the underside of a transverse guide plate 1952 at one side edge portion thereof, the forward edge portion of the plate 1952 extending over and being curved partially around the rollers 1932 and the shaft 1933 which is secured near its ends in the upper ends of the forward branches of the members 1945. Both ends of the shaft 1933 extend outwardly beyond the members 1945 to enter into slots 1953 opening downwardly through the lower edge of the rearward projections of the members 1521 and 1522. The slots 1953 are extended upwardly sufficiently far to permit the bushings 1948 to be moved upwardly completely out of the slots 1949 when the assembly 1945, 1947, 1952 is lifted to move the ends of the shaft 1933 to the upper ends of the slots 1953 to facilitate assembly and disassembly. In the assembled position of the parts, the rear edge of the member 1947 extends under and supports the forward edge of the plate 1942 which is next above the pocket into which the deflector can deflect documents. Lugs 1950 srtuck from the member 1947 overlie the forward edge of the plate 1942.

The deflector plate 1931 is formed adjacent the top of each lateral edge with a rearwardly turned ear 1954 by which it is swingably supported on the shaft 1933. The upper edge of the deflector plate 1931 is formed with notches to accommodate the two rollers 1932 on the shaft 1933. At either side of and between the roller-accommodating notches the upper edge portions of the deflector plate 1931 are bent rearwardly over the shaft 1933 to prevent the upper edges of the deflector plate 1931 from catching and tearing conveyed documents.

The rearwardly turned ear 1954 at the right hand edge of the rear deflector plate 1931 carries a stud engaged in the rear end of a link 1955 which at its forward end is pivotally connected to an arm 1956 rotatably supported on a bushing 1957 secured on the rightward end portion of a shaft 1958 having a flattened portion secured against the forward face of the front deflector plate 1930 just below a forwardly bent top edge portion of the latter. A screw 1959 extends through a small, arcuate slot 1960 in the arm 1956 and is threaded into an arm 1961 which is secured to the bushing 1957 whereby the arm 1956 may be secured in adjusted position relative to the arm 1961 for locating the front and rear deflector plates 1930 and 1931 in adjusted relation to each other.

A shouldered screw 1963 passes through the left plate 1522 and is threaded into the left end of the shaft 1958 to rotatably support the left end of said shaft. The rightward end of the shaft 1958 seats in the leftward end of a bushing 1965 secured on a short shaft 1966 rotatably supported in a bushing 1967 secured in and extending inwardly from the right hand plate 1521. An arm 1968 secured on the leftward end of the bushing 1965 carries a stud 1969 which extends leftwardly through a notch in the arm 1961 so that rocking of the shaft 1966 will cause the shaft 1958 and arms 1961 and 1956 to rock with it.

An arm 1972 is secured to the rightward end of the bushing 1965 and thus also to the shaft 1966. Each of the twenty-seven arms 1972 is pivotally connected at its forward end to the plunger 1973 of a respective one of twenty-seven solenoids BD1 to BD27 which is secured against the leftward face of the right hand member 1521. An arm 1975 secured on the rightward end of the shaft 1966 rightward of the plate 1521 is connected with a tension spring 1976 which is anchored on a stud secured in the member 1529. The spring 1976 normally maintains the deflector plates 1930 and 1931 in the downward forwarding positions shown in Figs. 15 to 18. Upon energization of one of the solenoids, its plunger 1973 will be drawn downwardly to rock the connected shafts 1966 and 1958 counterclockwise to swing the pair of deflector plates 1930 and 1931 rearwardly from the position of Figures 15–18 until the lower edge of the rear deflector plate 1931 nearly contacts the member 1947 and the lower edge of the front deflector plate 1930 is located above the forward portion of the plate 1952 of the next lower deflector assembly and a little rearward of the plane of the axes of the shafts 1933 so as to direct a document into the bin next below the member 1947 and plate 1942 engaged by the latter. As hereinafter described in detail, the energizing circuits of the column deflectors CD2 and CD3 and of the bin deflectors BD1–BD27 are selectively controlled by means controlled by the selection keys SK1–SK27 of the master machine so that documents placed in the sorter are sorted to bins corresponding to the depressed selection keys.

Figure 26:
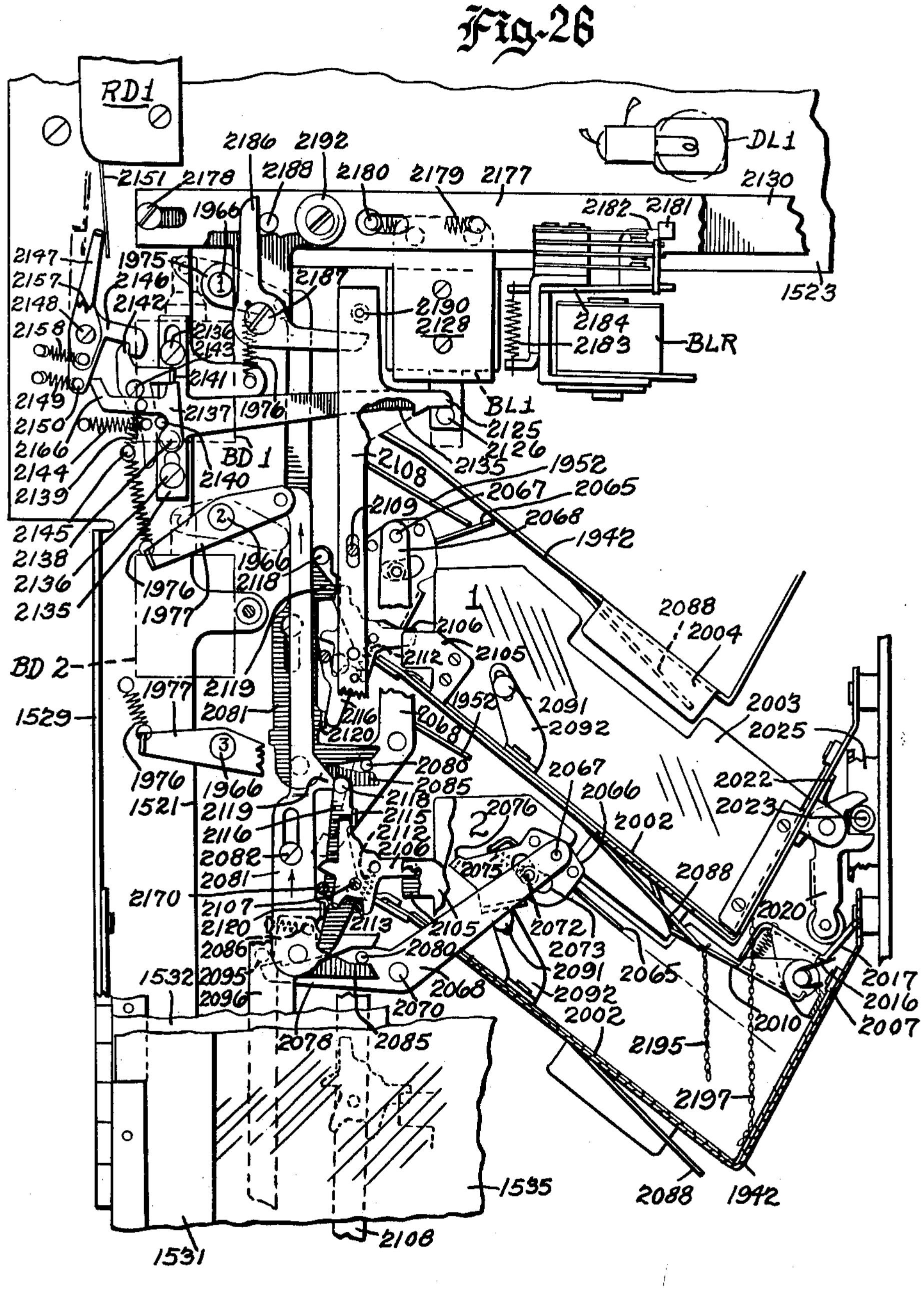
Fig. 26 is a partial vertical section showing auxiliary bail operating means associated with one of the bins, the bin latching and unlatching means, and elements associated therewith.

All of the bin deflectors are of the same construction except that all those below the uppermost one in each column have a two-armed lever 1977 on the end of the shaft 1966 as shown in Fig. 26 instead of the single arm 1975 of the uppermost deflector as shown in Figs. 23 and 26.

Figure 25:
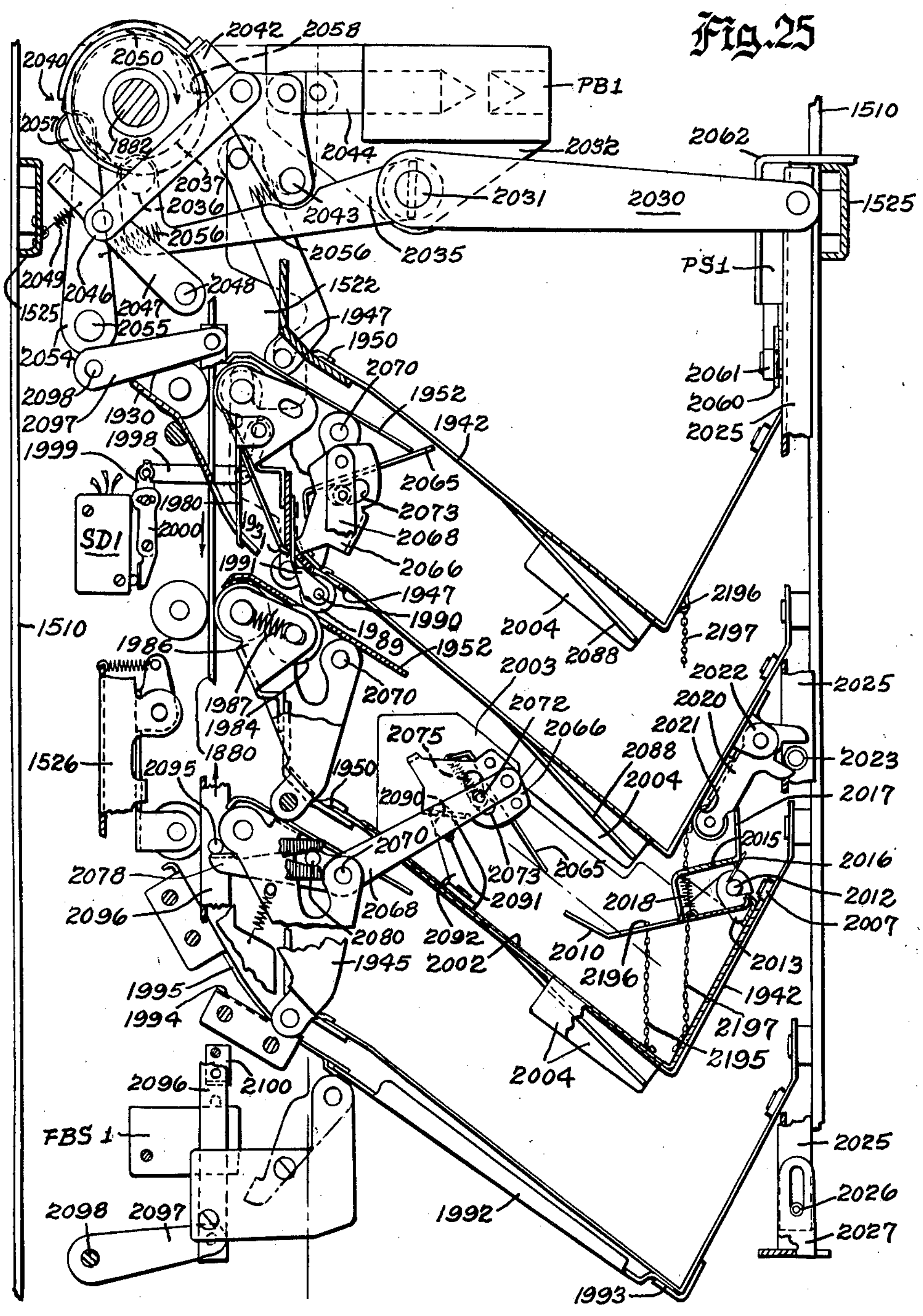
Fig. 25 is a partial vertical section as viewed from the right, showing the packer bail drive associated with one column of bins, auxiliary bails and elements associated therewith and a sorted document detecting switch associated with a bin deflector.

The rearward deflector plate 1931 is formed centrally with an aperture 1979 to pass a document detector finger 1980 when the plate 1931 is swung rearwardly to the position shown in Fig. 25. The front deflector plate 1930 is formed with two notches 1981 opening through its bottom edge to clear the vertical conveyor belts 1880 and with a narrower intermediate notch 1982 also opening through the bottom edge of the plate 1930 to clear the lower end of the detector finger 1980 when the plate 1930 is swung rearwardly with the plate 1931 to the position of Fig. 25.

To insure that documents diverted from the vertical conveyors by a bin deflector will be fully positively fed into the bin, two rollers 1984 are each provided with a short shaft 1985 extending from opposite sides of the roller and into slots in upwardly turned side flanges of an individual mounting bracket 1986 which is secured to the upper edge portion of the member 1947. The two upward flanges of each bracket 1986 are apertured to embrace the shaft 1933 on each side of a respective one of the rollers 1932. Tension springs 1987 are anchored at their forward ends on the shaft 1933 and connected at their rearward ends to the projecting ends of the shaft 1985 of the roller 1984 to urge the latter forwardly and upwardly into frictional driving contact with the respective roller 1932. The upper portion of each roller 1984 is located in an aperture in the plate 1952 and rises slightly above the upper surface of the latter plate to make frictional driving engagement with a respective one of two small rollers 1989, each rotatably carried by a mounting member 1990 (Fig. 25) having a resilient mounting arm 1991 extending through a slot in the member 1947 next above and secured to the latter. Thus each roller 1032 which is driven by a belt 1880 in turn drives a roller 1984 which cooperates with a roller 1989 carried by the next upward bin deflector assembly to feed the document deflected from the vertical conveyor by the said next upward bin deflector fully through the slot between the guide plate 1952 and the next higher plate 1942.

The shaft 1934 below each vertical array of shafts 1933 and carrying the lowermost rollers 1932 is, like the shafts 1933, supported in the end plates 1945 of an assembly including also a plate 1952 and a member 1947 of the same form as the correspondingly numbered elements of the above described deflector assembly and similarly supported by the plates 1521 and 1522. However, the shaft 1934 is without a deflector plate 1931.

Below the lowermost plate 1942 for each of the three vertical columns of bins, there is a plate 1992 having upturned flanges along its right and left sides. The plate 1992 is laterally sildably supported along its rear edge on a transverse angle member 1993 and along its front edge on the rear edge of a plate 1994 having retaining lugs overlying the front edge of the plate 1992. The member 1993 is secured at its ends to the base frame side members 1501 and 1502 and the fixed plate 1994 is secured at its right and left sides to the members 1521 and 1522, respectively. A fixed deflector plate 1995 is also secured at its right and left sides to the members 1521 and 1522. The plate 1995 has portions extending forwardly between and at both sides of the belts 1880 and its rearward portion closely overlies the forward portion of the plate 1994 so that any document which might possibly pass through the entire length of a vertical conveyor passage without being deflected into one of the nine sorting bins will be delivered into the removable tray formed by the plate 1992 at the bottom of the column.

*Sorted document detectors*

The detector finger 1980 (Figs. 22 and 25) is secured on the rightward end of a shaft 1996 which is rotatably supported near its rightward end in the leftward one of the pair of mounting brackets 1986 and at its leftward end in the left side member 1945. Adjacent the latter member, an arm 1997 is secured at its upper end to the shaft 1996 and is pivotally connected at its lower end to the rearward end of a link 1998. The forward end of each of the twenty-seven links 1998 is pivotally connected to the upper end of an arm 1999 (Fig. 25) angularly adjustably secured to the pivoted operating lever 2000 of a respective one of twenty-seven switches SD1 to SD27 secured to the left-hand members 1521 on the inward faces of the latter. Each switch SD1–SD27 is a single-pole, double-throw, self restoring switch which is normally closed on one side.

Each detector finger 1980 is normally positioned vertically as shown in Fig. 25 and, when the adjacent deflector is in the normal downward forwarding position, the deflector finger is rearward of the rear deflector plate 1931 but aligned with the opening 1979 in said plate. When the deflector, by energization of the connected one of the solenoids BD1–BD27, is operated to the deflecting position as shown in Figure 25, the detector finger 1980 extends vertically through the opening 1979, across the document passage between the deflector plates 1931 and 1930 and into the notch 1982 in the deflector plate 1930 so that a document passing through the operated deflector and into the entrance of the associated document bin will engage the detector finger 1980 and swing it rearwardly clear of the notch 1982 in the deflector plate 1930 until the document is drawn clear of the deflector plates by the rollers 1984 and 1989. Such rearward swinging of the detector finger 1980 acts through the shaft 1996, arm 1997, link 1998 and lever 1999, 2000 to operate the connected one of the switches SD1–SD27 to open its normally closed contacts and close its normally open contacts. The switches SD1–SD27 as will be described hereinafter, control circuit means for terminating the cycle of operation of the sorter and, inter alia, deenergizing the operated solenoid BD1–BD27 to permit the spring 1976 to restore the operated deflector to normal position. After the sorted document has cleared the detector finger 1980, the latter, together with the parts 1996—2000 are restored to normal by the self-restoring action of the operated switch SD1–SD27.

*Sorted document trays*

Figure 27:
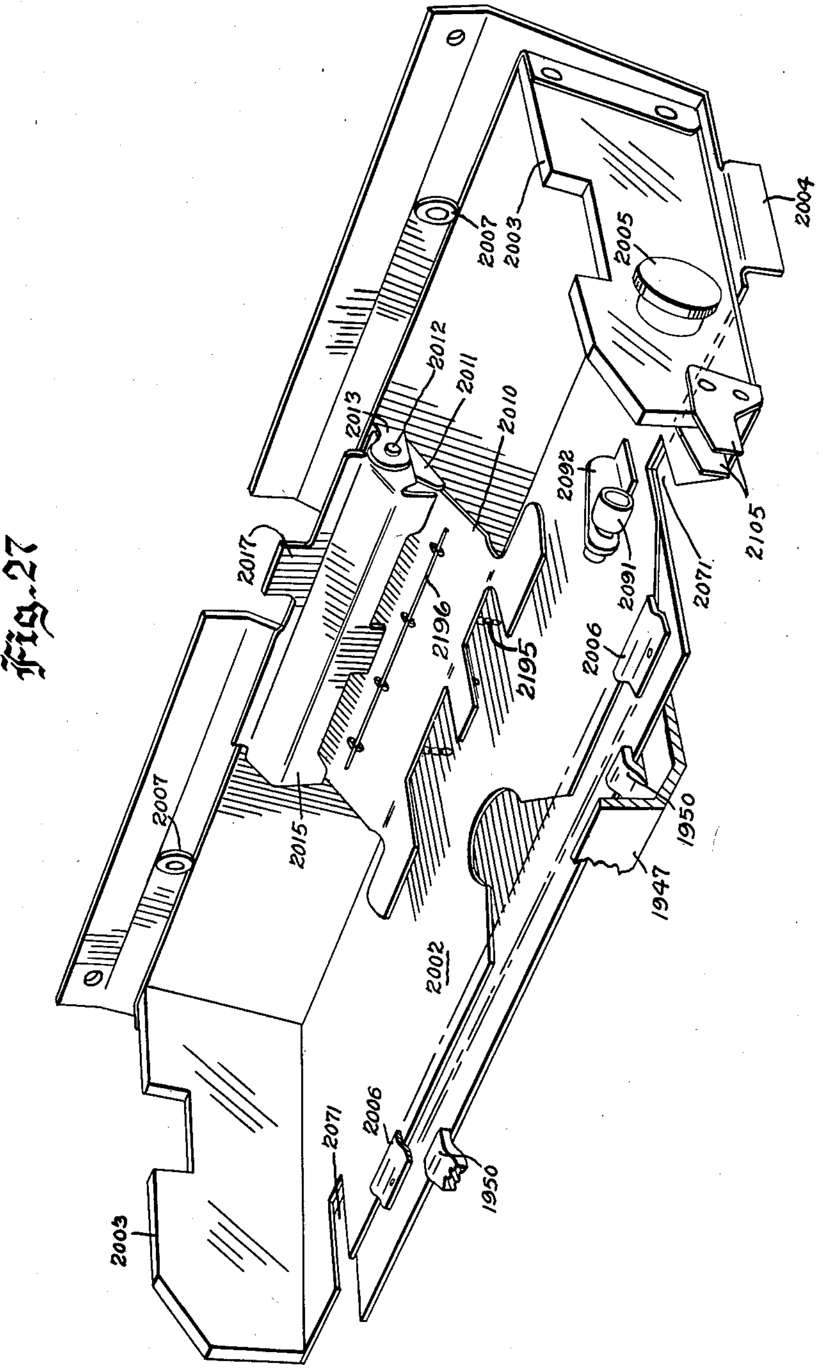
Fig. 27 is a detail in perspective of a document tray.
Figure 28:
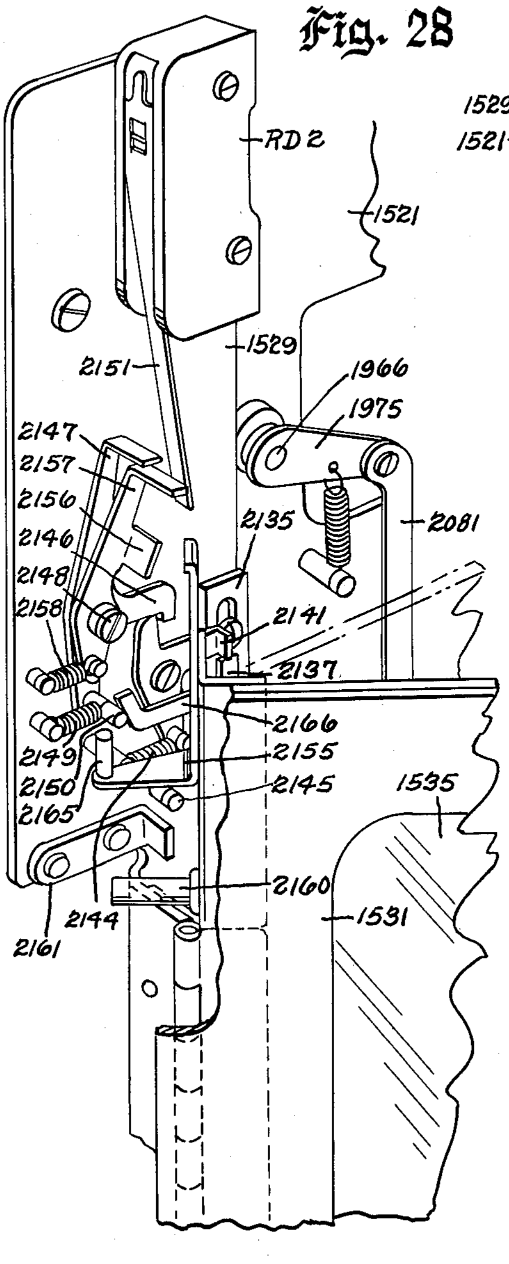
Figs. 28 and 29 show, in perspective, a switch means and operating elements therefor controlled by a door of the sorter unit.

In each of the 27 document destination bins there is a removable tray to receive and hold documents sorted into each bin and to permit ready removal of the stored documents. One such tray is shown in Figure 27. It comprises a metal sheet 2002 bent to form a tray floor and a rear wall having forwardly bent side flanges which are secured to the rear edges of transparent sheet plastic side wall members 2003, each of which is secured along its lower edge to the side edges of the floor portion of the plate 2002. Each of the pocket plates 1942 except the lowest one in each column of bins has on each side edge a downward projection 2004 which extends into a slightly larger notch in the upper edge of the adjacent side wall member 2003 of the tray in the next lower bin to prevent documents from flying out over the sides of the trays as the documents arrive in the bins at considerable velocity. Finger knobs 2005 are secured to each of the tray side walls 2003 on the outer side thereof.

To guide the movements of each tray during insertion in and withdrawal from its bin a guide strip 2006 (Fig. 27) has its forward edge portion secured to the plate 1942 and has a slightly elevated rearward flange extending over the forward edge of the tray member 2002. Two laterally spaced rollers 2007 mounted on studs secured in the upper rear portion of the plate 1942 closely overlie the upper rear edge of the tray member 2002.

Within each document tray there is a document packer bail 2010 having at the rear ends of its two sides upwardly turned ears 2011 by which it is pivotally supported on a shaft 2012 having its ends secured in the forwardly turned arms of a bracket 2013 secured approximately centrally to the upper rear portion of the tray member 2002. An irregularly formed operating bail 2015 has at each side a downwardly turned ear by which it likewise is rockably supported on the shaft 2012. A torsion spring 2016 (Fig. 100) coiled about the shaft 2012 has one end engaged over the upper edge of the bracket 2013 and its other end engaged behind the operating bail and urges the operating bail 2015 counterclockwise so that projecting portions of the downwardly turned front edge of the bail 2015 normally press against the packer bail 2010 to depress the forward portion of the latter against documents within the tray. A small light coil spring 2018 is connected between the mid portion of the operating bail 2015 and the mid portion of the packer bail 2010 so that when an upwardly extending finger 2017 of the operating bail is pressed rearwardly, the spring 2018 will raise the packer bail 2010 and keep it in contact with the downward projections of the front portion of the operating bail 2015. The bail 2015 may thus be operated by hand, after removing the tray from the bin, for the purpose of releasing the contained sorted documents for easy removal from the tray. Means for mechanically operating the packer bail during operation of the sorter unit will be described hereinafter.

*Packer bail operating means*

Each packer bail 2010 is operable by an individual operating lever 2020 (Fig. 25) which carries a roller 2021 to cooperate with the finger 2017 of the packer bail. The operating lever 2020 is pivotally mounted on a bracket 2022 secured to the rearward face of the rear portion of the next higher pocket plate 1942. The operating lever 2020 has a bifurcated short rearward arm cooperating with a roller 2023 mounted on a stud secured in a vertical link 2025, there being one such link 2025 for each vertical column of pockets. The lower end of the link 2025 carries another roller 2026 guided in a vertically elongated slot in the upstanding arm of a guide bracket 2027 secured to the forward portion of the adjacent member 1520. The upper end of each link 2025 is pivotally connected to the rear end of an arm 2030 which at its forward end is secured on a respective one of three cross shafts 2031 which, at their ends, are mounted in brackets 2032 secured to the frame side plates 1523 and 1524.

An individual arm 2035 is secured at its rearward end to each shaft 2031 just rightwardly of the left hand bracket 2032, and, on its forward end, carries a roller 2036 bearing against the periphery of a cam 2037 secured to the driven member 2038 (Fig. 14) of one of three clutches 2040, each on the leftward end of a respective one of the three shafts 1882.

Figure 14:
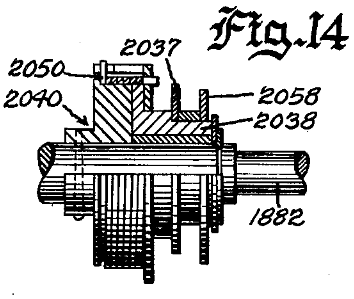
Fig. 14 is a partial section and elevation of a packer bail clutch.

As may be seen from Figure 14, the clutches 2040 are similar in general construction to the endorser operating clutches as shown in Figure 13, although the arrangement and formation of the parts are reversed laterally so that each packer bail operating clutch (Fig. 14) is similar to a mirror image of an endorser operating clutch (Fig. 13). Each packer bail operating clutch is normally held disengaged by the upward forward end of a control lever 2042 (Fig. 25) which is pivotally mounted at its lower rearward end on a stud 2043 secured in the member 1522 and pivotally connected intermediate its ends to the plunger 2044 of a respective one of three solenoids PB1, PB2 and PB3 secured against the inner face of the left-hand bracket 2032. The control lever 2042 is also pivotally connected intermediate its ends to a link 2046 which, in turn, is pivotally connected to a second control lever 2047 pivotally mounted at its lower rearward end on a stud 2048 secured in the member 1522. A tension spring 2049 anchored on the member 1525 is connected to the control lever 2047 and normally holds a leftwardly turned lug on the upper end of the latter out of and the upper forward end of the lever 2042 in the path of the projecting end of the clutch spring 2050.

It will be apparent that when one of the solenoids PB1, PB2 and PB3 is energized, it will draw its plunger 2044 rearwardly, thereby disengaging the connected control lever 2042 from the clutch spring 2050 and simultaneously pulling the lug on the forward end of the control lever 2047 into the path of the projecting end of the clutch spring 2050. The clutch will thereby be engaged for a half revolution, after which the projecting end of the clutch spring 2050 will be arrested by the control lever 2047 thereby disengaging the clutch 2040. The cam 2037 being driven through a half revolution will depress the roller 2036 thereby rocking the lever 2035, shaft 2031 and arm 2030 to elevate the link 2025 which by its roller studs 2023 operates all nine associated operating arms 2020 to rock the packer bails 2010 in all nine document trays of the associated column clockwise to lift their forward ends upwardly away from the previously sorted documents within the trays.

The operated packer bails remain lifted as long as the associated solenoid PB1–PB3 remains energized, which, as explained more fully hereinafter, is until after the document being sorted operates the document detecting finger 1980 associated with the deflector for the document pocket into which the document is to be delivered. Upon deenergization of the packer bail clutch solenoid, the spring 2049 restores the clutch control levers 2047 and 2042 to normal, thereby disengaging the lever 2047 from the clutch spring 2050 to permit reengagement of the clutch for a second half revolution and simultaneously positioning the lever 2042 to arrest the projecting end of the spring 2050 to disengage the clutch at the end of that second half revolution. In the second half revolution of the clutch 2040 the cam disk 2037 permits the shaft 2031, the link 2025, operating arms 2020 and the packer bails 2010 to be restored to normal by the springs 2016 so that the sorted documents are again compressed against the floors of the trays by the packer bails.

For each packer bail clutch, there is an arm 2054 pivotally mounted at its lower end on a stud 2055 secured in the member 1522. A tension spring 2056 anchored on the stud 2043 and connected to the arm 2054 urges the latter clockwise to press a roller 2057 carried by the upward end of the arm 2054 against the periphery of a disk 2058 secured to the driven member 2038 of the clutch. The disk 2058 is formed with two diametrically opposite shoulders so positioned that at the end of each half revolution of the clutch, the roller 2057 engaged under one or the other of the shoulders of the disk 2058 prevents reverse rotation of the driven member of the clutch.

Each link 2025 near its upper end carries a cam plate 2060 which, when the link 2025 is elevated to lift the packer bails 2010, acts on a roller 2061 carried by the operating arm of a respective one of three normally open switches PS1, PS2 and PS3, to close said switch. Each switch PS1, PS2 and PS3 is mounted on an individual bracket 2062 secured to the adjacent cross member 1525.

*Auxiliary packer and full bin sensing bail and operating means therefor*

In each bin there is a bail 2065 (Figs. 22, 25 and 26) which operates to engage the top of the pile of sorted documents within the tray in each cycle of operation of the sorter prior to the time that the packer bail 2010 in the tray is removed upwardly away from the documents so that the document next to be delivered into the tray may pass over the auxiliary bail 2065 and under the elevated packer bail 2010, after which the packer bail 2010 is again lowered on top of the newly arrived document before the auxiliary bail is restored to normal position in the final portion of the sorter operation. The extent to which the auxiliary bail 2065 may be moved on each operation is determined by the height of the stack of previously sorted documents within the tray.

Whenever the stack of sorted documents within the tray reaches a predetermined height and so limits the operation of the auxiliary bail 2065 to a predetermined extent, means controlled by the auxiliary bail causes operation of a warning means to inform the operator that the tray has reached a full condition.

The auxiliary bail comprises a blade 2065 having at each end an upwardly turned portion in which is secured a stud 2067 pivotally supported in the upper end of a respective one of a pair of arms 2068, each secured on an end portion of a shaft 2070 which is rotatably supported in rear arms of the side plates 1945 of the next lower deflector assembly. As shown in Figure 27, the forward edges of the tray plates 2002 and the pocket plates 1942 are both cut away at 2071 to accommodate rearward swinging movement of the bail supporting arms 2068.

The right-hand arm 2068 carries a stud 2072 below the right-hand stud 2067 and projecting inwardly through an arcuate slot 2073 in a downward extension of a plate 2066 secured to the right-hand upwardly turned end of the blade to limit rocking movement of the bail blade 2065 relative to the arms 2068. A tension spring 2075 connected between the down-turned forward edge of the blade 2065 and the stud 2072 urges the blade 2065 toward its counterclockwise limit. In the normal position of the arms 2068, an inwardly turned lug 2076 on the forward edge of the downward extension of the plate 2066 is engaged by the member 1947 to aid the spring 2075 to hold the blade 2065 with its rearward edge pressed upwardly against the rear edge of the plate 1952 as shown in connection with the uppermost bin in Figures 25 and 26.

The right-hand bail supporting arm 2068 has a downward and forward extension 2078 which carries a stud 2080 which is located a short distance forwardly of the shaft 2070 and extends outwardly under a rearward projection on the lower end portion of a link 2081 (Fig. 26), which at its upper end is pivotally suspended on a stud secured in the rearward end of the arm 1975 or in the rearward end of the lever 1977, as the case may be, which is secured on the rightward end of the shaft 1966 of the deflector for the bin in which the auxiliary bail 2065 under consideration is located. The lower portion of the link 2081 is slotted for guidance on a stud 2082 secured in the plate 1521. A small lever 2085 pivotally mounted on a stud in the lower end of the link 2081 is urged counterclockwise by a tension spring 2086 connected between a lug on the forward edge of the link 2081 and a stud secured in an upward arm of the lever 2085 so as to maintain a rearward arm of the lever 2085 pressed upwardly against the underside of the stud 2080 to yieldingly urge the latter upwardly into engagement against the underside of the lower rearward extension of the link 2081. It will be apparent that when a bin deflector solenoid BD1–BD27 is energized to rock a deflector to position for deflecting a document into a bin, the auxiliary bail 2065 in that bin will be swung rearwardly and downwardly on top of the stack of previously sorted documents within that bin by the elevation of the lever 2085 and link 2081 connected with the arm 1975 or the lever 1977 operated by the energized bin deflector solenoid BD1–BD27.

In the rearward swinging movement of its supporting arms 2068 the rearward edge of the bail blade 2065 is yieldingly pressed against the undersurface of the next higher bin plate 1942 by the spring 2075 so as to scrape off any previously sorted document which may adhere to that plate 1942 because of a static electric charge accumulated by it in its transit through the conveyor. To aid the blade 2065 in so removing documents from the plates 1942, the latter are preferably formed with downwardly inclined fingers 2088 (Figs. 25 and 26) struck out of the plates 1942 and so spaced laterally as to permit the forwardly projecting fingers of the packer bail 2010 to pass upwardly between the fingers 2088.

In the continuing rearward swinging of the supporting arms 2068 the rearward edge of the bail 2065 remains pressed against the next higher plate 1942 or its fingers 2088 until the stud 2072 reaches the forward end of the slot 2073, after which time the blade 2065 swings unitarily with the arms 2068 until an inwardly turned lug 2090 on the rear edge of the downward extension of the right-hand plate 2066 engages a stud 2091 adjustably mounted in a slot in an upward arm of a bracket 2092 (Figs. 25, 26 and 27) secured to the removable tray plate 2002. In the final portion of the rearward swinging of the arms 2068, the stud 2091 rocks the blade 2065 about the supporting studs 2067 clockwise relative to the arms 2068 until the blade 2065 engages the top of the stack of documents pressed under the packer bail 2010 prior to the time the latter is removed upwardly by operation of the appropriate packer bail clutch.

When the rearward swinging of the auxiliary bail 2065 and its arms 2068 and 2078 is limited by engagement of the bail with the pile of sorted documents in the bin, the spring 2086 yields to permit arrest of the rearward arm of the lever 2085 by the stud 2080 without interference with the full upward movement of the link 2081 and full operation of the shaft 1966 and the deflector operated by the latter.

*Full bin detecting means*

During the rearward swinging of the auxiliary bail arms 2068, the forward end of the forward and downward extension 2078 of the right hand arm 2068 will normally engage and elevate a stud 2095 secured in a one of three vertically extending links 2096, each of which at its upper and lower ends is pivotally connected to the rearward ends of a pair of arms 2097 which in turn are pivotally supported at their forward ends on studs 2098 secured in the plate 1521. A finger 2100 secured to the link 2096 near the lower end of the latter extends leftwardly over and normally bears upon the operating element of one of three switches FBS1, FBS2 and FBS3 mounted on the plate 1521. The weight of each link 2096 is sufficient normally to maintain the associated switch FBS1, FBS2 or FBS3 in operated position, the latter being a single-pole, double-throw switch which is self-restoring to open its forward contacts and close its back contacts. When the links 2096 are in their normal lowered positions, the forward contacts of the switches are closed and the back contacts thereof are opened, but when a link 2096 is elevated by the extension 2078 of an operated auxiliary bail supporting arm, the associated switch restores itself, closing its back contacts and opening its forward contacts.

When the pile of sorted documents in a bin grows in excess of a predetermined height and thus limits the rearward swinging movement of the auxiliary bail 2065 in an operation of the sorter for sorting a document destined for the bin under consideration, the rearward swinging of the auxiliary bail is so limited that the arm 2078 fails to lift the link 2096 far enough to permit a restoring operation of the associated one of the switches FBS1, FBS2 or FBS3. These switches are, as hereinafter described in detail, connected in a circuit so contrived as to operate the previously mentioned warning device to notify the operator of the full document bin condition and perform other functions which will be mentioned later.

*Document tray latching and releasing means*

Figure 29:
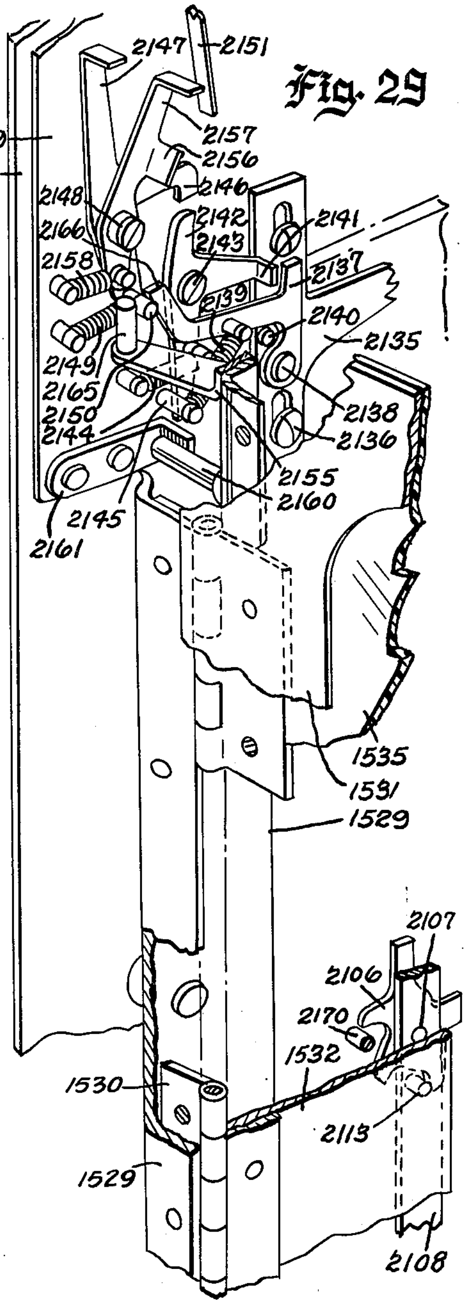
Figure 30:
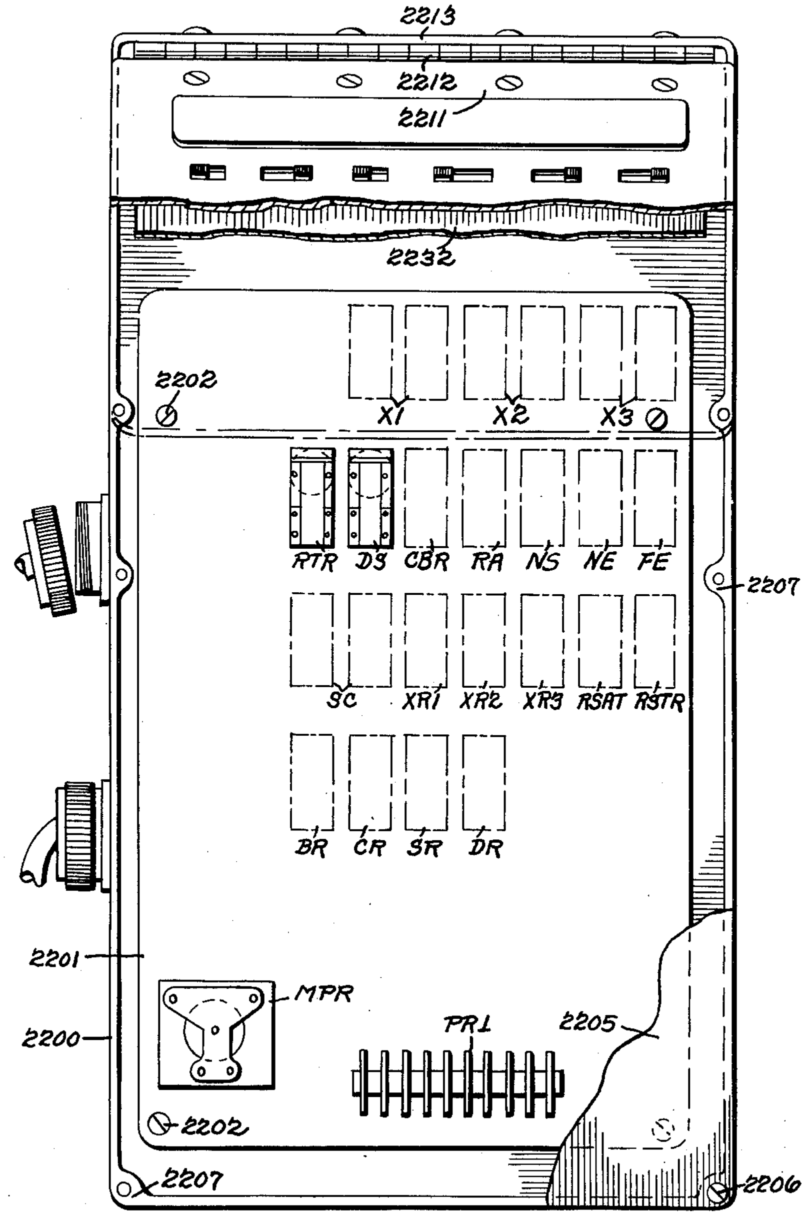
Fig. 30 is a partial left side elevation of a control unit with most of the left side casing panel broken awav.

A pair of small plates 2105 (Figs. 26 and 27) secured to opposite sides of the lower forward edge portion of the right-hand side wall member 2003 of each document tray extend forwardly from the member 2003 on opposite sides of a rearwardly extending finger of a latch member 2106 (Figs. 26 and 29). One such latch member 2106 for each bin in a vertical column is pivotally mounted on a stud 2107 secured in a slide 2108 which extends vertically from top to bottom of the column of bins and is slotted near its upper and lower ends for guidance of studs 2109 secured in and extending inwardly from the hinged plate 1532. A tension spring 2112 is connected between a stud secured in the pivoted latch member 2106 and a stud 2113 secured in the slide 2108. The spring 2112 and the studs to which it is connected at each end are so arranged relative to the pivot stud 2107 that the axis of the spring 2112 is rearward of the axis of the pivot stud 2107 when the latch member 2106 is in the normally latching position so that the spring 2110 then yieldingly holds the latch engaged between the forward ends of the latch keeper plates 2105. The latch member 2106 has two projections extending downwardly, forwardly and rearwardly of the stud 2113 in such relation to the stud 2113 as to limit clockwise movement of the latch 2106 at the latching position shown in Figure 26, and to limit counterclockwise movement of the latch member only after such counterclockwise movement has carried the axis of the spring 2112 forwardly of the pivot stud 2107 so that if the latch member 2106 is rocked counterclockwise to tray unlatching position in circumstances hereinafter explained, the spring 2112 will yieldingly retain the latch member in such unlatching position until it is again rocked clockwise to latching position by other means.

Each latch member 2106 also has an upwardly extending finger which, while the latch member 2106 is in its clockwise latching position and the slide 2108 and latch members 2106 thereon are in their lowered positions, is located below and rearwardly of a lug 2115 extending rightwardly from a lever 2116 pivotally mounted on a screw stud 2117 (Fig. 22) secured in the right-hand bushing 1948 of the deflector assembly for the same bin. The lever 2116 has an upward arm having on its upper end a stud 2118 which is located above a downwardly and rearwardly inclined cam edge of a cam projection 2119 on the rearward edge of the link 2081 for operating the auxiliary bail 2065 in the bin with which the latch 2106 is associated. The lever 2116 also has a downward arm which is inclined slightly forwardly and is normally engaged against the rear of a lateral projection 2120 on the rear edge of the lower portion of the link 2081. The normal positions of the link 2081 and lever 2116 are shown with respect to the link 2081 and lever 2116 associated with the uppermost bin in Figure 26 in which, however, the slide 2108 and latch members 2106 carried thereby are shown in partially elevated positions.

Near its upper end, each slide 2108 has a finger 2125 extending rearwardly over a stud 2126 extending laterally from a plunger of one of three solenoids BL1, BL2 and BL3 each secured to a small bracket 2128 which is in turn secured to a strip 2130 mounted on posts (not shown) extending outwardly from the plate 1523.

As previously explained, whenever the sorter is operated to sort a document, the deflector operating solenoid BD1–BD27 for the bin in which the document is to be delivered is energized to operate the deflector for that bin and at the same time it elevates the associated one of the links 2081 to operate the auxiliary bail 2065 in the same bin. When the link 2081 is elevated, its lug 2120 is moved upwardly away from the lower end of the latch control lever 2116 for the same bin and its cam projection 2119 acting on the stud 2118 rocks that control lever 2116 clockwise so that the lateral projection 2115 on the control lever is moved rearwardly over the upwardly directed finger of the latch member 2106 for that bin to position the projection 2115 rearwardly of the upper finger of the latch member. Then if the bin into which the document being sorted is to be delivered already contains a pile of previously sorted documents exceeding a predetermined height, the rearward and downward swinging of the auxiliary bail 2065 is so limited that the link 2096 is not elevated sufficiently to permit the full bin switch FBS1, FBS2 or FBS3 for the vertical column of bins to restore.

In any operation of the sorter in which the full bin switch for a vertical column of bins fails to restore, the solenoid BL1, BL2 or BL3 for the same vertical column of bins is energized, as will be fully explained hereinafter. It will be apparent that when the plunger of the energized solenoid is drawn upwardly it will lift the associated strip 2108 and all of the latch members 2106 carried thereby for that vertical column of bins. The upwardly directed fingers of the latch members 2106 for all of the bins in the column except that one which is to receive the document being sorted will move upwardly behind the lateral lugs 2115 of the associated latch control elevers 2116. In the case of the bin into which the document being sorted is to be delivered, the upward finger of the latch member 2106 moves upwardly in front of the projection 2115 on the lever 2116 which has been rocked clockwise from its normal position by the cam projection 2119 on the elevated link 2081. Such upward movement of the slide 2108 and latch members 2106 by a bin latch solenoid, BL1, BL2 or BL3 is insufficient to lift the rearward fingers of the latch members out of the space between the latch keeper plates 2105.

When, after the document being sorted has entered the full bin and has operated the sorted document detecting finger 1980 for that bin, and the deflector solenoid BD1–BD27 for that bin is deenergized to permit the spring 1976 to return the deflector and the link 2081 downwardly to normal positions, the lug 2120 on the link 2081 acts on the lower arm of the latch control lever 2116 and cams the control lever 2116 counterclockwise to normal position as the cam projection 2119 moves downwardly away from the roller 2118. During such restoration of the lever 2116, the lug 2115 thereon acts on the upward finger of the latch member 2106 to rock the latter counterclockwise to releasing position in which its rearward finger is elevated above the forwardly extending portions of the latch keeper plates 2105 of the tray in the bin which has received the sorted document.

The slide 2108 for that column of bins and all of the latch members 2106 thereon remain in the partially elevated position because the bin latch solenoid for that column of bins remains energized, as hereinafter explained more fully, until the right-side door 1531 for that column of pockets is opened and again closed. After opening the door, the operator may remove the unlatched tray from the sorter and empty it. To aid the operator quickly and easily to locate the full bin, that portion of the rearward finger of each latch member 2106 which is normally concealed between the latch keeper plates 2105 is painted with a distinctive bright color so that the latch member 2106 which is in released position clear of the plates 2105 is readily visible to the operator through the transparent door plate 1535.

*Interlock device to prevent sorting operation before opening and closing door after detection of full bin or while door is open*

The stud 2126 carried by the plunger of each bin latch solenoid also underlies the rearward end of an arm extending rearwardly from a respective one of three slides 2135 (Figs. 26, 28 and 29), each of which is guided for vertical movement on studs 2136 on the outer side of the upper end portion of the member 1529. A pawl 2137 pivotally mounted on a stud 2138 carried by the slide 2135 is urged counterclockwise by a tension spring 2139 which normally maintains the pawl in contact against a limit stud 2140 secured in the slide 2135 so that the upper end of the pawl 2137 is normally positioned under the rightwardly bent end 2141 of a rearward arm of a three-armed pawl 2142 pivotally mounted on a stud 2143 secured in the member 1529 forwardly of the slide 2135. The pawl 2142 is urged clockwise by a tension spring 2144 which, when the parts are in normal position, the slide 2135 then being in its lowered position, maintains a downward finger of the pawl 2142 engaged against a limit stud 2145 which also serves as anchor stud for spring 2139 and for one of the springs 1976. The upward arm of the pawl 2142 is then located under the downwardly extended rearward end of a rearward arm 2146 of a lever 2147 pivotally mounted on a stud 2148 secured in the member 1529 and urged clockwise by a tension spring 2149 connected between a stud secured in the member 1529 and a stud 2150 secured in a downward arm of the lever 2147.

When a bin latch solenoid is energized, the associated slide 2135 is elevated to the position of Figure 26 so that the upward projection of the pawl 2137 carried by the slide 2135 rocks the pawl 2142 counterclockwise far enough to move the upward finger of the pawl 2142 forwardly clear of the downward projection of the rearward arm 2146 of the lever 2147 so that the latter lever is then rocked clockwise by the spring 2149.

When the lever 2147 is rocked clockwise by its spring 2149, its rightwardly bent upper end actuates the operating member 2151 of a respective one of three self-restoring, single-pole, double-throw switches RD1, RD2 and RD3 to open the normally closed contacts and close the normally opened contacts thereof. The latter switches, as hereinafter explained more fully, control an energizing circuit for the previously mentioned full document bin signal lamp FBD on the keyboard of the master machine and also control means for preventing a further operation of the apparatus, for establishing a holding circuit for the energized bin latch solenoid BL1, BL2 or BL3 and for energizing a respective one of three bin column lamps DL1, DL2 and DL3 (Fig. 26) for the column of pockets in which the full bin is located. The three lamps are mounted on the plate 1523, one above each vertical column of bins.

To permit the operated right door switch RD1, RD2 or RD3 to restore to normal condition to permit further operation of the apparatus, it is necessary, as mentioned above, to open and again close the right-hand door 1531 for the column of bins containing the full bin, such door being indicated to the operator by the lighted door lamp DL1, DL2 or DL3 above the door. The upper front edge portion of the door frame plate 1531 extends leftwardly and carries a bracket 2155 (Figs. 28 and 29) which extends upwardly behind a rightwardly bent lug 2156 and the upper arm of a lever 2157 which is also pivoted on the stud 2148 and is urged clockwise by a spring 2158 so that when the door is swung outwardly the upper end of the bracket 2155 swinging rearwardly permits the spring 2158 to rock the lever 2157 clockwise. In such clockwise movement of the lever 2157, its rightwardly bent upper end engages the switch operating member 2151 to hold it in operating position. Opening movement of the door is limited by engagement of a stud 2160 secured in the leftwardly turned upper front edge portion of the door frame plate 1531 against the rightwardly projecting end of a stop bracket 2161 secured to the member 1529.

As the door approaches its fully opened position, a stud 2165 extending upwardly from a forwardly projecting lower end portion of the bracket 2155 acts upon the stud 2150 of the lever 2147 to restore the latter counterclockwise to normal position and simultaneously causes the stud 2150 to act upon the upwardly and forwardly inclined cam edge of a forwardly extending cam finger 2166 of the pawl 2137 to rock the latter pawl clockwise to move its upward projection rearwardly clear of the rearward finger 2141 of the pawl 2142. The pawl 2142 is thereby released for movement clockwise by its spring 2144 to its normal position where its downward finger limits on the stud 2145 and its upward finger is again positioned under the downward projection on the rearward arm 2146 of the restored lever 2147 to hold the latter in restored position. As the right door switch RD1–3 is then still held in operated position by the lever 2157 the solenoid BL1, BL2 or BL3 remains energized holding the slide 2135 upwardly and also holding the slide 2108 in its partially elevated position and maintaining the latch 2106 of the full bin in releasing position where its brightly colored portion is visible to the operator. The operator may reclose the door either with or without first removing, emptying and reinserting the full tray.

When the door is reclosed the upper end portion of the bracket 2155 engages the lug 2156 and restores the lever 2157 counterclockwise to normal position, thereby permitting the switch operating member 2151 and its switch to restore to normal. When the switch restores to normal, the door signal lamp is extinguished, the interlocked circuit is restored to normal, as hereinafter described, to permit a further operation of the apparatus and the bin latch solenoid is deenergized and permits the operated slide 2135 to be restored downwardly by gravity aided by the spring 2139 which then rocks the pawl 2137 counterclockwise to normal position where its upward projection is under the end portion of the rearward arm of the pawl 2142.

The deenergized bin latch solenoid also permits the slide 2108 to restore downwardly to move the upward finger of the released latch member 2106 downwardly clear of the lug 2115 of the associated lever 2116. During the downward movement of the slide 2108 and latch members 2106 a forward extending finger of the released latch member engages a stud 2170 (Figs. 26 and 29) which is secured in and projects leftwardly from the plate 1532 and rocks the released latch member 2106 clockwise sufficiently to shift the axis of the spring 2112 across the axis of the pivot stud 2107 so that said latch member is restored to latching position.

Figures 34, 34A, 35:
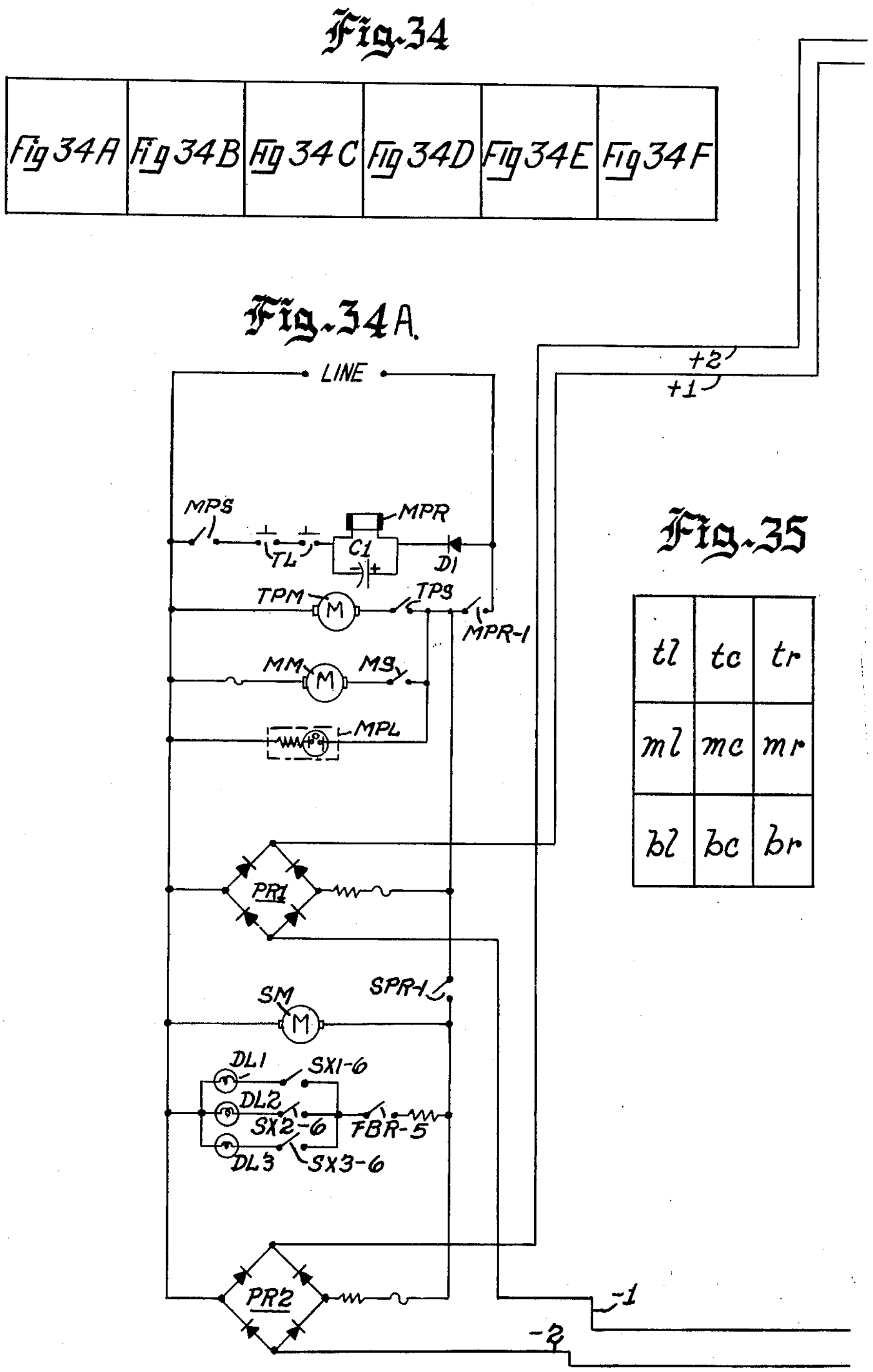
Fig. 34 is a diagram showing the manner of assembly in a complete control circuit diagram of the several portions of the control circuit diagram shown in Figs. 34A to 34F.
Fig. 35 is a diagram showing the areas of each of Figs. 34A to 34F designated by the latter combinations used to indicate the location of various circuit elements in the circuit diagram.
Figure 34B:
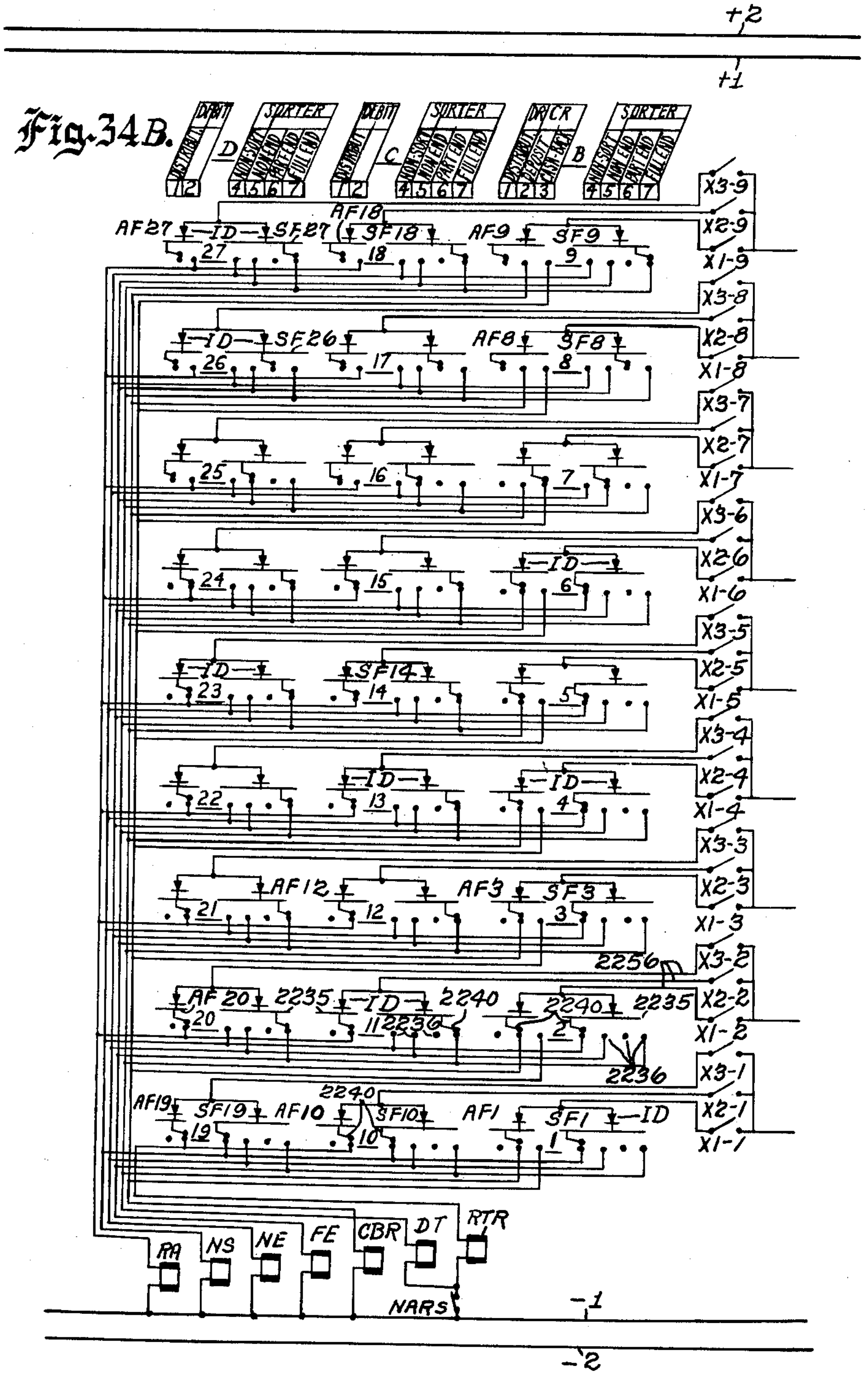
Figure 34C:
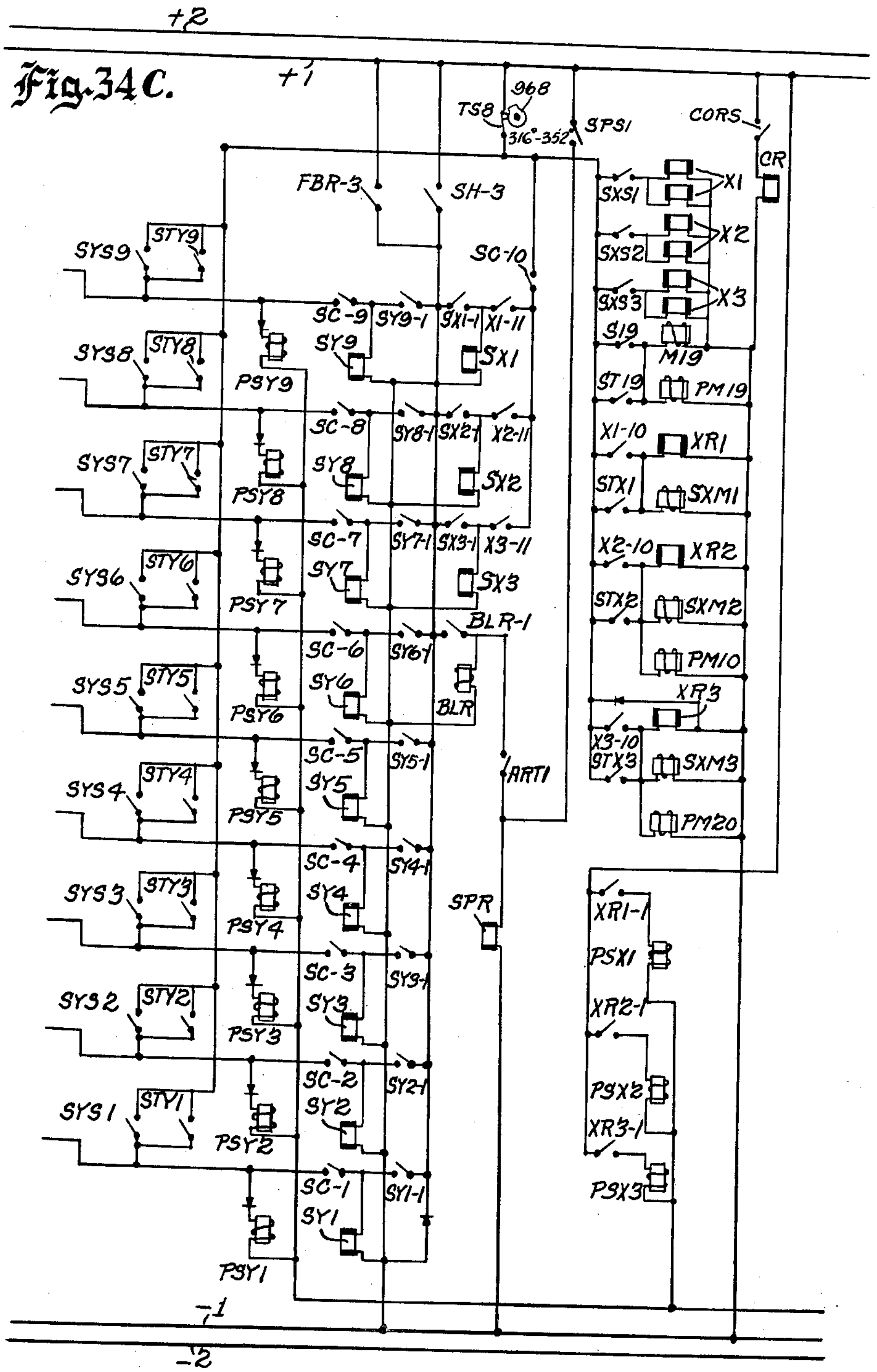
Figure 34D:
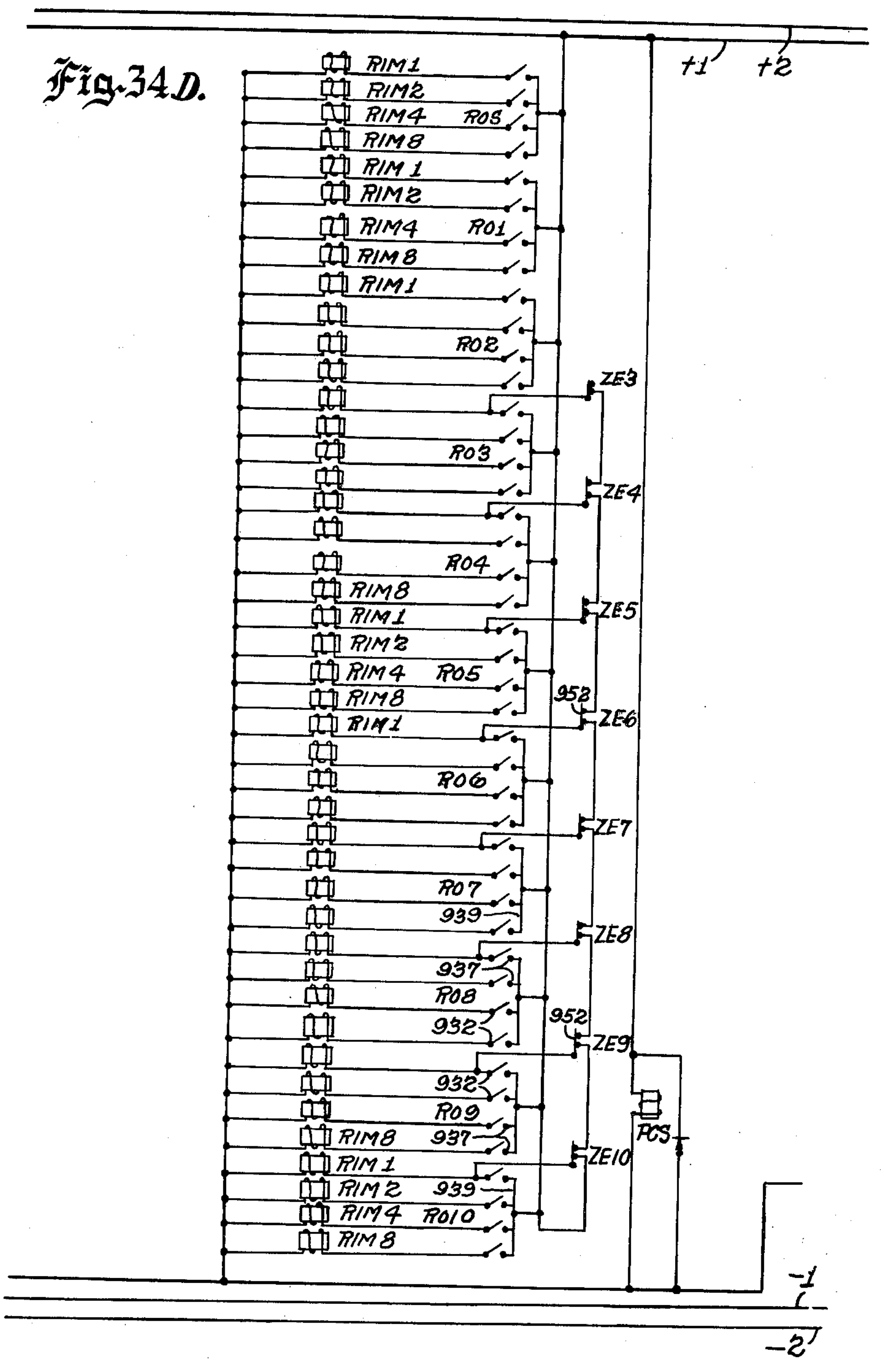
Figure 34E:
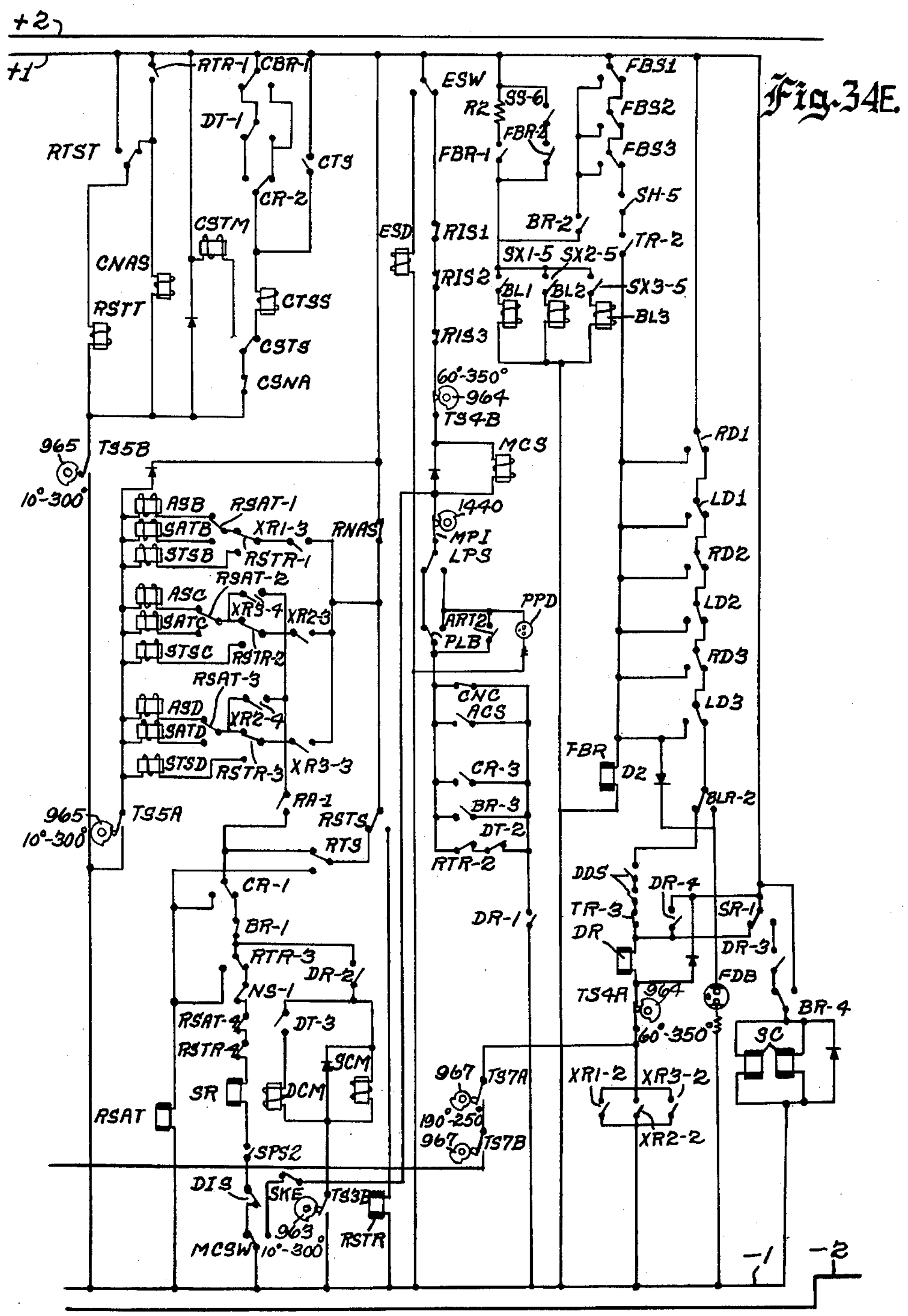

When left side doors are provided on the sorter, left door switches LD1, LD2 and LD3 (not shown in the mechanical drawings) similar to the right door switches but operated only by the respective left doors are provided and connected in circuit with the right door switches as shown in Figure 34E.

*Means for releasing all tray latches*

A long slide 2177 is horizontally slidably supported on shouldered screws 2178 which secure the member 2130 to its supporting posts. A tension spring 2179 connected between a stud in the slide 2177 and a stud 2180 secured in the member 2130 and extending through a slot in the slide 2177 urges the latter forwardly. However, the slide 2177 is normally held at substantially its rearward limit of movement by a squared stud 2181 secured in the slide and engaged by the rear edge of a lug 2182 extending upwardly from the left edge portion of the armature 2184 of a relay BLR. A bell crank 2186 supported on a pivot stud 2187 secured in a downward extension of the member 2130 has one arm extending upwardly in front of a stud 2188 secured in the slide 2177 and another arm extending rearwardly under a stud 2190 secured in the upper end of the slide 2108. When the relay BLR is energized, as hereinafter explained, by means controlled by the all register total key ART (Fig. 2) on the master machine, the armature 2184 of the relay is pulled downwardly against the tension of its return spring 2183, retracting the lug 2182 below the stud 2181. The slide 2177 is thereby released for movement forwardly by its spring 2179 so that the stud 2188 in the slide rocks the bell crank 2186 to elevate the slide 2108 fully to its uppermost position. Such full upward movement of the slide 2108 is sufficient to lift all of the tray latch members 2106 carried thereby upwardly clear of the latch keeper plates 2105 so that all of the trays in all three vertical columns are unlatched.

After a series of automatic register total-taking operations of the master machine is completed, as described in detail in our original application Ser. No. 705,443, and the all register total key ART restores to normal, the operator may relatch all of the trays in their pockets by manually returning the slide 2177 rearwardly to normal position by means of a finger piece or knob 2192 secured thereto so that the stud 2181 on the slide may be relatched by the lug 2182, the relay BLR having been deenergized at the conclusion of the all register total-taking series of operations of the master machine. It is of course intended that the operator will remove the trays one by one and reinsert them after having taken the sorted documents therefrom before operating the knob 2192 to relatch the trays.

*Sorted document braking and settling means*

Documents being sorted are carried through the conveyors at considerable speed by the rapidly driven belts and arrive in the sorting bins with considerable velocity and static electric charge which requires that effective means be provided to arrest and settle the sorted documents in proper position under the packer bails 2010 before the latter are lowered on top of the sorted documents. After various other means for that purpose were tested and found inadequate, the means illustrated in Figs. 25 and 26 were found to be preeminently satisfactory. Such means comprises a plurality of lengths 2195 and 2197 of very light chain of the character of jewelers' light chain. A number of the chain lengths 2195 (four illustrated in Fig. 24) are attached to and suspended from each packer bail 2010 by passing their upper ends through small apertures in the packer bail and then inserting a thin wire 2196 through the upper end links of the chains. As shown in Fig. 26, additional lengths 2197 of such chains are suspended at both sides of each packer bail 2010 and are attached at their upper ends to the next upward plate 1942.

A document arriving in a bin at high speed strikes edgewise against the light chains which yield without damaging the document but quickly and completely remove the kinetic energy therefrom and probably draw off an effective amount of any static electric charge thereon. In any case, the sorted document, upon striking the light chains, quickly settles and comes to rest under the raised packer bail 2010.

*Program control*

The program control unit comprises a preferably cast housing member 2200 (Fig. 30) having integral back, bottom and side walls and supported in any suitable manner on or from the left side of the master machine stand 105 (Fig. 1) rearwardly of the back portion of the sorter unit when the latttr is located as in Figure 1. In the interior of the housing member 2200, a panel 2201 (Fig. 30) is suitably supported in spaced relation to the back wall by screws 2202 passing through the panel 2201 through spacing collars (not shown) and into said back wall. Panel 2201 carries certain control circuit components which will be referred to more particularly hereinafter in the description of the circuit. The front of the housing member 2200 is closed by a front cover member 2205 which is removably secured thereto by screws 2206 passing through the member 2205 and threaded into bosses 2207 of the housing member 2200.

The top of the control unit housing 2200 is closed by a program setting switch panel 2210 (Fig. 31) comprising a top plate 2211 (Fig. 31) which is secured along its rear edge to one leaf of a hinge 2212, the other leaf of which is secured to a flange 2213 extending forwardly from the top of the rear wall of the housing member 2200. The plate 2211 is also secured at its front side corners to the housing member 2200 by the screws 2214 so that after removal of the latter, the switch panel may be swung upwardly about the flange 2213 for inspection and servicing.

Figure 31:
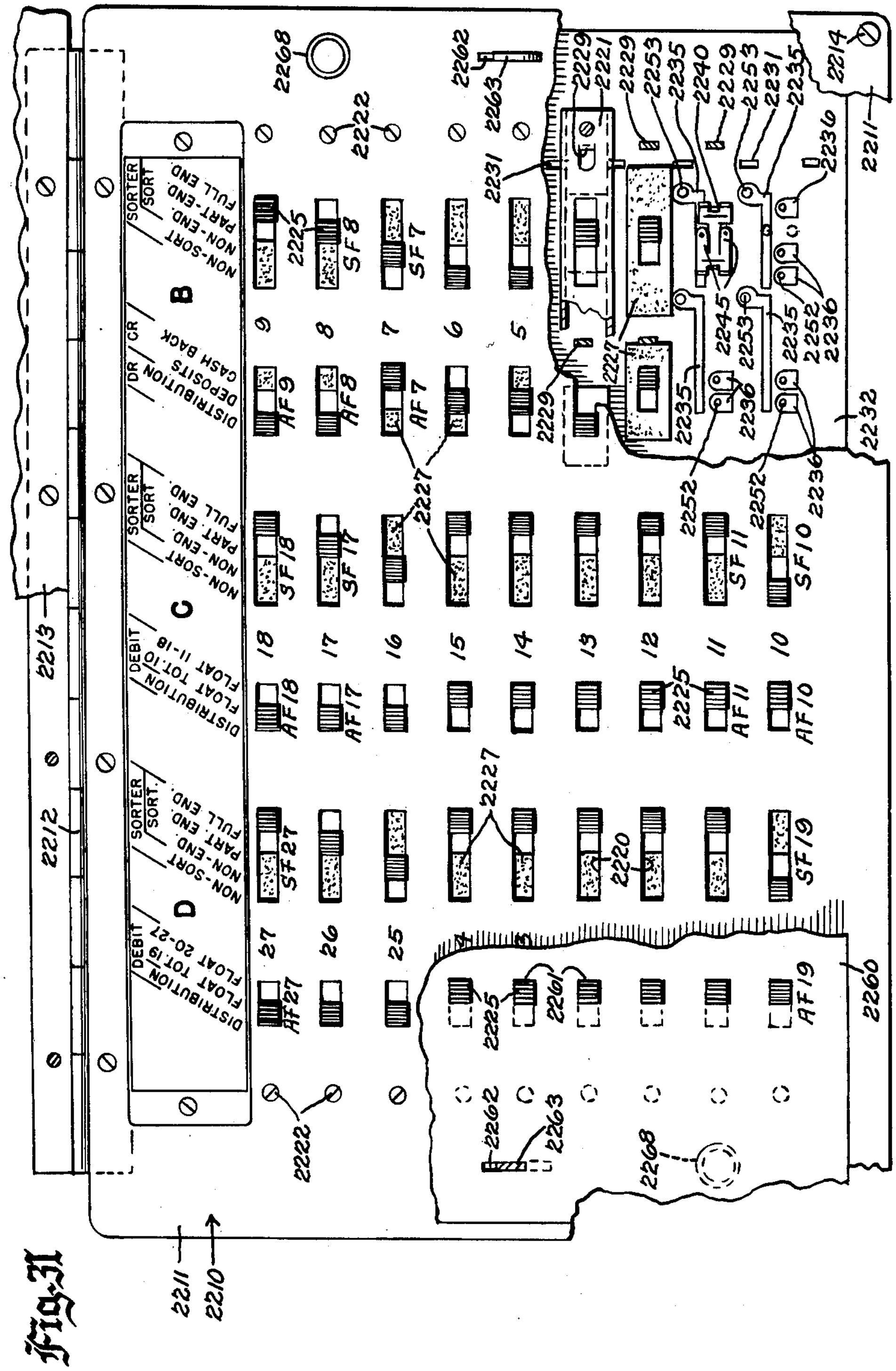
Fig. 31 is a partial plan of the program control switch panel of the control unit.

In the switch panel, there are twenty-seven pairs of multiple position switches AF1–AF27 and SF1–SF27 arranged in nine transverse rows and three columns of pairs, each switch having a finger piece extending upwardly through an aperture 2220 in the plate 2211. The pairs of switches are preferably numbered on the plate 2211 from 1 to 27 as indicated in Figure 31 corresponding to the twenty-seven selection keys SK1 to SK27 (Fig. 2), the twenty-seven registers of the three lines of registers in the master accounting machine, to the twenty-seven printers in the multiple tape printing unit, and to the twenty-seven sorting bins in the sorting unit. The right-hand switch SF1–27 of each pair is a four-position sorter function control switch, the left-hand switch AF1–9 of each pair numbered from 1 to 9 in the right-hand column is a three-position accounting or computing function control switch, and the left-hand switches AF10–27 of the remaining pairs numbered from 10 to 27 are two-position accounting or computing function control switches. Each of the fifty-four switches has one open position and its remaining position or positions is or are closed.

Figures 32, 33:
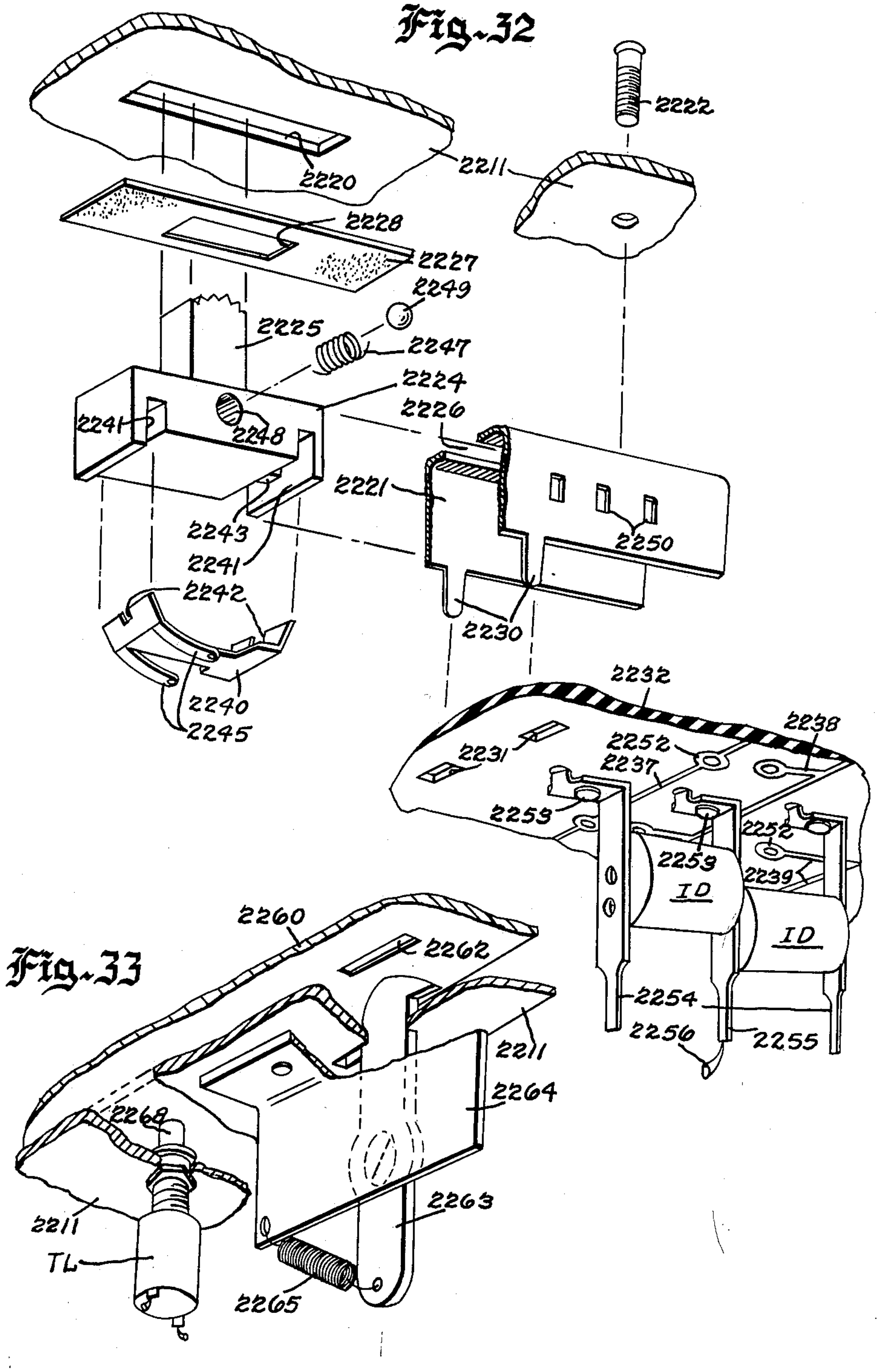
Fig. 32 is a detail of a program control switch in disassembled condition.
Fig. 33 is a detail of an interlock switch controlled by a control panel template.

For each transverse row of three pairs of switches there is a unitary transversely extending inverted channel member 2221 (Figs. 31 and 32) which is secured to the underside of the plate 2211 by screws 2222 passing through the plate 2211 and threaded into the transverse top portion of the channel members 2221 at each end thereof. Within each channel member 2221 there are six switch blocks 2224 formed of suitable insulating material, each having a stem or finger element 2225 extending upwardly through an individual aperture 2226 in the top of the channel member 2221, and through an aperture 2220 in the plate 2211, the apertures 2220 in the plate 2211 and the apertures 2226 in the channel members 2221, each being laterally elongated sufficiently to permit movements of the switch blocks 2224 and their finger stems 2225 lengthwise of the channels 2221 to the required number of positions for each switch.

Inserted between the top faces of the switch blocks and the under face of the tops of the channel members 2221 are small, thin, flat, movable, dust-excluding closure plates 2227, each formed with an aperture 2228 through which the finger stem 2225 of the associated switch block 2224 passes, the dimension of the aperture 2228 lengthwise channel 2221 being greater than the dimension of the finger stem by an amount equal to the distance of movement of the switch block from one switch position to the next adjacent switch position. The aperture 2228 in each plate 2227 is smaller than the distance from either side of the finger stem 2225 to the opposite end of the block 2224 so that there can never be an open passage through the aperture 2228 past either end of the associated switch block. The length of the plate 2227 is such that, in any position to which the associated switch block may be moved, the plate will extend beyond the ends of the associated switch block sufficiently to close off the aperture 2220 in the plate 2211, the length of the latter aperture being greater than the length of the switch block 2224. Lugs 2229 (Fig. 31) struck out of the top of the channel member 2221 extend downwardly to limit the endwise movements of the plates 2227 so that their end edges always remain beyond the ends of the apertures 2220. Thus, in all positions of the three and four-position switches, the plates 2227 prevent entrance of foreign matter into the interior of the switch panel assembly past either end of a switch block 2224. The openings 2228 in the plates 2227 for the two-position switches are large enough only to freely pass the finger pieces 2225 of those switches.

Lugs 2230 extending downwardly from the lower edge of both sides of each channel member 2221 pass through apertures 2231 in a plate 2232 of suitable insulating material and are each bent toward the adjacent lug 2230 on the opposite side of the same member 2221 on the underside of the plate 2232 to support the latter tightly against the lower edges of the channel members. The plate 2232 carries on its upper surface contact elements 2235 and 2236 for each of the switches, said contact elements being preferably applied thereto together with certain conductor elements (not shown in the mechanical drawings) by means of printed circuit technique and various conductor elements such as 2237, 2238, 2239 (Fig. 32) may also be applied to the undersurface of the plate 2232 in the same manner.

The lower part of each switch block 2224 is formed to accommodate a spring metal contact member 2240 having upturned end portions located in forwardly and rearwardly extending grooves 2241 in the switch block, the upturned end portions of the contact members being notched at 2242 to straddle projections or shoulders 2243 of the switch block within the grooves 2241 to maintain the contact member properly positioned relative to the switch block. Each contact member 2240 also has a pair of contact fingers 2245 struck from the longitudinal body portion thereof and bent downwardly to press yieldingly against contact elements 2235 and 2236 on the upper surface of the plate 2232.

Each switch block is yieldingly detented in each of its switch positions by means of a small helical compression spring 2247 (Fig. 32) inserted in a bore 2248 formed in the switch block, said spring 2247 acting on a ball 2249 located in the outer end portion of the bore 2248 and pressed into one of a number of apertures 2250 formed in the adjacent side of the channel member 2221.

As is apparent from Figure 31, for each switch there is one contact member 2235 with which the rear contact finger 2245 of the contact member 2240 makes sliding contact in at least all of the closed positions of the switch. For each closed position of each switch there is an individual contact member 2236 with which the forward contact finger 2245 of the member 2240 makes contact in the respective position of the switch. As shown in Figure 31, the four-position right-hand switch SF1 of the No. 1 pair is provided with only three contact members 2236, one for each of the three closed positions of the switch, no contact being provided for the open position. The same is true with respect to the four-position right-hand switch of each of the twenty-seven pairs. Similarly, the three-position left-hand switches AF1–AF9 of each of the pairs from 1 to 9 have contacts 2236 provided for each of two closed positions and no contact 2236 is provided for the one open position. Likewise each two-position switch AF10–AF27 has one contact member 2236 for its one closed position and no contact 2236 for its open position. However, in Figure 34B all of the fifty-four switches of the program setting switch panel are shown with contacts 2236 all of their switch positions including the open positions, for the purpose of clearly indicating the open positions as well as the closed positions.

Each contact element 2236 makes contact with a conducting element 2252 which extends through the insulating plate 2232 and in turn makes contact with one or another of the printed conductors on the underside of the base plate. Each conductor 2235 has a rearward extension making contact with a conducting securing element 2253 which secures a conducting mounting bracket or clip member 2254 (Fig. 32) to the underside of the plate 2232. Each member 2254 has a depending portion apertured to receive and make supporting and conducting contact with the cathode terminal of a respective one of two small isolating rectifiers ID, the anode terminals of both of which are supported by and make conductive contact with a similar bracket 2255 mounted on the underside of the plate 2232 by another fastening element 2253 which, however, will not make contact with any contact element on the upper surface of the plate 2232. The bracket 2255 has electrical connection with a conductor 2256 whereby each of the twenty-seven conductors 2256 has unilaterally conductive connections with both contacts 2235 of a respective one of the twenty-seven pairs of switches.

To insure that the twenty-seven switches of the program setting switch panel will always be set to the proper positions for any work being performed with the apparatus, there is provided, for each different work program, a template 2260 formed with twenty-seven apertures 2261 of a size and form to fit snugly about the finger stems 2225 of the switches, each aperture 2261 being so located in the template as to insure that when the template is placed over the switch panel in correct position relative thereto, each switch will be in the proper set position required for the desired work program. To insure correct positioning of the template 2260 on the switch panel, the template is formed at opposite sides with apertures 2262 to pass down over the upper end of a latch lever member 2263 which extends through an opening in the plate 2211 and is pivotally mounted on the vertical side portion of a bracket 2264 secured to the underside of the plate 2211. The latch member 2263 is urged counterclockwise by a tension spring 2265 connected between the lower end of the latch lever and the bracket 2264. The upper end of the latch lever is provided with a forwardly projecting latch nose which, when the template 2260 has been lowered to the proper position, engages over the upper surface of the template forwardly of the aperture 2262 to releasably hold the template accurately positioned on the switch panel.

As the template is lowered to proper latched position on the switch panel, it engages and depresses the operating button 2268 of each of a pair of self-opening switches TL mounted on the underside of the panel plate 2211 adjacent a respective one of the two latches 2263. The switches TL as shown in Figure 34A are connected in series with the main power switch MPS (Fig. 6) so that, as more particularly described hereinafter, the main power control circuit will remain open to prevent operation of the apparatus at all times when a program template 2260 is not properly positioned on the program setting switch panel to insure proper positioning of each of the fifty-four accounting function and sorter function control switches for a proper work program.

*Control circuit and mode of operation*

The control circuit which ties the master accounting machine, the multiple tape printer and the sorter together with the program control panel and governs the operation of the apparatus is shown schematically in Figures 34A to 34F, inclusive. The diagram in Figure 34 illustrates the position in the complete circuit, of the circuit portion shown in each of Figures 34A to 34F.

Figure 34F:
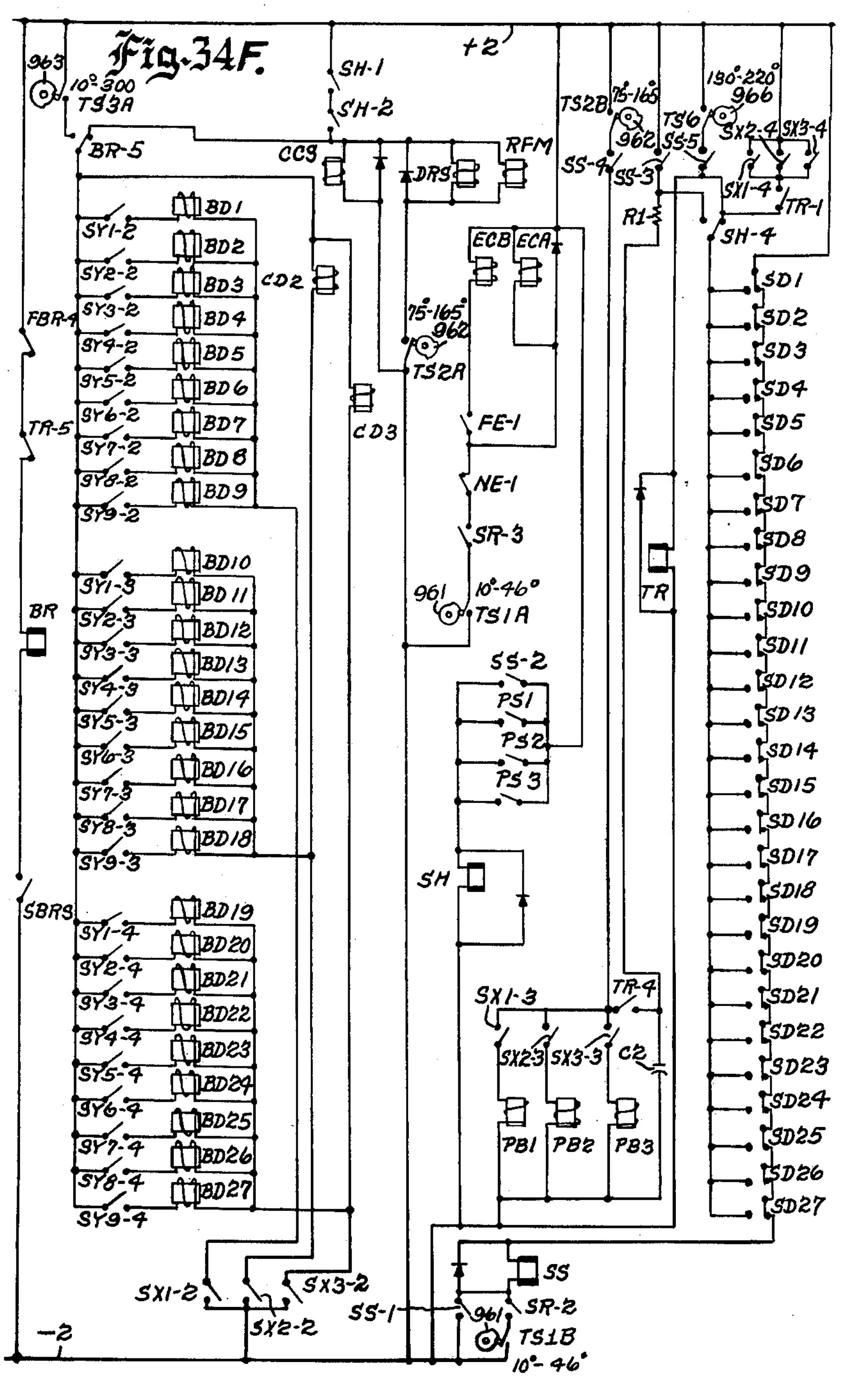

All circuit components are designated basically by one or more capital letters. Where there are a plurality of corresponding circuit elements provided in similar circuit portions associated with the several accumulating registers of the master machine, the several printers of the multiple tape printer, the several document bins of the sorter or with different decimal orders of the computing mechanisms, those corresponding components are designated by same reference letters with the non-hyphenated addition of an identifying numeral, as for example, in the case of the twenty-seven sorted document detection switches SD1 to SD27 (Figs. 25 and 34F). Relays and arrays of relays are similarly designated and the contacts operated by each relay are identified by the same reference letters and numbers as the relays with the hyphenated addition of identifying numerals, as for example, in the instance of the hereinafter described relay XR3 and the contacts XR3–1 to XR3–4, inclusive, operated by that relay.

To facilitate locating the hereinafter described circuit components in the circuit diagram of Figures 34A to 34F, the reference letters and numerals designating the circuit components will be followed in parenthesis by the capital letter (A to F) of that one of Figures 34A to 34F in which such circuit component is shown and, in the case of Figure 34A, by the lower case letter *t*, *m* or *b* to indicate the portion, top, middle or bottom, of the figure, in which the component is located. In the case of Figures 34B–34F, the figure designating capital letter will be followed by two lower case letters (*t*, *m* or *b* plus *l*, *c* or *r*) to designate that portion of the figure indicated by the same two lower case letters in the diagram in Figure 35, in which the component is shown, the letters *t*, *m* and *b* indicating top, middle and bottom respectively and the letters *l*, *c* and *r* indicating respectively left, center and right. Thus, for example, BLR–1 (C*mc*) indicates that the No. 1 contacts of relay BLR will be found in the middle center ninth of Figure 34C. However, a series of circuit elements extending from side to side or from top to bottom of a sheet will be located merely by the figure letter plus a single letter to indicate that third of the sheet in which the series of elements are placed, as for example, in the instance of the switches SD1 to SD27 (F*r*).

The reference letters of substantially all the electrical control circuit components are listed alphabetically in Figs. 36 and 36A, which also show the location of such components in the mechanical drawings and in the circuit diagram figures, except that components located in the master accounting machine or in the multiple tape printer unit are not shown in the mechanical drawings of this application but are shown in the mechanical drawings of the aforementioned original application.

In the circuit diagram all switches and relay contacts are shown in their normal conditions with the power switches open to disconnect the system from the power supply line.

Preliminarily, it may be pointed out that the twenty-seven pairs of manually settable switches AF1 to AF27 and SF1 to SF27 (B) on the program control panel (Fig. 31) are each associated through the contacts X1–1 to X3–9 (B*r*) of three pairs of relays X1, X2 and X3 (C*tr*), with the switches SXS1, SXS2, SXS3 (C*tr*) and the switches SYS1 to SYS9 (C*l*) (operated by the keys SK1 to SK27 as disclosed in detail in the above-mentioned original application) in such manner that the sorting and computing function control circuits controlled by each of the twenty-seven pairs of switches AF and SF is associated with a respective one of the twenty-seven selecting keys SK1 to SK27 (Figs. 6 and 7) on the master machine keyboard so that, as will be described in detail, each pair of program control panel switches AF and SF will govern certain sorting and computing functions to be performed in operations initiated by depression of a respective one of the selecting switches SK.

The switches SYS1 to SYS9, and the switches SXS1 to SXS3 through the relay pairs X1 to X3, are associated with sorting bin selection relays SY1 to SY9 (C*c*) and SX1 to SX3 (C*tc*) which in turn through their contacts SY1–2 to SY9–4 (F*l*) and SX1–2, SX2–2 and SX3–2 (F*bl*) control bin deflector solenoids BD1 to BD27 (F*l*) and column deflector solenoids CD2 and CD3 (F*tc*), so that each master machine keyboard selecting key SK1–SK27 may select a respective one of the twenty-seven document bins of the sorter to receive a document.

The switches SXS1 to SXS3 through the relay pairs X1 to X3 control the circuits of the master machine register selection control magnets SXM1, SXM2 and SXM3 (C*mr*), control the circuits of the register designation printing control magnets PM10, PM19 and PM20 (C*mr*), and control the relays XR1, XR2 and XR3 (C*mr*) which in turn through their contacts XR1–3, XR2–3, XR3–3, XR2–4 and XR3–4 (E*ml*) control in part the circuits of register function control solenoids ASB, ASC, ASD, SATB, SATC, SATD, STSB, STSC and STSD (E*ml*) of the master machine.

The switches SYS1 to SYS9 and the switches SXS1 to SXS3 through the relay pairs X1 to X3 and the relays XR1 to XR3 control the circuits of printer selecting magnets PSY1 to PSY9 (C*l*) and PSX1 to PSX3 (C*br*) of the multiple tape printer so that each selecting key SK1 to SK27 on the master machine keyboard selects a respective one of the printers of a multiple tape printer to function in the operation initiated by depression of the selecting key. Also, read-out switch units ROS and RO1 to RO10 (D*c*) of the master accounting machine are associated with read-in magnets RIM1, RIM2, RIM4 and RIM8 of the multiple tape printer unit for indexing corresponding order type wheels of the multiple tape printer so as to control the indexing of the type wheels of the multiple tape printer in accordance with the data entered in or taken from a rain totalizer or crossfooter and/or an operated accumulating register or registers of the master machine and printed by the latter in each operation. The contacts STY1 to STY9 (C*l*) of an all register total switch assembly of the master machine are connected in parallel to the contacts of the switches SYS1 to SYS9 and the contacts STX1, STX2 and STX3 (C*mr*) of said all register total switch assembly are connected in parallel to the relay contacts X1–10, X2–10 and X3–10 so that the all register total switch assembly controls the selection of the printer units of the multiple tape printer and controls the register selection magnets SXM1 to SXM3 and register designation printing control magnets PM10, PM19 and PM20 of the master machine in the same manner as the selection switches SK1 to SK27, and likewise controls the circuits of the register computing function control solenoids of the master machine except that the selected register is operated for total taking instead of addition because the all register total switch assembly, when functioning, closes the switch RTST (E*tl*) which controls a solenoid RSTT (E*tl*) to enable a latch means for the amount differential stop slides of the master machine, and also operates a switch RTS which controls a register subtract and total relay RSAT (E*bl*), the contacts RSAT–1, RSAT–2, and RSAT–3 of which control the register add solenoids ASB, ASC and ASD and the register subtract and total solenoids SATB, SATC and SATD of the master machine.

As previously mentioned, the right-hand switch SF1 to SF27 of each of the twenty-seven pairs of program control panel switches is settable to govern certain sorting functions. Such control is effected, as will be described in detail, through relays NS, NE and FE (B*bl*), the windings of which are connected to contacts of all of the right-hand switches SF of the program control panel switch pairs. The left-hand switches AF1 to AF9 of the program control panel switch pairs control certain computing functions of the crossfooter through relays CBR and DT (B*bc*) and the left-hand switches AF11 to AF18 and AF20 to AF27 of the program control panel switch pairs from 11 to 18 and 20 to 27 control operation of certain registers through a relay RA (B*bl*). The left-hand switches AF10 and AF19 control a function of certain registers through the relay RTR (B*bc*).

An energizing circuit for the master machine cycling solenoid MCS (E*mc*) is so controlled by a combination of switches and contacts including the crossfooter nonclear switch CNC (E*mc*), the contacts DT–2 and RTR–2 (E*mc*) of the relays DT and RTR and the contacts DR–1 (E*bc*) of a relay DR (E*br*) which is in turn controlled by the contacts XR1–2, XR2–2 and XR3–2 of the relays XR1, XR2 and XR3 by the document detecting switches DDS (E*br*) of the sorter unit, and by the contacts SR–1 (E*br*) of a relay SR (E*bl*) which is in turn controlled by a combination of switches and relay contacts including the contacts RTR–3 and the contacts NS–1 (E*bl*) of the relay NS that by appropriate settings of the program control switches AF1 to AF27 and SF1 to SF27, selected ones of the keys SK1 to SK27 can be enabled to initate cycles of operation without or only with a document in the sorter chute, and selected ones of the keys SK1 to SK9 can be enabled to initiate cycles of operation regardless of the numerical condition of the crossfooter or only when the crossfooter is in the numerical condition (clear) it should be in if the previous work was correct.

On Figure 34B of the circuit drawing, the positions of the left hand switches AF of the switch pairs AF, SF are numbered 1, 2 and 3 and the positions of the right-hand switches are numbered 4, 5, 6 and 7. If the right-hand switch SF of any pair is in its 4 position, depression of the corresponding key SK on the master machine keyboard will initiate a cycle of operation without a document in the sorter chute and without operating the sorter. If the right-hand switch SF of the switch pair corresponding to the depressed selection key SK is in any of its three other positions, 5, 6 and 7, a cycle of operation will not be initiated unless and until a document is inserted in the sorter chute (Fig. 8) and closes the document detecting switches DDS or the key DS (Fig. 2) is depressed to open the sorter disabling switch DIS (E*bl*) as hereinafter explained. If the switch SF corresponding to the depressed selection key is in its 5 position, neither of the two endorser printers will be operated and the document will be sorted to the selected bin without endorsement. If the switch SF is in its 6 position, the type wheels 1606 (Fig. 9) will be operated to print a date and an identification number before the document is released and sorted to the selected bin. If the switch SF is in its 7 position the printing plate 1605 as well as the type wheels 1606 will print on the back of the document before it is sorted to the selected bin.

If the left-hand switch AF of the program control panel switch pair corresponding to the depressed selection key SK is in its 1 position, the amount entered on the amount keys of the master machine will be added in the crossfooter and in the selected register of the master machine. If the depressed selection key SK is one of the nine keys SK1 to SK9 and the left-hand switch AF of the corresponding program control panel switch pair is in either its 2 or 3 position, the relay DT or CBR will be energized and the amount set on the master machine amount keys will be subtracted from the crossfooter and added in the selected register of the master machine and if said switch AF is in its 2 position, the cycle of operation will not be initiated without depression also of the key AC if the crossfooter is not clear. If the depressed selection key SK is one of the sixteen keys SK11 to SK18 and SK20 to SK27 and the corresponding key AF is in its 2 position, the amount set on the master machine amount keys will be added in the selected register and will also be added in the No. 10 register if the depressed key is one of the keys SK20 to SK27 or will also be added in the No. 19 register if the depressed key is one of the keys SK11 to SK18. If the depressed key SK is one of the two keys SK10 and SK19 and the corresponding switch AF10 or AF19 is in its 2 position, a total will be taken from the corresponding register, the crossfooter will be non-added, and the cycle of operation will be initiated only if the crossfooter is clear, but without insertion of a document in the sorter document chute and the sorter will not operate regardless of the position of the right-hand switch SF10 or SF19 of the same switch pair.

The sorted document switches SD1 to SD27 (F*r*) control, through the relay SS (F*bc*) and others, holding circuit means hereinafter described in detail, which, in a document sorting operation keep the sorter unit operating and prevents initiation of another cycle of operation, in which a document is required to be sorted, until the document being sorted arrives in the sorter bin to which it should be sorted.

The register interlock switches RIS1, RIS2 and RIS3 (E*tc*) are connected in series in the energizing circuit of the master machine cycling solenoid MCSW so that a cycle of operation cannot be initiated at any time while the multiple pinion register assembly of any of the three lines of registers is displaced from normal position to or beyond its second register position.

The correction key COR operates a switch CORS (C*tr*) which controls a relay CR, the contacts CR–2 (E*tl*) of which are so arranged in relation to the contacts DT–1 of relay DT and contacts CBR–1 of relay CBR that depression of the key COR will in every case reverse the function (add or subtract) of the crossfooter determined by the switch AF1 to AF9 corresponding to any depressed selection key SK1 to SK9. Depressed with any selection key SK10 to SK27, the key COR always causes the crossfooter to subtract. The contacts CR–1 (E*bl*) so control the circuits of the relay SR and a relay RSAT having contacts in the circuits of the register add solenoids and register subtract and total solenoids that depression of the key COR prevents operation of the sorter and causes the register selected by the depression of any of the selection keys SK1 to SK9, SK11 to SK18 and SK20 to SK27 to subtract and will also cause the 10 or 19 register to subtract if one of the latter registers is selected for operation by reason of the switch AF for the depressed selection key being in its 2 position.

The operation of the entire system of Figs. 1 and 34A to 34F has been described in detail in the above-mentioned original application in connection with an illustrative but abbreviated example of work. Herein, only those operations will be described which are necessary for an understanding of the operation and functional capabilities of the sorting apparatus and its controls.

To prepare the apparatus for work, the program control panel switches AF1 to AF27 and SF1 to SF27 are first set to the positions required for the program of work in hand. It will be assumed that the switch settings are as shown in Fig. 34B.

Figure 2:
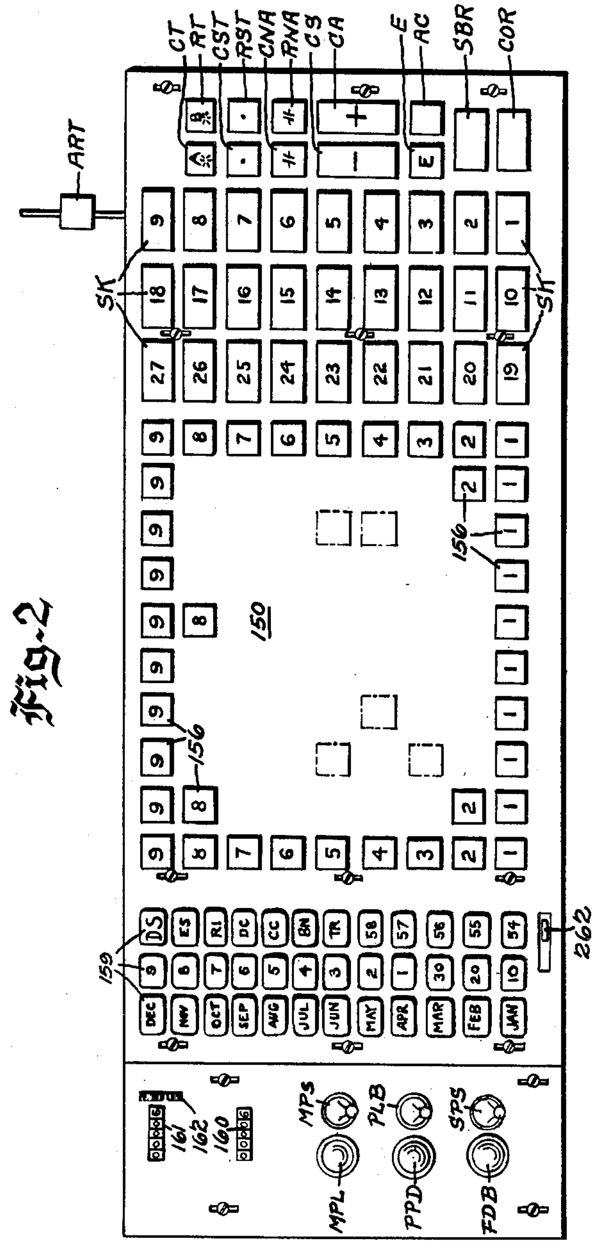
Fig. 2 is a plan of the master accounting machine keyboard showing switches, signal lamps and selection keys associated with the control circuits of the sorting apparatus.
Figure 4:
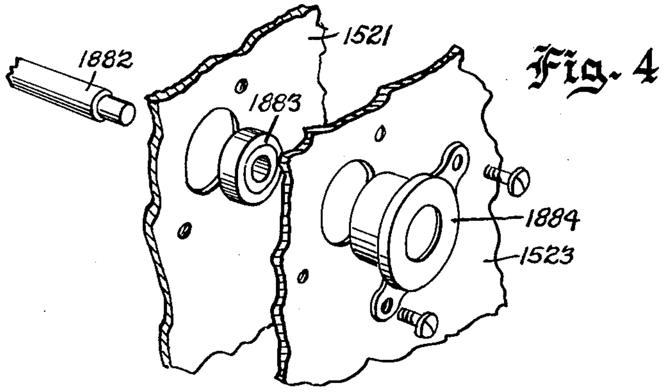
Fig. 4 is a detail of a shaft mounting.

Next, the plastic template 2260 (Figs. 31 and 33) will be placed on the program control switch panel and latched in place by the latches 2263. This insures that all of the switches AF1 to AF27 and SF1 to SF27 have been correctly set for the program of work at hand so that their finger pieces 2225 will pass through the apertures which have been cut in the template. The operator will then set the main power switch MPS and the sorter power switch SPS both on the master machine keyboard (Fig. 2).

The closing of the program control panel template switches TL (A*t*) by the placing of the template 2260 in latched position, and the closure of the main power switch MPS (A*t*) by the operator will complete the energizing circuit of the main power relay MPR (A*t*). To prevent chattering of the relay MPR, a small selenium rectifier D1 is inserted in series with the relay winding and the latter is shunted by a condenser C1. The relay MPR when energized closes its contacts MPR–1 (A*t*) in the power supply circuit of the multiple tape printer motor TPM (A*t*), the master machine motor MM, the master machine and multiple tape printer control power supply rectifier PR1 (A*m*), the sorter motor SM (A*b*), the sorter door lights DL1, DL2 and DL3 (A*b*), and the sorter control power supply rectifier PR2 (A*b*). Upon operating the sorter power supply switch SPS to closed position, its contacts SPS–1 (C*tc*) close the energizing circuit of the sorter power relay SPR (C*mc*) which is thereby energized and closes its contacts SPR–1 (A*m*) to complete the power supply circuit to the sorter motor SM and to the sorter control power supply rectifier PR2. The sorter motor, it will be remembered, is a continuously running motor.

Positive and negative potential power lines +1 and −1 run from the rectifier PR1 across the top and bottom, respectively, of Figures 34B to 34E and positive and negative potential power lines +2 and −2 run from the rectifier PR2 across the top and bottom, respectively, of Figures 34B to 34F.

The operation of the sorter power switch to the "on" position also closes its contacts SPS–2 (E*bl*) which completes the energizing circuit of the sort relay SR extending from the positive power line +1 at the top of Figure 34E through the normally closed switch RNAS, the normally closed contacts of the switches RSTS and RTS and the normally closed contacts CR–1, BR–1, RTR–3, NS–1, RSAT–4, RSTR–4, the winding of the relay SR, the closed contacts SPS–2, the normally closed switch DIS and the normally closed contacts of the switch MCSW to the negative power line −1. The relay SR upon energization transfers its contacts SR–1 (E*br*), thereby disconnecting the winding of the relay DR from the positive power line +1. The relay SR also closes its contacts SR–2 (F*bc*) in the circuit of the sort starting relay SS and closes its contacts SR–3 (F*mc*) in the circuit of the endorser clutch solenoids ECA and ECB.

Relative to the operations of the sorter, only the settings of the program control switches SF are significant. For each of the registers 1 to 27 of the master accounting machine into which the entry of items is to be permitted without the simultaneous sorting of a document to the corresponding sorter bin 1 to 27, the corresponding one of the switches SF1 to SF27 will be set to the extreme left position designated 4 in Fig. 34B so that in a cycle of operation by depression of the corresponding one of the keys SK1 to SK27, the non-sort relay NS (B*bl*) will be energized to open its normally closed contacts NS–1 (E*bl*) in the normally closed energizing circuit of the sort relay SR (E*bl*) to de-energize the latter which will then restore its contacts SR–1 (E*br*) to complete the energizing circuit of the relay DR (E*br*) which then closes its contacts DR–1 (E*br*) to complete the energizing circuit of the master machine cycling solenoid MCS (E*mc*) which then initiates a cycle of operation of the master accounting machine as described in detail in the above-mentioned orginal application. As the sort relay SR is de-energized it also opens its contacts SR–2 (F*bc*) and thus prevents the energization of the sorter starting relay SS (F*bc*) which is required for an operation of the sorting apparatus as will become apparent from the following description. It should, however, be noted at this point that whenever the relay SS is not energized, its contacts SS–5 (F*tr*) remain open and prevent energization of the document release solenoid DRS (F*tc*) and operation of the document stop member 1624 to release to the conveyor any document which may be in the chute 1600, 1601.

When any switch SF1 to SF27 is in any of the remaining three positions indicated as 5, 6 and 7 in Fig. 34B, depression of the corresponding key SK1–SK27 will not initiate a cycle of operation unless a document is in the document insertion chute 1600, 1601 of the sorter and holds the switches DDS closed. From Fig. 34E it is readily apparent that when the contacts SR–1 (E*br*) of the sort relay SR are in transferred position an open switch DDS (E*br*) will prevent energization of the relay DR (E*br*) and the contacts DR–1 (E*bc*) of the latter remaining open will prevent energization of the master machine cycling solenoid MCS (E*mc*).

The system shown in Fig. 1 with the control circuit shown in Figs. 34A to 34E is capable of performing various kinds of work involving many operations, some of which are described in the above-mentioned original application, in which the sorter is not operated. Hereinafter, only operations of the sorter will be described in detail to illustrate some of its capabilities. In such operations of the sorter in the system of Figs. 1 and 34A to 34F, the energizing circuits of certain electrically operated elements of the sorter are controlled as hereinafter explained by certain ones of a series of timing switches TS1A to TS8 operated by cams of the master accounting machine 102 of Fig. 1 during cycles of operation of the latter as described in detail in the above-mentioned original application but it will readily be understood that such circuits may be controlled by other timing means when the sorter is employed in other systems or for sorting purposes independently of an accounting system.

When an operation of the system of Figs. 1 and 34A to 34F is to be initiated by depression of a selection key SK1 to SK27 and the corresponding one of the program control switches SF1 to SF27 is in one of its 5, 6 or 7 positions, it is as previously explained, required that a document must be inserted in the sorter chute to close the switches DDS (E*br*) to initiate the cycle of operation.

The keys SK1 to SK27 in the system of Figs. 1 and 34A to 34E are on the keyboard of the master accounting machine and, in addition to controlling functions of the sorter as hereinafter described, also control functions of the master accounting machines 102 and functions of the multiple tape printer 103 as described in the above-mentioned original application. As also there described, each of the keys SK1 to SK27, when depressed, will operate one of the switches SXS1, SXS2, and SXS3 (C*tr*) and one of the switches SYS1 to SYS9 (C*l*).

It will be assumed that the selection key SK12 is depressed.

Depression of the key SK12 operates the switches SXS2 and SYS3 to closed position. The switch SXS2, in closing, completes the energizing circuit of the pair of relays X2 (C*tr*) which close their contacts X2–1 to X2–9 (B*r*), in the circuits controlled by the program control panel switch pairs in the middle column. Contacts X2–11 close in the energizing circuit of sort selection relay SX2 (C*mc*). The contacts X2–10 (C*mr*), in closing, complete the energizing circuit of the relay XR2. The relay XR2 closes its contacts XR2–2 (E*br*) in the circuit of the cycle delay relay DR.

The switch SYS3 in closing completes the energizing circuit of the relay FE (B*bl*) through the now closed contacts X2–3 (B*mn*) and the switch SF12, which is in its 7 position in Fig. 34B. The relay FE closes its contact FE–1 (F*mc*) to connect the winding of the endorser clutch solenoid ECB in parallel to that of the endorser clutch solenoid ECA.

When the operator drops the check into the sorter document chute, the rollers 1610 and 1611 (Fig. 7) feed the check against both of the document detecting fingers 1635 to operate the document detecting switches DDS (E*br*) to closed position, thereby closing an energizing circuit of the cycle delay relay DR, said circuit being traced from positive line +1 through the sorter right and left door switches RD1 to RD3 and LD1 to LD3 (E*mr*) through the normally closed contacts BLR–2, the now closed switches DDS, the normally closed contacts TR–3, the winding of the relay DR, the normally closed switch TS4A and the contacts XR2–2 to negative line −1. The relay DR in closing its contacts DR–4 establishes a holding circuit to keep itself energized after the document detecting contacts reopen, as mentioned later.

The contacts RD–3, in closing, complete the energizing circuit of the pair of sorter control relays SC (E*br*), said circuit extending from a positive line +1 through closed contacts SR–1, contacts DR–3 and the windings of both relays SC, in parallel, to negative line −1. The pair of relays SC close their contacts SC–1 to SC–10 (C*c*). The contacts SC–10, in closing, complete the energizing circuit of the sort selection relay SX2 (C*mc*), said circuit being traced from positive line +1 through switch TS8, contacts SC–10, contacts X2–11, and winding of relay SX2 to negative line −1. The relay SX2 closes its contacts SX2–1 in a holding circuit which will be completed later by the closing of contacts SH–3 (C*tc*). Relay SX2 also closes its contacts SX2–2 (F*bl*) in the energizing circuit of the column deflector solenoid CD2 which circuit, however, is still open at the contacts SH–1 and SH–2 (F*tc*). Contacts SX2–3 (F*br*) also close in the energizing circuit of the packer bail solenoid PB2, which circuit also is still open. Also contacts SX2–4 (F*tr*) close in a still open holding circuit for the relay TR and contacts SX2–5 (E*tc*) close in the energizing circuit of the bin latch solenoid BL2.

The contacts SC–3 (C*bl*) in closing, complete the energizing circuit of the sorting relay SY3 traced from positive line +1 through switch TS8, switch SYS3, contacts SC–3 and the winding of relay SY3 to negative line −1. Relay SY3 being energized closes its holding contacts SY3–1 (C*bc*) and its contacts SY3–2, SY3–3 and SY3–4 (F*l*) in the still open energizing circuits of the bin deflector solenoids BD3, BD12 and BD21. Of the latter solenoids, only solenoid BD12 is connected to negative line −2 through the closed contacts SX2–2.

The closing of the contacts DR–1 closes the energizing circuit of the master machine cycling solenoid MCS (E*mc*).

At the 10° point in the master machine cycle, the switch TS1A (F*mc*) and TS1B (F*bc*) will close. The closing of the switch TS1A completes the circuit of both endorser clutch solenoids ECA and ECB so that both the printing wheels 1606 and the plate 1605 (Fig. 9) are operated to print on the back of the check in the sorter chute. It will be readily understood that the operation of both said printers in this instance is determined by the fact that the program control switch (SF12) corresponding to the depressed selection key (SK12) is in its 7 position (Fig. 34B) so that the relay FE is energized to close its contacts FE–1 in the circuit of the solenoid ECB. Had the program control switch SF corresponding to the depressed selection key SK been in its 6 position the relay FE would not be energized and the contacts FE–1 would be open so that only the solenoid ECA would have been energized by the closing of the switch TS1A and only the numbering wheels 1606 would have printed. Had the corresponding switch SF been in its 5 position, the relay NE (B*bl*) would have been energized, instead of the relay FE, and would have opened its normally closed contacts NE–1 (F*mc*) so that neither solenoid ECA or ECB would be energized and neither the wheels 1606 nor the plate 1605 would be operated to print.

The closing of switch TS1B completes the circuit of the sort starting relay SS, said circuit extending from positive line +2 through all of the twenty-seven sorting bin detecting switches SD1 to SD27 in series, through the winding of the relay SS, the contacts SR–2 and switch TS1B to negative line −2. The relay SS, being energized, closes its contacts SS–1 to SS–6. Contacts SS–1 complete a holding circuit for the relay SS around the contacts SR–2 and TS1B. Contacts SS–6 (E*tc*) close in the still open circuit of the bin latch solenoids BL1, BL2 and BL3. Contacts SS–5 (F*tr*) close in the still open circuit of the timing relay TR. Contacts SS–4 (F*tr*) close in the still open circuit of the packer bail solenoids. Contacts SS–3 (F*tr*) close in a holding circuit for the packer bail solenoids and the only immediate effect of the closing of these contacts is the charging of the condenser C2 (F*br*). The closing of contacts SS–2 (F*mc*) completes the energizing circuit of the sort holding relay SH.

The relay SH, being energized, operates its contacts SH–1 to SH–5. Contacts SH–1 and SH–2 (F*tc*), closing, complete the energizing circuits for the bin deflector solenoid BD12, for the column deflector solenoid CD2, and for the conveyor clutch for solenoid CCS. The circuit for the bin deflector solenoid BD12 is traced from positive line +2 through the contacts SH–1 and SH–2, normally closed contacts BR–5 (F*tl*), contacts SY3–3 (F*ml*), the winding of solenoid BD12 and contacts SX2–2 (F*bl*) to negative line −2. The bin deflector solenoid BD12 (F*ml*), being energized, swings the document deflector for bin 12 in the sorter to direct the document being sorted into that bin. Through the link 2081 and lever 2085 (Fig. 101) it also swings the auxiliary bail 2065 down on top of the previously sorted documents, if any, in the tray in bin 12 and, if the bail 2065 is not arrested by a stack of sorted documents of more than a predetermined height, the bail arm 2068 lifts the link 2096 far enough to permit the switch FBS2 (E*tr* and Fig. 25) to restore.

The energizing circuit for the column deflector solenoid CD2 (F*tc*) is traced from the normally closed contacts BR–5 through the winding of said solenoid CD2 and contacts SX2–2 to negative line −2. The column deflector solenoid CD–2, being energized, swings the column deflector for the middle column of bins in the sorter to position to direct the document being sorted from the horizontal conveyor into the middle vertical conveyor for the middle column of bins. The energizing circuit of the conveyor clutch solenoid CCS (F*tc*) is traced directly from the contacts SH–2 through the winding of said solenoid to negative line −2. The solenoid CCS, being energized, causes the conveyor clutch (Fig. 87) to be engaged to drive the horizontal and vertical conveyor belts.

Contacts SH–3 (C*tc*), closing, complete holding circuits for the relays SX2 and SY3, said circuits being traced from positive line +1 to contacts SH–3. The holding circuit for relay SX2 continues from contacts SH–3 through holding contacts SX2–1 and the winding of relay SX2 to negative line −1 and the holding circuit for relay SY3 extends from contacts SH–3 through contacts SY3–1 and winding of relay SY3 to negative line −1. Contacts SH–4 (F*tr*), being operated, disconnect the front contacts of the switches SD1 to SD27 from the winding of the relay TR and connect them to the still open holding circuit for the packer bail solenoids PB1, PB2 and PB3. Contacts SB–5 (E*tr*) close in the still open circuit of the full bin relay FBR.

Also at about the 10° point in the master machine cycle, the switch TS3B (E*bl*) closes to complete the energizing circuit of the counter magnet SCM.

At about the 46° point in the master machine cycle, the contacts TS1A and TS1B reopen. The reopening of the switch TS1A (F*mc*) permits the endorser clutch solenoids ECA and ECB to restore in time to permit the latch members 1688 (Fig. 84) to return to normal position to relatch the clutch control members 1670 in restored, clutch-disengaging position before the completion of a single rotation of the driven members of those clutches so that only a single print is made by the wheels 1606 and plate 1605. The reopening of the switch TS1D (F*bc*) is without effect, as its contacts together with the contacts SR–2 are shunted by the holding contacts SS–1.

At about the 60° point, the switch TS4B (E*tc*) opens in the already opened circuit of the master machine cycling solenoid MCS. Also, the switch TS4A opens the energizing circuit of the relay DR, which then reopens its contacts DR–1 in the already open circuit of the master machine cycling solenoid MCS, opens its contacts DR–2 to break the circuit of the counting magnet SCM, opens its holding contacts DR–4 and reopens its contacts DR–3 to deenergize the pair of relays SC. The latter relays, deenergizing, open their contacts SC–1 to SC–10, contacts SC–3 and SC–10 being in the circuit of the relay SY3 and contacts SC–10 being in the circuit of the circuit of relay SX2, but these circuits remain energized over their previously described holding circuits through their holding contacts SX2–1 and SY3–1 and the contacts SH–3.

At about the 75° point the switches TS2A and TS2B are closed. The closing of the switches TS2A (F*tc*) completes the energizing circuits of the document release solenoid DRS (Figs. 6 and 7) and of the ribbon feed magnet RFM (Fig. 6). The document release solenoid DRS being energized rocks the stop device 1624 (Fig. 7) counterclockwise to permit the document to be fed downwardly out of the chute and into the conveyor system and retracts the document sensing fingers 1635 out of the path of the document, thereby also permitting the switches DDS (Fig. 7) to restore to normal. The switches DDS (E*br*) reopen in the already opened energizing circuit of the relay DR. The ribbon feed magnet RFM being energized releases the clutch pawl 1766 (Fig. 6) to permit the ribbon feed clutch to be engaged to drive the ribbon advancing means, as previously described.

The switch TS2B (F*tr*), closing, completes the energizing circuit of the packer bail solenoid PB2, said circuit extending from positive line +2 through the switch TS2B, contacts SS4 and SX2–3 and the winding of the solenoid PB2 to negative line −2. The packer bail solenoid PB2 (Fig. 25) being energized causes the packer bail clutch for the middle line of document bins to be engaged for a one-half rotation to lift the middle link 2025 and elevate all of the packer bails 2010 from the documents in the bins of the middle column. The lifting of the link 2025 (Fig. 30) closes the packer bail switch PS2 (F*mc* and Fig. 25) in parallel to the closed contacts SS–2 in the already closed energizing circuit of the relay SH.

At about the 130° point the switch TS6 (F*tr*) closes, completing the energizing circuit of the timing relay TR extending from positive line +2 through the switch TS6, contacts SS-5 and the winding of the relay TR to the negative line −2. The relay TR being energized closes its contacts TR-1 (F*tr*) to complete a holding circuit for said relay extending from positive line +2 through contacts SX2-4, contacts TR-1 and the winding of the relay TR to negative line −2. Contacts TR-2 (E*tr*) close in the circuit of the relay FBR so that, if the operated auxiliary bail 2065 (Fig. 25) in the selected document bin had been so limited as to prevent restoring opening of the full bin switch FBS1 (E*tr*), the closing of the contacts TR-2 would complete the energizing circuit of the full bin relay FBR (E*mr*) with results which will be described later.

Normally closed contacts TR-3 (E*br*) open in the already opened circuit of the cycle delay relay DR and, as hereinafter described, will remain open until the document being sorted has arrived in the correct document bin to prevent a further sorting operation from being initiated prior to that time.

Contacts TR-5 open in the circuit of the bin latch release solenoid BR (F*ml*), which circuit, however, is not closed in the presently described cycle of operation.

Contacts TR-4 (F*br*), closing, connect a condenser C2 in parallel to the winding of the energized packer bail solenoid PB2 and close a second energizing circuit for that solenoid, said circuit extending from positive line +2 through contacts SS-3, resistance R1, contacts TR-4 and SX2-3, and the winding of solenoid PB2 to negative line −2.

At about the 165° point in the cycle, switch TS2B (F*tr*) is re-opened in the initial energizing circuit of the packer bail solenoid PB2 but said solenoid remains energized over the above-described second circuit at reduced power as limited by resistor R1 to avoid overheating.

At about the 220° point in the master machine cycle the switch TS6 (F*tr*) opens in the initial energizing circuit of the timing relay TR, but said relay remains energized over its holding circuit through the contacts SX2-4, and TR-1.

At about the 316° point in the master machine cycle, switch TS8 (C*tc*) is opened, thereby opening the energizing circuits of the relays FE (B*bl*), X2 (C*tr*) and XR2 (C*mr*). Relay FE opens its contacts FE-1 (F*mc*) in the already opened circuit of the endorser clutch solenoid ECB. Relay X2 opens its contacts X2-1 to X2-9 (B*l*) associated with the switch pairs AF10, SF10 to AF18, SF18, reopens its contacts X2-10 in the already opened circuit of the relay XR2 and opens its contacts X2-11 (C*tc*) in the circuit of the sort selecting relay SX2 which, however, remains energized over the holding circuit including its holding contacts SX2-1 and the contacts SH-3. The relay XR2 being deenergized and opens its contacts XR2-2 in the already opened circuits of the delay relay DR.

At about the 318° point in the master machine cycle the depressed key SK12 is released, thereby permitting the switch SXS2 (C*tr*) in the already opened circuit of the relays X2 and the switch SYS3 (C*bl*) in the already opened circuit of the relay FE to reopen.

At about the 350° point in the master machine cycle, the switches TS4A and TS4B reclose in the circuits of the delay magnet DR and the cycling solenoid MCS, which circuits, however, have been opened at other points.

At about the 352° point the switch TS8 recloses and at the 360° point the master machine cycle is completed.

Meanwhile, after release of the document from the sorter chute and into the sorter conveyor system at about the 75° point of the master machine cycle, the document is carried forward by the horizontal conveyor belts into the column deflector for the middle column of bins and advanced by the middle vertical conveyor to the deflector for bin 12. Passing through that deflector and into bin 12, the document actuates the operating lever 1980 (Fig. 25) of the sorter destination switch SD12 (F*mr*), which is thereby transferred to open the energizing circuit of the sort starting relay SS (F*bc*) and to close momentarily, until the sorted document clears the switch operating lever 1980, a holding circuit for the packer bail solenoid PB2, said circuit extending from positive line +2 through switches SD1 to SD11 in series, transferred switch SD12, and transferred contacts SH-4 to resistance R1, thereby shunting contacts SS-3 of the deenergized relay SS. The relay SS being deenergized opens its holding contacts SS-1, opens its contacts SS-2 still shunted by the closed packer bail switch PS2, and opens its contacts SS-3.

When the document clears the operating lever 1980 in the deflector for bin 12, the switch SD12 restores, thereby opening the energizing circuit of the packer bail solenoid PB2 which, after a delay caused by the solenoid PB2 being energized for a short time longer by the discharge of the condenser C2, restores and permits the packer bail clutch for the middle column of document bins to engage for another half revolution to lower the link 2025 and permit the packer bails for that column of bins to restore to normal. The delay in deenergizing the packer bail solenoid caused by the condenser C2 gives the sorted document added time to reach a position at the rear of the tray and under the packer bail before the latter is lowered to normal position on top of the document. The lowering link 2025 simultaneously reopens the packer bail switch PS2, which in turn opens the energizing circuit of the sort holding relay SH. The relay SH being deenergized opens its contacts SH-1 to SH-5. Contacts SH-1 and SH-2 (F*tc*) open the energizing circuits of the column deflector solenoid CD2 and bin deflector solenoid BD12 to permit the associated column and bin deflectors and the operated auxiliary bail 2065 for bin 12 to restore to normal forward and upward position. It will be noted that the bail 2065 is lowered to engage the stack of previously sorted documents in the tray before the packer bail 2010 is lifted from the stack and that the packer bail 2010 restores to reengage the stack before the auxiliary bail 2065 is again lifted from the stack. The lifting of the auxiliary bail 2065 also permits the raised link 2096 to fall to normal position and operate the switch FBS2 to normal position. Contacts SH-3 (C*tc*) open the holding circuits of the sort selection relays SX2 and SY3, both of which restore all of their contacts to normal. Contacts SH-4 (F*tr*) and SH-5 (E*tr*) also restore to normal.

Relay SX2, deenergizing, restores its contacts SX2-1 to SX2-6. Contacts SX2-4 open the holding circuit of the relay TR, which, deenergizing, restores its contacts TR-1 to TR-5. Contacts TR-3, reclosing in the circuit of the delay relay DR, no longer delay the initiating of a new sorting operation. It will be noted that the contacts TR-3 are connected in series with the document detecting switches DDS so that they delay, until completion of the sorting operation, only a subsequent operation which also requires a sort.

The apparatus is now again at normal and ready for a further sorting operation.

In the event that it is desired before the end of the run of work to retrieve a sorted document from one of the sorter bins, as when it is known that a document has been sorted to the wrong bin, the unlatching of the single bin may be achieved by depression of the corresponding selection key SK with or after depression of the sorter bin release key SBR (Fig. 2). Assume it is desired to retrieve a document from the 12 bin. The operator will depress the key SBR and the key SK12.

Depression of the key SBR will directly operate the switch SBRS (F*ml*) to closed position, and switch SKE (E*bl*) opens.

The closing of the switch SBRS will complete the energizing circuit of the bin release relay bin BR, which will operate its contacts BR-1 to BR-5. Contacts BR-1 (E*bl*) open the energizing circuit of the sort relay SR so that the sorter unit will not perform a sorting operation and prevent energization of either of the counting magnets DCM or SCM during the operation performed with the key SBR depressed. Contacts BR–2 (E*tr*) close in the circuit of the bin latch solenoids BL1, BL2 and BL3. Contacts BR3 (E*mc*) close in the circuit of the master machine cycling solenoid MCS to short the cross-footer non-clear switch CNC regardless of whether or not the contacts RTR–2 and DT–2 remain closed. Contacts BR–4 (E*br*) are transferred to close the energizing circuit of the sort control relays SC, which in turn close their contacts SC–1 to SC–9 (C*c*) and SC–10 (C*tc*) in the circuits of the sort selecting relays SY1 to SY9 and SX1 to SX3. Contacts BR–5 (F*tl*) are transferred in the common portion of the energizing circuits of the bin deflector solenoids BD1 to BD27.

Depression of the key SK12 will close the switches SYS3 and SXS2. The closing of switch SYS3 (C*bl*) will complete the energizing circuit of the sort selection relay SY3, which will close its holding contacts SY3–1 and close its contacts SY3–2, SY3–3 and SY3–4 (F*l*) in the circuits of the bin deflector solenoids BD3, BD12 and BD21. The closing of switch SXS2 (C*tr*) will complete the energizing circuit of the relay pair X2, which will close contacts X2–1 to X2–11. The closing of contacts X2–10 (C*mr*) will energize relay XR2. Contacts X2–11 (C*tc*), closing, will energize sort selecting relay SX2. Relay XR2 will close its contacts XR2–2 (E*br*) to complete the energizing circuit of the delay relay DR. The relay SX2 (C*mc*) being energized closes its holding contacts SX2–1, its contacts SX2–2 (F*bl*) in the energizing circuit of the bin deflector solenoid BD12 and column deflector solenoid CD2, its contacts SX2–3 (F*br*) in the circuit of the packer bail solenoid PB2, its contacts SX2–4 (F*tr*) in the holding circuit for the relay TR, and its contacts SX2–5 (E*tr*) in the circuit of the bin latch solenoid BL2. However, as the sort relay SR is deenergized, only the closing of the contacts SX2–2 and SX2–5 of the relay SX2 will be of importance in this operation.

The energizing of the cycle delay relay DR upon closing of the contacts XR2–2 causes its contacts DR–1 (E*bc*) to close to initiate a cycle of operation of the master machine.

At about the 10° point in the master machine cycle, the switches TS1A, TS1B, TS3A, and TS3B are closed. The closing of switches TS1A and TS1B is without effect inasmuch as contacts SR–3 and SR–2 of the deenergized sort relay SR are open. The closing of the switch TS3B is without effect since the circuit of the counting magnets is open at the contacts BR–1. However, the closing of the switches TS3A completes the energizing circuits of the bin deflector solenoid BD12 and the column deflector solenoid CD2.

The operation of the column deflector solenoid CD2 is of no consequence. However, it will be remembered that when a bin deflector solenoid is energized, it operates a link 2081 (Fig. 26) to actuate the auxiliary bail 2065 in the bin associated with the operated deflector and that the forward arm 2078 of the side lever of the operated auxiliary bail will lift the link 2096 to permit the associated full bin switch to restore. In the operation being described, the full bin switch FBS2 (E*tr*) will restore to close the energizing circuit of the bin latch solenoid BL2 which, it will be remembered, will lift the slide 2108 (Fig. 26) for the middle column of bins with the result that the latch lever 2106 for the tray in bin 12 will be moved to released position when the energizing circuit of the bin deflector solenoid BD12 is broken and the link 2081 and the latch release lever 2116 controlled thereby are permitted to restore to normal.

It will be remembered also that the operation of the bin latch solenoid will lift the slide 2135 (Fig. 26), which will cause the lever 2147 to be released to operate the right door switch. In this case, the right door switch RD2 (E*mr*) will complete the energizing circuit of the full bin relay FBR so that the latter will operate its contacts FBR–1 to FBR–5. The contacts FBR–1 (E*tc*) complete a holding circuit for the bin latch solenoid BL2, the operation of contacts FBR–2 (E*tc*) is of no consequence for this operation, the closing of contacts FBR–3 (C*tc*) around the open contacts SH–3 completes the previously described holding circuit for the sort selecting relays SY3 and SX2, the contacts FBR–4 (F*tl*) open to break the energizing circuit of the bin release relay BR, and the closing of contacts FBR–5 (A*b*) closes the circuit of the door light DL2.

The deenergized relay BR restores its contacts BR–1 to BR–5. The contacts BR–1 (E*bl*), restoring, reclose the energizing circuit of the sort relay SR. The contacts BR–2 (E*tr*) open the original energizing circuit of the bin latch solenoid BL2 which, however, remains energized through the holding circuit including the closed contacts FBR–1 and the power reducing resistor R2. Contacts BR–3 (E*mc*), connected in parallel to the switch CNC, reopen.

Contacts BR–4 (E*br*) restore, thereby opening the energizing circuit of the sorter control relay SC which open their contacts SC–1 to SC–10 (C*c*) in the circuits of the sort selecting relays SY3 and SX2 which, however, remain energized over the holding circuit closed by the contacts FBR–3.

Contacts BR–5 (F*tl*), restoring, break the energizing circuits of the bin deflector solenoid BD12 and of the column deflector solenoid CD2. The bin deflector solenoid BD12 and its link 2081, restoring while the bin latch solenoid BL2 is still energized and holds the link 2108 elevated, causes the latch member 2106 for bin 12 to be moved to and held in tray releasing position as previously described.

At this point it is necessary to take into account the passage of time during the above described train of events initiated by the closing of the switch TS3A at about the 10° point of the cycle of the master machine. The bin deflector solenoid which is energized at that time is required to move a number of mechanical elements as previously described, which elements have a substantial inertia so that the restoration of the full bin switch to close the energizing circuit of the bin latch solenoid is not completed until well past the 46° point in the cycle. Also a considerable inertia is possessed by the mechanical parts operated by the bin latch solenoid as it operates the right door switch to close the energizing circuit of the full bin relay FBR which in turn, opening its contacts FBR–4 deenergizes the bin release relay BR which, restoring its contacts BR–1, recloses the energizing circuit of the sort relay SR. The energization of the full bin relay FBR does not occur until well past the 60° point of the cycle. The time required by the bin deflector solenoid to bring about the restoration of the full bin switch cannot of course be made precisely the same for all 27 bin deflector solenoids and full bin switches and, furthermore, the time required by each of the three bin latch solenoids to operate the respective right door switch may vary slightly, but in any case the closing of the energizing circuit of the full bin relay FBR, the opening of the contacts FBR–4, the deenergizing of the relay BR and the restoration of its contacts BR–1 and BR–4 does not occur until well after the 60° point of the master machine cycle, at which time the opening of the switch TS4A (E*br*) opens the energizing circuit of the relay DR which reopens its contacts DR–3 (E*br*) so that the sorter control relays SC will not be reenergized when the contacts BR–4 and SR–1 restore to normal. Likewise the closing of the contacts SR–2 (F*bc*) by the reenergized sort relay SR does not occur until well after the reopening of the switch TS1B at about the 46° point in the cycle so that the sort start relay SS cannot be energized in the operation initiated while the key SBR is depressed. Thus, the open contacts SS–4 (F*tr*) prevent energization of any packer bail solenoid by the closing of the switch TS2B at the 75° point of the master machine cycle, the unoperated packer bail switches and open contact SS–2 (F*mc*) prevent energization of the sort holding relay SH, and the open contacts SS–5 (F*tr*) prevent energization of the relay TR when the switch TS6 closes at the 230° point of the cycle. It will be apparent also that as the contacts SR 3 (F*mc*) are not reclosed until well after the closing of the switches TS1A at the 46° point of the cycle, neither of the endorser solenoids ECA and ECB will be energized. As the contacts BR–1 (E*bl*) are not reclosed until after the contacts DR–2 reopen as the relay DR is deenergized by the opening of the switch TS4A at the 60° point of the cycle, the energizing circuit of the count magnet SCM cannot be closed at any time in this operation, notwithstanding the closed condition of the switch TS3B (E*bl*) from the 10° to the 300° point of the cycle.

At about the 316° point the switch TS8 (C*tc*) opens to break the energizing circuits of the relays FE, X2 and XR2.

At about the 318° point, the key SBR is released and restores to normal and reopens the switch SBRS (F*ml*) in the circuit of the relay BR. The depressed key SK12 is also restored to a partially depressed position where it is then held, as described in detail in the above-mentioned original application, without reclosing the switch SKE (E*bl*) but still preventing depression of any other of the keys SK1 to SK27. The switch SKE remaining open will prevent a new operation from being initiated by any of the live computing function control keys such as the keys CT, CST, CS and CA. The partial restoration of the key SK12 is sufficient to permit the switches SKS2 and SXS3 to reopen.

Thus at the end of the operation, sorter bin tray 12 is unlatched and in the sorter control circuits the right door switch RD2 remains transferred and the full bin relay FBR remains energized so that the door lamp DL2 is lighted and the holding circuits established by the contacts FBR–1 (E*tc*) and FBR–3 (C*tc*) remain closed. In the master machine the key SK12 is held partially depressed to prevent depression of any key SK1 to SK27 excepting the key SK12, and in the control circuit the switch SKE (E*bl*) remains open to prevent another cycle from being initiated except by depression of the key SK12.

In order to retrieve from sorter bin 12 the check which the operator desires to re-examine, the operator will open the middle right door of the sorter and pull the unlatched tray at least partially out of bin 12, manually release the packer bail 2010 sufficiently to permit removal of the check, and then restore the tray to its fully inserted position within the bin. Then the operator should reclose the middle right door which, as explained above, will operate the right door switch RD2 (E*mr*) to its normal position, thereby breaking the circuit of the full bin relay FBR so that the latter will be deenergized and restore its contacts FBR–1 to FBR–5, thereby extinguishing the door lamp DL2 and breaking the holding circuits of the sort selecting relays SY3 and SX2 and the holding circuit of the bin latch solenoid BL2 which then drops the link 2108 to relatch the tray in bin 12.

Having re-examined the retrieved document if necessary, the operator may decide to withhold it from the sorting operation, to re-sort it to the same sorter bin, 12, or to re-sort it to another sorter bin. However, because of the latched partially depressed selection key SK12, the machine must next be operated by fully depressing that same key, SK12. In the system disclosed in detail in the above-mentioned original application, that provision has the purpose of enforcing the production of complete printed records of all operations and proper correction of all errors so as to yield a recorded proof of the accounting operations. It will be obvious that in sorting work where such proofs and records are not required, the provisions for holding in partially depressed condition the selection key SK which was depressed to initiate an operation with the key SBR depressed, could be omitted.

In the illustrated system, the operator may proceed by depressing the correction key COR (Fig. 2) before fully depressing the partially restored selection key SK12 if it is desired to withhold the retrieved document from sorting or if it is desired to resort the document to a different sorter bin. Depression of the key COR will close the switch CORS (C*tr*) to energize the relay CR, which will operate its contacts CR–1, CR–2 and CR–3. The contacts CR–1 (E*bl*), transferring, will break the energizing circuit of the sort relay SR so that the sorter will not be operated, and will prevent energization of either of the counting magnets DCM and SCM. Contacts CR–3 (E*mc*) close to short the CNC to insure that an open condition of the latter switch will not prevent a cycle of operation of the master machine from being initiated by fully depressing the partially depressed key SK12 and the restored contacts SR–1 of the relay SR permit such operation to be initiated without insertion of a document into the sorter chute to close the switches DDS.

In this cycle of operation of the master machine, the switch SKE is reopened and the key SK12 restores fully to normal position so that the apparatus can then be operated to sort a document to another sorter bin. Had the operator wished to resort the retrieved document to the same sorter bin, 12, it would have been sufficient merely to drop the document into the sorter chute and fully depress the key SK12.

Warning is automatically given to the operator when the stack of sorted documents accumulated in any bin tray reaches a predetermined height. Each tray in the illustrated sorter can accumulate a stack of from 125 to 175 documents before the associated one of the full bin switches FBS1, FBS2 or FBS3 fails to restore in the sorting operation and thus permits the full bin relay FBR to be energized in consequence of a full bin condition as will shortly be explained. The number of documents required to be accumulated in a single bin before a full bin condition results can be varied between the indicated limits by the adjustment of the full bin switches.

Assume that the stack of checks sorted into sorter bin 12 reaches such a height that it subsequently will limit the operating movement of the auxiliary bail 2065 in that bin to such an extent that in an operation which is initiated by the depression of the key SK12 for sorting another document to bin 12, the link 2096 (Fig. 25) for the middle column of bins of the sorter is not lifted far enough to permit the full bin switch FBS2 to restore, and as the links 2096 for the other two columns of bins are not lifted, all of the full bin switches remain closed on their forward contacts shown in Figure 34E. Consequently, after the sort hold relay SH has been energized at about the 10° point of the cycle of the master machine and when the relay TR is energized at the 130° point of the cycle, the energizing circuit of the relay FBR is completed through all of the switches FBS1, FBS2 and FBS3 in series and contacts SH–5 and TR–2.

The relay FBR then operates its contacts FBR–1 to FBR–5. Contacts FBR–2 (E*tc*) complete the energizing circuit for the bin latch solenoid BL2 from positive line +1 through the previously closed contacts SS–6, contacts SX2–5 and the winding of solenoid BL2 to negative line −1. The contacts FBR–1 (E*tc*) closing, connect a resistor R2 in shunt to the series combination of contacts FBR–2 and SS–6 to keep the solenoid BL2 energized at reduced current after the contacts SS–6 reopen. The solenoid BL2, lifting the slide 2135 (Fig. 26) as previously described, then transfers the right door switch RD2 to complete the holding circuit for the relay FBR and close an energizing circuit for the glow lamp FDB (E*br*) on the master machine keyboard, said circuit being traced from positive line +1 through the switches RD1, LD1, and RD2, a small rectifier D2, and through the glow lamp FDB to negative line −1. The link 2108 (Fig. 26), also lifted by the solenoid BL2, brings about the unlatching of the tray in bin 12 as previously described. The contacts FBR-3 (C*tc*) close in parallel to the contacts SH-3 in the holding circuit for the sort selecting relays SY3 and SX2. The contacts FBR-4 (F*tl*) open in the circuit of the relay BR, and contacts FBR-5 (A*b*) complete the circuit of the door lamp DL2 which then lights.

At the end of the operation, the sorter and control circuits restore to normal as in other sorting operations except that the tray in the full bin, 12, is unlatched, the bin latch solenoid BL2 remains energized and the right door switch RD2 remains transferred so that the full bin relay FBR remains energized and another operation cannot be initiated by depression of any of the selection keys SK1 to SK27 except those corresponding to those of the switches SF1 to SF27 which are in the 4 position. Unless the switch SF corresponding to the depressed key SK is in its 4 position, the relay NS (B*bl*) will not be energized, the contacts NS-1 (E*bl*) will remain closed and the sort relay SR will remain energized so that the energizing circuit for the relay DR cannot be completed through the contacts SR-1 (E*br*). As the right door switch RD2 is in transferred position, the circuit of the relay DR cannot be completed through the document switches DDS when the next document is dropped into the chute.

The operator will note that the cycle of operation has not been initiated by the depression of the key SK and will note the lighted lamp FDB (Fig. 2 and E*br*) on the master machine keyboard. If only a comparatively small number of deposits remain to be sorted the operator may elect to proceed with the work after merely opening and closing the middle right hand door which will restore the switch RD2 to normal to deenergize the relay FBR which will restore its contacts. The opening of contacts FBR-1 (E*tc*) will deenergize the solenoid BL2 and the opening of contacts FBR-3 (C*tc*) will break the holding circuits of the sort selecting relays SX2 and SY3. In that case, in each further operation initiated by the depression of key SK12, the full bin switch FBS2 will again fail to restore and the relay FBR and bin latch solenoid BL2 will again be energized so that the operator must again open and close the middle right hand door of the sorter.

A considerable number of documents may still be sorted into the same bin, bin 12 in this instance, without any difficulty except that repeated opening and closing of the sorter door after each sorting operation initiated by the depression of the key SK12 would slow the work too much if there were many documents to sort to the bin. Consequently, if the operator sees that there is a substantial pile of documents still to be sorted, the operator will open the middle right door of the sorter, remove the unlatched tray from bin 12, remove the sorted documents therefrom and reinsert the tray in its bin. The operator will reclose the opened sorter door which returns the right door switch RD2 to normal, which, as previously explained, deenergizes the full bin relay FBR. The latter restores its contacts FBR-1 to FBR-5, breaking the holding circuits for the sort selecting relay SX2 and SY3 and the bin latch solenoid BL2 so that the apparatus is again at normal for continuance of the work.

It may happen occasionally that a document is encountered which is required to be sorted but will not go through the sorter because, for example, it may be too badly crumpled or torn or it may be too large. When such a document is encountered, the operator, in addition to depressing the appropriate selection key SK1 to SK27, will not drop the document into the sort chute but will instead depress the sorter bin release key SBR which will initiate a cycle of operation like that previously described where the operator wished to retrieve an already sorted document to re-examine it. In this operation the tray in the sorter bin corresponding to the depressed selection key will be unlatched as previously explained so that the operator may pull out the released tray and manually insert the non-sortable document. After replacing the tray and closing the sorter door the machine will, as previously explained, not be in normal condition and, particularly, the last depressed selection key will be held in partially depressed position. However, the operator may fully depress that selection key and then depress the correction key CR which will initiate a cycle of operation like that previously described when it was desired not to re-sort the retrieved document to the same bin. After such an operation, the apparatus will again be at normal as is previously explained.

If it should happen at any time that a document inserted in the sorter chute for its operation does not arrive in the selected bin and does not operate that one of the sorted document switches SD1 to SD27 associated with that bin, the energizing circuit of the relay SS (F*bc*) will not be broken and consequently, the contacts SS-3 (F*tr*) will remain closed in the holding circuit of the energized packer bail PB1, PB2 or PB3 so that the corresponding packer bail switch PS1, PS2 or PS3 will remain closed to keep the sort hold relay SH (F*mc*) energized. Consequently, contacts SH-1 and SH-2 (F*tc*) of the sort relay, remaining closed, will keep the conveyor clutch solenoid CCS energized so that the conveyor will continue to operate. Also the contacts SH-3 (C*tc*) will keep the holding circuits of the energized ones of the sort selecting relays SX1 to SX3 closed so that the contacts SX1-4, SX2-4 or SX3-4 (F*tr*) of the energized sort selecting relay will remain closed to maintain the holding circuit of the timing relay TR which will keep its contacts TR-3 (E*br*) in operated open position to prevent another sorting operation from being initiated upon the insertion of a document in the sorter chute to close the switches DDS.

The operator, noting that the sorter conveyor is still running beyond the time when it should normally stop, can restore the sorter power switch SPS on the master machine keyboard to its normal "off" position, which will restore contacts SPS1 (C*tr*) and stop the operation of the sorter conveyor and release those relays and solenoids which remained energized over holding circuits. The operator, remembering or noting from the detail strip 110 (Fig. 1), the bin to which the document should have been sorted, may open the appropriate sorter door to see whether the document has been caught at any place in the vertical conveyor or has been delivered to the additional tray 1992 (Fig. 25) at the bottom of the column of bins. The operator can, if necessary, look for the strayed document in the vertical conveyors or trays 1992 for the other two columns of sorting bins. Assuming that the document is located in undamaged condition in one of the trays 1992, the operator, after retrieving the document, should again close all of the opened sorter doors and after again operating the power sorter switch SPS to its "on" position, may again drop the document into the sorter chute and again depress the appropriate selection key SK1 to SK27, which would initiate another cycle of operation for sorting the document to the proper bin. However, if the corresponding switches on the program control panel were adjusted for full or partial endorsement there would be a second print of the endorsement on the re-sorted document. Alternatively, the operator, after retrieving the stray document, could release the latch for the tray for which the document should have been sorted by depressing the key SBR and re-depressing the appropriate selection key SK1 to SK27. The latch of the selected tray is released in the same manner as previously described when the key SBR is depressed together with a selection key (SK12) because the operator wished to retrieve a sorted document from a sorter tray for the purpose of re-examining the document. After pulling out the unlatched tray, manually inserting the stray document therein and restoring the tray and reclosing the door, the operator will fully depress the selection key which is latched in partially depressed position as previously described, and depress also the correction key COR to initiate an operation like that previously described, in which the retrieved document was not re-sorted to the same bin.

When a run of sorting work is completed, it is desired to release all of the bin latches to permit removal of the sorted documents. In the example of work described in the above-mentioned original application, such release is effected in operation of the system to produce a summary and proof of the accuracy of the run of accounting work. Depression of the key ART (Fig. 2), as described in the abovementioned original application initiates operation of the master machine, closes switches ART1 (C*mc*) which closes energizing circuit of the bin latch release relay BLR (C*mc*), operates a switch RTS (E*mc*) to open the energizing circuit of the sort relay SR so that the sorter will not perform a sorting operation. The relay BLR when energized closes its holding contacts BLR–1 (C*mc*) and operates its contacts BLR–2 (E*mr*) to light the full bin signal lamp FDB on the master machine keyboard. At the same time, the relay BLR releases the slide 2177 (Fig. 26) which is spring operated to move all of the bin latches to and hold them in released position until it is manually reset. In the disclosed system as described in the above-mentioned original application, depression of the key ART initiates a series of twenty-seven cycles of operation of the master machine for the performance of a series of twenty-seven computing functions. It will be obvious that when such computing functions are not required, the energizing circuit of the relay BLR could be closed momentarily by operating a switch, such as the switch ART1, by a key (not shown) which would not operate such a repeat cycling means. In any event, when all of the bin latches have been unlatched by operation of the slide 2177 by its spring 2179 when released by the relay BLR, the documents may be removed from the sorter trays, the trays returned to the sorter and the sorter doors reclosed. Then, by manually moving the knob 2192 (Fig. 26) rightwardly, the slide 2177 is returned to normal position where it relatched by the armature of the deenergized relay BRL, and permits all document bin tray latches to relatch the trays, and the apparatus is ready for the performance of another run of sorting work.

We claim:

1. A document sorting apparatus having a plurality of sorted document receiving bins, means to deliver sorted documents to said bins, a first packer device in each bin normally bearing against the top of the accumulation of documents in said bin, a second packer device in each bin normally held clear of said accumulation of documents in the bin, and means operable in a sorting operation of said apparatus to move said second packer device against and said first packer device away from the top of said accumulation of documents preparatory to delivery of another document to the top of the accumulation of documents in the bin and to return said first packer device into engagement against and said second packer device away from the newly delivered document at the top of said accumulation of documents.

2. A document sorting apparatus having a plurality of sorted document receiving bins, means to deliver sorted documents to said bins, a first packer device in each bin normally bearing against the top of the accumulation of documents in said bin, a second packer device in each bin normally held clear of said accumulation of documents, means operable in a sorting operation of said apparatus to move said second packer device against and said first packer device away from the top of said accumulation of documents in the bin prior to the delivery of another document to said bin and to retain said packer devices in their moved positions, and a detecting device for each bin operable by a document being delivered to said bin, said moving means being controlled by said detecting means when operated by the document being delivered to cause said first packer device to return into engagement against the top of the delivered document and said second packer device to restore to normal.

3. A document sorting apparatus having a plurality of sorted document receiving bins, manipulative bin selecting means, means controlled by said manipulative means and operable to direct a sorted document into the selected bin, a first packer device in each bin normally bearing against the top of the accumulation of documents in said bin, a second packer device in each bin normally held clear of said accumulation of documents, means controlled by said manipulative means to move said second packer device against and said first packer device away from the top of said accumulation of documents in the bin prior to delivery of the document being sorted to said bin, and detecting means for each bin operable by a document being delivered to said bin, said moving means being controlled by said detecting means when operated by the document being delivered to cause said packer devices to restore to normal.

4. A document sorting apparatus having a plurality of sorted document receiving bins, means to mechanically deliver sorted documents to said bins, a first packer device in each bin normally bearing against the top of the accumulation of documents in said bin, a second packer device in each bin normally held clear of said accumulation of documents in the bin, means to initiate a sorting operation of said apparatus, means operating in said sorting operation of said apparatus to move said second packer device against and said first packer device away from the top of said accumulation of documents preparatory to delivery of another document to the top of the accumulation of documents in the bin and to return said first packer device into engagement against and said second packer device away from the newly delivered document at the top of said accumulation of documents, whereby the excursions of said packer devices in a sorting operation are limited by the accumulation of sorted documents in the bin, and means controlled by one of said packer devices to prevent a further cycle initiating operation of said cycle initiating means when the excursion of said one packer device has been limited to a predetermined extent.

5. A document sorting apparatus having a plurality of sorted document receiving bins, means to mechanically deliver sorted documents to said bins, means normally positioned to impede manual access to said bins and movable to a manual access permitting position and again to said normal position, a packer device in each bin normally held clear of said accumulation of documents in the bin, means to initiate a sorting operation of said apparatus, means operating in said sorting operation of said apparatus to move said packer device against the top of the accumulation of documents in the bin preparatory to delivery of another document to the bin and to return said packer device to normal position whereby the excursion of said packer device in a sorting operation is limited by the accumulation of sorted documents in the bin, means controlled by said packer device to prevent a further cycle initiating operation of said cycle initiating means when the excursion of said packer device has been limited to a predetermined extent, and means operable by said impeding means when moved to access permitting position and returned to impeding position to restore said preventing means to a normal non-preventing condition.

6. A document sorting apparatus having a plurality of sorted document receiving bins, means to mechanically deliver sorted documents to said bins, means normally positioned to impede manual access to said bins and movable to a manual access permitting position and again to said normal position, a first packer device in each bin normally bearing against the top of the accumulation of documents in said bin, a second packer device in each bin normally held clear of said accumulation of documents in the bin, means to initiate a sorting operation of said apparatus, means operating in said sorting operation of said apparatus to pass a document to be sorted to said delivery means, means operating in said sorting operation to move said second packer device against and said first packer device away from the top of said accumulation of documents preparatory to delivery of another document to the top of the accumulation of documents in the bin and to return said first packer device into engagement against and said second packer device away from the newly delivered document at the top of said accumulation of documents, whereby the excursions of said packer devices in a sorting operation are limited by the accumulation of sorted documents in the bin, means controlled by one of said packer devices to prevent a further cycle initiating operation of said cycle initiating means when the excursion of said one packer device has been limited to a predetermined extent, and means operable by said impeding means when moved to access permitting position and returned to impeding position to restore said preventing means to a normal non-preventing condition.

7. A document sorting apparatus comprising a plurality of sorted document bins, an inserted document receiver, means for conveying an inserted document from said receiver to any of said bins, bin selecting manipulative means, means controlled by said manipulative means to direct the document from said conveying means into a selected one of said bins, each of said bins having means normally held in a position in which it denies manual access to documents in the respective bin by a lock device operable to release said means for movement to a position permitting such access, a single unlock control manipulative means, and means jointly controlled by the latter manipulative means and the bin selecting manipulative means to operate solely the lock device of the bin selected by said manipulative means.

8. A document sorting apparatus comprising a plurality of sorted document bins, an inserted document receiver, means for conveying an inserted document from said receiver to any of said bins, manipulative bin selecting means, means controlled by said manipulative means to initiate a sorting operation of said apparatus, means controlled by said manipulative means in a sorting operation initiated thereby to deliver an inserted document from said receiver to said conveying means, means controlled by said manipulative means to direct the document conveyed from said receiver into a selected one of said bins, each of said bins having means normally held in a position in which it denies manual access to documents in the respective bin by a lock device operable to release said means for movement to a position permitting such access, a single unlock control manipulative means, and means controlled by the latter manipulative means and the bin selecting manipulative means to operate solely the lock device of the selected bin.

9. A document sorting apparatus comprising a plurality of sorted document bins, an inserted document receiver, means for conveying an inserted document from said receiver to any of said bins, manipulative bin selecting means, means controlled by said manipulative means to initiate a sorting operation of said apparatus, means controlled by said manipulative means to deliver an inserted document from said receiver to said conveying means, means controlled by said manipulative means to direct the document from said conveying means into the selected one of said bins, detecting means for each bin operable by a document being delivered to said bin, and means controlled by said detecting means to prevent said initiating means from initiating a further sorting operation of said apparatus until the document delivered to said conveying means has been delivered to the selected bin.

10. A document sorting apparatus comprising a plurality of sorted document bins, an inserted document receiver, means to detect an inserted document in said receiver, means for conveying an inserted document from said receiver to any of said bins, manipulative bin selecting means, means controlled by said manipulative means to initiate a sorting operation of said apparatus, said last means being also controlled by said document detecting means to prevent it from initiating a sorting operation while there is no document in said receiver, means controlled by said manipulative means to direct the document from said conveying means into the selected one of said bins, further detecting means for each bin operable by a document being delivered to said bin, and means controlled by said further detecting means to prevent said initiating means from initiating a further sorting operation of said apparatus until the document delivered to said conveying means has been delivered to the selected bin.

11. A document sorting apparatus comprising a plurality of sorted document bins, an inserted document receiver, means to detect an inserted document in said receiver, means for conveying an inserted document from said receiver to any of said bins, manipulative bin selecting means, means controlled by said manipulative means to initiate a sorting operation of said apparatus, said last means being also controlled by said document detecting means to prevent it from initiating a sorting operation while there is no document in said receiver, means controlled by said manipulative means after initiation of a sorting operation to deliver an inserted document from said receiver to said conveying means, means controlled by said manipulative means to direct the document from said conveying means into the selected one of said bins, further detecting means for each bin operable by a document being delivered to said bin, and means controlled by said further detecting means to prevent said initiating means from initiating a further sorting operation of said apparatus until the document delivered to said conveying means has been delivered to the selected bin.

12. A document sorting apparatus, a document conveying means, a plurality of sorted document receiving bins, means for each of said bins operable to direct a document from said conveying means into said bin, each of said bins having a means normally positioned to block access to documents therein, locking means normally locking said access preventing means in access preventing position, a movable packer device in each of said bins normally positioned clear of the accumulated pile of documents in said bin, manipulative bin selecting means, means controlled by said manipulative means to initiate a sorting operation of said apparatus, means controlled by said manipulative means in a sorting operation initiated thereby to operate said document directing means for the selected bin and to move said packer device in said bin against the top of the pile of documents therein prior to delivery of the document being sorted whereby the movement of said packer device is limited by the pile of previously accumulated documents in said bin, means controlled by said packer devices to disable said initiating means from initiating a further sorting operation when movement of a packer device has been limited more than a predetermined amount, and means controlled by said packer devices to operate the locking device for the bin in which the movement of the packer device has been so limited to release said access preventing means for movement to permit access to the documents in said bin.

13. A document sorting apparatus having a plurality of sorted document receiving bins, means to deliver sorted documents to said bins, a packer device in each bin normally bearing against the top of the accumulation of documents in said bin, means operable in a sorting operation of said apparatus to move said packer device away from the top of said accumulation of documents in the bin prior to the delivery of another document to said bin, and a detecting device for each bin operable by a document being delivered to said bin, said moving means being controlled by a detecting device when operated by a document being delivered to cause the packer device to return into engagement against the top of the delivered document.

14. A document sorting apparatus having a plurality of sorted document receiving bins, means to deliver sorted documents to said bins, a packer device in each bin normally held clear of the top of the accumulation of documents in said bin, means operable in a sorting operation of said apparatus to move said packer device to limit against the top of said accumulation of documents in the bin prior to the delivery of another document to said bin, and a detecting device for each bin operable by a document being delivered to said bin, said moving means being controlled by a detecting device when operated by a document being delivered to cause the packer device to restore to normal.

15. A document sorting apparatus having a plurality of sorted document receiving bins, manipulative means operable to select any of said bins, means controlled by said manipulative means to deliver a document to the selected bin, a packer device in each bin normally held clear of the accumulation of documents in the bin, means controlled by said manipulative means to move said packer device to limit against the top of said accumulation of documents in said bin, a detecting device for each bin operable by a document delivered thereto to cause the packer to restore to normal, and a warning means controlled by said packer device and operated thereby when the movement of the packer device has been limited more than a predetermined amount.

16. A document sorting apparatus having a plurality of sorted document receiving bins, a packer device in each bin normally positioned clear of the accumulation of sorted documents in the bin, means to initiate a sorting operation of said apparatus, means operating in a sorting operation to move said packer device to limit against the top of said accumulation of documents preparatory to delivery of another document to the top of the accumulation of documents in the bin, a detecting device for each bin operable by a document delivered to a bin and controlling the packer device moving means to restore the packer device to normal upon the detection of the delivery of a sorted document into the bin, and means controlled by said packer device to prevent a further cycle initiating operation of the sorting operation initiating means when the movement of said packer device has been limited to a predetermined extent by the accumulation of documents in a bin.

17. A document sorting apparatus comprising a document conveying means, a plurality of sorted document receiving bins, manipulative means to initiate a sorting operation of said apparatus, means for each of said bins operable to direct a document from said conveying means into said bin, a movable packer device in each of said bins normally positioned clear of the accumulated pile of documents in said bin, means controlled by said manipulative means in a sorting operation initiated thereby to operate said document directing means for the selected bin and to move said packer device in said bin against the top of the pile of documents therein prior to delivery of the document being sorted whereby the movement of said packer device is limited by the pile of previously accumulated documents in said bin, a detecting device for each bin operated by a sorted document delivered to a selected bin and controlling the restoration of said packer device to normal after the delivery of a document into said bin, and a means controlled by said packer device to disable said manipulative means from initiating a further sorting operation of said apparatus when movement of a packer device has been limited more than a predetermined amount.

18. A document sorting apparatus, a document conveying means, a plurality of sorted document receiving bins, means for each of said bins operable to direct a document from said conveying means into said bin, a movable packer device in each of said bins normally positioned clear of the accumulated pile of documents in said bin, manipulative bin selecting means, means controlled by said manipulative means to initiate a sorting operation of said apparatus, means controlled by said manipulative means in a sorting operation initiated thereby to operate said document directing means for the selected bin and to move said packer device in said bin against the top of the pile of documents therein prior to delivery of the document being sorted whereby the movement of said packer device is limited by the pile of previously accumulated documents in said bin, document delivery detecting means for each bin operated by a sorted document delivered to a selected bin and controlling the restoration of said packer device to normal after the delivery of a document into said bin, means controlled by said packer device to disable said manipulative means from initiating a further sorting operation when movement of a packer device has been limited more than a predetermined amount, and a means manually operable to restore said disabling means.

19. A document sorting apparatus having a plurality of sorted document receiving bins, manipulative means operable to select any of said bins, means controlled by said manipulative means to deliver a document to the selected bin, a packer device in each bin normally held clear in said accumulation of documents in the bin, means for delivering another document to the bin, said packer device being operative to guide said another document to the top of the accumulation of documents in the bin, means controlled by said manipulative means to move said packer device against the top of said accumulation of documents between the delivery of each two successive documents to the bin and to restore said packer device, whereby the extent of the excursion of said packer device is limited by the previously accumulated documents, and a warning means controlled by said packer device to operate when the excursion of said packer device has been limited more than a predetermined amount.

20. A document sorting apparatus having a document conveying means, a plurality of sorted document receiving bins, means for each of said bins operable to direct a document from said conveying means into said bin, a movable packer device in each of said bins normally positioned clear of the accumulated pile of documents in said bin, manipulative means operable to select any of said bins, means controlled by said means to operate said document directing means for the selected bin and to move said packer device in said bin against the top of the pile of documents therein prior to delivery of the document being sorted, said document being delivered to said bin on the other side of said packer device from said pile of documents, whereby the movement of said packer device is limited by the pile of previously accumulated documents in said bin, a warning means controlled by said packer devices to operate when movement of a packer device has been limited more than a predetermined amount.

21. A document sorting apparatus having a plurality of sorted document receiving bins, means to mechanically deliver sorted documents to said bins, a packing member in each bin normally held clear of the accumulation of sorted documents in the bin, said packing member being movable to guide the documents being delivered to the top of the accumulation of documents in the bin, means to initiate a sorting operation of said apparatus, means operating in said sorting operation of said apparatus to move said packer device against the top of said accumulation of documents preparatory to delivery of another document to the top of the accumulation of documents in the bin and to return said packer device to normal position, whereby the excursion of said packer device in a sorting operation is limited by the accumulation of sorted documents in the bin, and means controlled by said packer device to prevent a further cycle initiating operation of said cycle initiating means when the excursion of said packer device has been limited to a predetermined extent.

22. A document sorting apparatus comprising a document conveying means, a plurality of sorted document receiving bins, manipulative bin selecting means, means controlled by said manipulative means to initiate a sorting operation of said apparatus, means for each of said bins operable to direct a document from said conveying means into said bin, a packer device in each of said bins normally positioned in one position clear of the accumulated pile of documents in said bin, said packer device being movable to another position against the top of the pile of documents in said bin, said packer device when in its said another position being operable to guide a document from said directing means to the top of an accumulation of documents in said bin, means controlled by said manipulative means in a sorting operation initiated thereby to operate said document directing means for the selected bin and a means controlled by said packer devices to disable said manipulative means from initiating a further sorting operation of said apparatus when movement of a packer device has been limited more than a predetermined amount.

23. A document sorting apparatus, a document conveying means, a plurality of sorted document receiving bins, a packer device for each of said bins operable to direct a document from said conveying means onto the top of a pile of documents in said bin, said packer device normally positioned clear of the accumulated pile of documents in said bin, manipulative bin selecting means, means controlled by said manipulative means to initiate a sorting operation of said apparatus, means controlled by said manipulative means in a sorting operation initiated thereby to operate said document directing means for the selected bin and to move said packer device in said bin against the top of the pile of documents therein prior to delivery of the document being sorted whereby the movement of said packer device is limited by the pile of previously accumulated documents in said bin, means controlled by said packer devices to disable said manipulative means from initiating a further sorting operation when movement of a packer device has been limited more than a predetermined amount, and a means manually operable to restore said disabling means.

References Cited in the file of this patent

UNITED STATES PATENTS

| | | |
|---|---|---|
| 2,579,541 | Bobst | Dec. 25, 1951 |
| 2,785,800 | Furman | Mar. 19, 1957 |